(12) United States Patent
Yamabe et al.

(10) Patent No.: US 12,024,117 B2
(45) Date of Patent: Jul. 2, 2024

(54) SEATBELT ASSIST DEVICE AND VEHICLE SEAT

(71) Applicant: TS TECH CO., LTD., Saitama (JP)

(72) Inventors: Atsushi Yamabe, Tochigi (JP); Noriyuki Yamato, Tochigi (JP); Haruki Mochizuki, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 18/307,839

(22) Filed: Apr. 27, 2023

(65) Prior Publication Data

US 2024/0083385 A1 Mar. 14, 2024

Related U.S. Application Data

(63) Continuation of application No. 17/188,076, filed on Mar. 1, 2021, now Pat. No. 11,639,152, which is a
(Continued)

(30) Foreign Application Priority Data

Aug. 6, 2014 (JP) ................................. 2014-160884
Aug. 6, 2014 (JP) ................................. 2014-160885
(Continued)

(51) Int. Cl.
*B60R 22/26* (2006.01)
*B60N 2/90* (2018.01)
(Continued)

(52) U.S. Cl.
CPC ............... *B60R 22/26* (2013.01); *B60N 2/90* (2018.02); *B60N 2/919* (2018.02); *B60R 22/03* (2013.01);
(Continued)

(58) Field of Classification Search
CPC . B60R 22/26; B60R 22/03; B60R 2022/1818; B60R 2022/266; B60N 2/90; B60N 2/919
See application file for complete search history.

(56) References Cited

U.S. PATENT DOCUMENTS 5,441,332 A 8/1995 Verellen
9,783,155 B2 10/2017 Kondo et al.
(Continued)

FOREIGN PATENT DOCUMENTS

DE 19805872 C1 4/1999
JP S56-116247 U 9/1981
(Continued)

OTHER PUBLICATIONS

Office Action issued in related application JP 2014-160885, dated Jan. 9, 2018, with machine generated English language translation, 5 pages.
(Continued)

*Primary Examiner* — Faye M Fleming
(74) *Attorney, Agent, or Firm* — Michael Best & Friedrich LLP

(57) ABSTRACT

Provided is a belt assist device having a compact configuration and being configured to move a seatbelt to an easily reachable position. A vehicle seat includes a belt assist device attached to a lateral portion of a seat back and configured to move a portion of a seatbelt placed on the lateral portion to the easily reachable position. The belt assist device includes a rotary member attached to a recessed housing portion of the lateral portion via a rotary shaft and configured to rotate up and down between a housing position at which the rotary member is housed in the seat back and a protruding position at which the rotary member rotates to protrude forward of the seat back to push out a portion of the seatbelt. The rotary member is disposed forward of a belt
(Continued)

guide provided at the periphery of an upper end of the seat back.

10 Claims, 43 Drawing Sheets

Related U.S. Application Data continuation of application No. 16/887,226, filed on May 29, 2020, now Pat. No. 10,933,840, which is a continuation of application No. 16/253,864, filed on Jan. 22, 2019, now Pat. No. 10,668,893, which is a continuation of application No. 15/501,720, filed as application No. PCT/JP2015/072179 on Aug. 5, 2015, now Pat. No. 10,449,926.

(30) Foreign Application Priority Data

| Aug. 6, 2014 | (JP) | 2014-160886 |
|---|---|---|
| May 19, 2015 | (JP) | 2015-102041 |

(51) Int. Cl.
  *B60R 22/03* (2006.01)
  *B60R 22/18* (2006.01)

(52) U.S. Cl.
  CPC . *B60N 2002/924* (2018.02); *B60R 2022/1818* (2013.01); *B60R 2022/266* (2013.01)

(56) References Cited

U.S. PATENT DOCUMENTS

| 10,449,926 | B2 | 10/2019 | Yamabe et al. |
| 10,668,893 | B2 * | 6/2020 | Yamabe ................ B60R 22/26 |
| 10,933,840 | B2 | 3/2021 | Yamabe et al. |
| 2006/0255642 | A1 | 11/2006 | Epaud et al. |
| 2008/0255731 | A1 | 10/2008 | Mita et al. |
| 2009/0322141 | A1 | 12/2009 | Matsushita |
| 2012/0261955 | A1 | 10/2012 | Iida et al. |
| 2013/0175792 | A1 | 7/2013 | Fukawatase et al. |
| 2016/0207496 | A1 | 7/2016 | Tanabe et al. |

FOREIGN PATENT DOCUMENTS

| JP | H03-122965 U | 12/1991 |
| JP | H06-060562 U | 8/1994 |
| JP | H06-211104 A | 8/1994 |
| JP | 2002-527283 A | 8/2002 |
| JP | 2004-306642 A | 11/2004 |
| JP | 2005-119442 A | 5/2005 |
| JP | 2008-261749 A | 10/2008 |
| JP | 2009-143379 A | 7/2009 |
| JP | 2010-069982 A | 4/2010 |
| JP | 2010-149832 A | 7/2010 |
| JP | 2012-006460 A | 1/2012 |
| JP | 2012-153162 A | 8/2012 |
| JP | 2013-086573 A | 5/2013 |
| JP | 2013-095357 A | 5/2013 |
| JP | 2014-019324 A | 2/2014 |
| WO | 00/21801 A1 | 4/2000 |
| WO | 2012/035619 A1 | 3/2012 |

OTHER PUBLICATIONS

Office Action issued in related application JP 2014-160886, dated Jan. 9, 2018, with machine generated English language translation, 4 pages.

Office Action issued in related application JP 2015-102041, dated Jan. 8, 2019, with machine generated English language translation, 12 pages.

Office Action issued in related application JP 2018-042141, dated Mar. 19, 2019, with machine generated English language translation, 9 pages.

* cited by examiner

SEATBELT ASSIST DEVICE AND VEHICLE SEAT

CROSS-REFERENCE TO RELATED APPLICATIONS

This application is a continuation of U.S. patent application Ser. No. 17/188,076, filed Mar. 1, 2021, which is a continuation of U.S. patent application Ser. No. 16/887,226, filed May 29, 2020, now U.S. Pat. No. 10,933,840, which is a continuation of U.S. patent application Ser. No. 16/253,864, filed Jan. 22, 2019, now U.S. Pat. No. 10,668,893, which is a continuation of U.S. patent application Ser. No. 15/501,720, filed Feb. 3, 2017, now U.S. Pat. No. 10,449,926, which is the National Stage Entry application of PCT Application No. PCT/JP2015/072179, filed Aug. 5, 2015, which claims the priority benefit of Japanese Patent Application No. 2014-160884, filed on Aug. 6, 2014, Japanese Patent Application No. 2014-160885, filed on Aug. 6, 2014, Japanese Patent Application No. 2014-160886, filed on Aug. 6, 2014, and Japanese Patent Application No. 2015-102041, filed on May 19, 2015, the contents of each being incorporated herein by reference.

BACKGROUND

The present disclosure relates to a seatbelt assist device and a vehicle seat. Particularly, the present disclosure relates to a seatbelt assist device and a vehicle seat capable of moving at least a portion of a seatbelt to a position easily reachable by a seated passenger's hand.

Typically, it has been known that in order for a seated passenger on a vehicle seat to easily take a seatbelt, a belt movable member provided at an upper portion of a seat back protrudes forward or upward to push a portion of the seatbelt forward or upward, for example, as described in Japanese Patent Publication JP 2004-306642A and Japanese Patent Publication JP 06-060562U.

In the seatbelt integrated vehicle seat described in JP 2004-306642A, the belt movable member is attached to an upper portion of a lateral portion of the seat back in a right-to-left direction, the upper portion being capable of housing the belt movable member. The seatbelt extends downward from a belt guide (a pullout port) provided at an upper position of the belt movable member in the lateral portion, and is placed on the lateral portion. The belt movable member is disposed to move between a housing position at which the belt movable member is housed in a housing portion of the seat back and an extension position at which the belt movable member is extended forward of the seat from the housing position to push a portion of the seatbelt forward. With the above-described configuration, workability in fastening of the seatbelt by the seated passenger is improved.

In the vehicle rear seat described in JP 06-060562U, the belt guide integrated belt movable member (a belt anchor) is attached to an upper portion of a center portion of the seat back in a right-to-left width direction, the upper portion being capable of housing the belt movable member. The seatbelt is guided by a belt guide on an upper surface of the center portion, and extends from the upper surface to a front surface of the center portion. Thus, the seatbelt is placed on the center portion. The belt movable member is rotatably disposed between a housing position at which the belt movable member is housed in a recessed housing portion of the seat back and a protruding position at which the belt movable member protrudes upward of the seat from the housing position to push a portion of the seatbelt upward. With the above-described configuration, the belt movable member can constantly protrude when the passenger is seated on a rear middle seat of a vehicle, and can be housed to ensure rearward visibility when no passenger is seated.

However, the belt movable member as described in JP 2004-306642A has a relatively-complicated extension mechanism configured to push a portion of the seatbelt forward, leading to a size increase of the mechanism. In the belt movable member as described in JP 06-060562U, size reduction is made using a rotation mechanism. However, since the belt movable member is of the belt guide integrated type, it is necessary to provide a mechanism configured to guide the seatbelt. This leads to a size increase. Moreover, since the belt movable member protrudes upward from the seat back after the passenger has seated, there is a likelihood that such a state interferes with the passenger to be seated.

Further, the belt movable member as described in JP 2004-306642A and JP 06-060562U protrudes forward or upward of the seat from the upper portion of the seat back to push a portion of the seatbelt forward or upward, and therefore, the seated passenger can easily take the seatbelt. For this reason, a design to further improve the workability in fastening of the seatbelt is desirable.

In addition, in the belt movable member as in JP 2004-306642A, when the seated passenger pulls the seatbelt toward one's body to fasten the seatbelt, if a portion of the belt movable member still contacts and pushes out the seatbelt, play of the seatbelt is caused. As a result, this might interfere with the performance of restraining the seated passenger by the seatbelt. For this reason, a design to ensure a favorable performance of restraining the seated passenger by the seatbelt is desirable.

Moreover, in the vehicle seat as in JP 2004-306642A and JP 06-060562U, no arrangement has been particularly made to use an indicator section such as sound or vibration to inform the seated passenger of the belt movable member being at the extension position (the protruding position). Thus, there is a possibility that the seated passenger accidentally contacts the belt movable member at the extension position (the protruding position) or that other members contact such a belt movable member.

SUMMARY

The present disclosure has been made in view of the above-described problems, and describes embodiments of a seatbelt assist device and a vehicle seat configured to use a simple compact configuration to move a seatbelt to a position easily reachable by a seated passenger. Moreover, the present disclosure provides an embodiment of a seatbelt assist device and a vehicle seat configured to improve workability in fastening of a seatbelt by a seated passenger. Further, the present disclosure describes an embodiment of a seatbelt assist device and a vehicle seat configured to ensure a favorable performance of restraining a seated passenger by a seatbelt. In addition, the present disclosure describes an embodiment of a seat belt assist device and a vehicle seat configured to move a portion of a seatbelt to a position easily reachable by a seated passenger and informing the seated passenger that the portion of the seatbelt has been moved.

The above-described problems are solved by one or more embodiments of the present seatbelt assist device. The present seatbelt assist device is a seatbelt assist device attached to a seat back as a backrest of a vehicle seat and being configured to move at least a portion of a seatbelt placed on the seat back to a position easily reachable by a seated passenger. The seatbelt assist device includes a rotary member attached to the seat back via a rotary shaft and configured to move between a housing position at which the rotary member is housed in the seat back and a protruding position at which the rotary member protrudes forward of the seat back to push out a portion of the seatbelt. The rotary member is disposed forward of a belt guide provided at an upper end of the seat back or at the periphery of the upper end of the seat back.

As described above, in order for the seated passenger to more easily take the seatbelt, the rotary member rotates to protrude forward of the seat to push out a portion of the seatbelt, and the rotary member and the belt guide are provided as separate bodies. Thus, the seatbelt assist device having a simple compact configuration is provided.

In this state, the rotary member may be attached to an upper portion of the seat back, and when moved to the protruding position, the rotary member may push out a portion of the seatbelt from behind of the portion of the seatbelt such that a clearance is formed between a front surface of the seat back and the seatbelt and between the upper end of the seat back and the seatbelt. With the above-described configuration, the rotary member forms the clearance between the front surface of the seat back and the seatbelt and between the upper end of the seat back and the seatbelt, and therefore, the seated passenger can much more easily take the seatbelt as compared to a typical case.

In this state, the rotary member may be attached to a lateral portion of the seat back in a right-to-left direction. The rotary member may be, via the rotary shaft, attached to a recessed housing portion provided at the lateral portion, the recessed housing portion being configured to house the rotary member. The rotary shaft may be pivotally supported to extend in the right-to-left direction in the recessed housing portion. As described above, the rotary shaft is pivotally supported to extend in the right-to-left direction in the recessed housing portion. Thus, the rotary member is compactly disposed using a rotation mechanism, and rotates in an upper-to-lower direction to easily push out the seatbelt.

In this state, a support plate configured to rotatably support the rotary member may be attached between the rotary member and the recessed housing portion. The rotary shaft may be attached to an upper end portion or lower end portion of the rotary member, and may be pivotally supported by the support plate. As described above, since the support plate is provided, clearance formation between the rotary member and the recessed housing portion can be reduced, leading to favorable appearance. Moreover, since the rotary shaft is attached to the upper end portion or lower end portion of the rotary member, the trajectory of rotation of the rotary member becomes larger, and the amount of movement of a portion of the seatbelt can be increased.

In this state, the rotary shaft may be attached to an upper end portion of the rotary member. The rotary member may be configured to rotate, when moving from the housing position to the protruding position, upward about the rotary shaft to protrude forward of the seat. The rotary member may be configured such that when moved to the protruding position, an angle of the rotary member with respect to the seat back is equal to or smaller than about 90 degrees. With the above-described configuration, the probability of tangling the seatbelt due to more upward rotation of the rotary member than necessary can be reduced. Moreover, even when the seated passenger accidentally pushes the rotary member upward, the rotary member can be biased toward the housing position by its own weight, and the probability of deforming the rotary member due to a load received from the outside can be reduced.

In this state, the rotary member may be disposed at a lower position of a lower end of a head rest as a head portion of the vehicle seat, and may be disposed at a lower position of the upper end of the seat back. With the above-described configuration, the rotary member is, in the present embodiment, disposed at a position more apart from the face of the seated passenger as compared to the typical case where the rotary member moves at a position near the face of the seated passenger. Thus, a feeling of discomfort of the seated passenger can be reduced.

In this state, the rotary member may be provided with a position restriction portion configured to restrict the position of the seatbelt in the right-to-left direction on a surface contacting the seatbelt when the rotary member is at the protruding position. With the above-described configuration, when the rotary member is at the protruding position at which a portion of the seatbelt is pushed out, displacement of the seatbelt in the right-to-left direction can be reduced by the position restriction portion.

In this state, the rotary member may be attached to the lateral portion of the seat back in the right-to-left direction, and one of right and left end portions of the rotary member close to a center portion of the seat back may be provided with a cutout portion cut out toward the other one of the right and left end portions farther from the center portion of the seat back. With the above-described configuration, when the seatbelt is pulled toward a seated passenger's body so that the seated passenger can fasten the seatbelt, contact between the rotary member at the protruding position and the seatbelt is easily reduced. Thus, a favorable performance of restraining the seated passenger by the seatbelt can be ensured without causing play of the seatbelt. Moreover, the probability of pinching a portion of the seatbelt between the rotary member at the protruding position and the seat back after fastening of the seatbelt is also reduced.

In this state, the rotary member may be attached to the recessed housing portion provided at the seat back, the recessed housing portion being configured to house the rotary member. A support plate configured to support the rotary member may be attached between the rotary member and the recessed housing portion, the support plate being configured to house the rotary member. A portion of the support plate corresponding to the cutout portion may be provided with a protruding raised portion protruding toward the rotary member. With the above-described configuration, when the rotary member is housed in the support plate, recess formation at the front surface of the seat back can be reduced. Thus, the probability of foreign material entry can be reduced. Moreover, the feeling of discomfort of the seated passenger is eliminated, and favorable appearance and merchantability are provided.

In this state, the rotary member may be attached to the recessed housing portion provided at the seat back, the recessed housing portion being configured to house the rotary member. The seatbelt assist device may further include a motor housed in the recessed housing portion, and a drive shaft interposed between the motor and the rotary member and configured to move up and down in association with driving of the motor to rotate the rotary member. With the above-described configuration, the driven type seatbelt assist device having a relatively simple compact configuration can be provided.

In this state, the rotary member may include an indicator section configured to inform that the rotary member is at the protruding position. With the above-described configuration, the seatbelt assist device can be provided, which is configured to use the indicator section such as illumination, sound, or vibration to inform the seated passenger that a portion of the seatbelt has been moved to the position easily reachable by the seated passenger.

In this state, the indicator section may include a light emission device attached to the rotary member or the periphery of the rotary member, and the indicator section may be configured to cause the light emission device to emit light when the rotary member is at the protruding position. As described above, since the light emission device informs the seated passenger by light emission, such informing is easily noticeable by the seated passenger.

A vehicle seat including the seatbelt assist device and the seat back as described above can be also provided. With the above-described configuration, the vehicle seat is provided, which is configured to use a simple compact configuration to move the seatbelt to the position easily reachable by the seated passenger.

Moreover, a vehicle seat including the seatbelt assist device and the seat back as described above can be also provided. The seat back includes a support portion configured to support the back of the seated passenger from behind of the back of the seated passenger, and a lateral portion positioned at the side of the support portion. At least one of front surfaces of the support portion and the lateral portion has an opposing region facing a belt portion of the seatbelt when the seatbelt is at a standby position in an unlocked state. At least a portion of the opposing region is provided with a space formation portion formed by a recessed or raised portion. When the seatbelt is at the standby position in the unlocked state, the space formation portion forms a space between the opposing region and the belt portion. In the above-described configuration, the space formation portion formed by the recessed or raised portion is provided in at least a portion of the opposing region facing the belt portion of the seatbelt. With such a space formation portion, the space (a clearance) is formed between the opposing region and the belt portion when the seatbelt is at the standby position in the unlocked state. Using such a space (simply, inserting a finger into the space), the belt portion can be more easily grasped.

In this state, the space formation portion may be formed by the recessed portion. When the seatbelt is at the standby position in the unlocked state, one end of the recessed portion in a horizontal width direction may be positioned farther from one end of the belt portion in a width direction than from the other end of the belt portion in the width direction, and the other end of the recessed portion in the horizontal width direction may be positioned between one end and the other end of the belt portion in the width direction. In the above-described configuration, the recessed portion is provided at the position close to one of the ends of the belt portion of the seatbelt in the width direction. According to such a configuration, the finger is, for example, inserted into the space of the recessed portion from one end side of the belt portion in the width direction so that the belt portion can be easily grasped.

According to an embodiment, the rotary member rotates to protrude forward of the seat to push out a portion of the seatbelt, and the rotary member and the belt guide are provided as separate bodies. Thus, the seatbelt assist device having a simple compact configuration can be provided. According to an embodiment, the seated passenger can much more easily take the seatbelt as compared to a typical implementation. According to an embodiment, the rotary member is compactly disposed using the rotation mechanism, and rotates in the upper-to-lower direction to easily push out the seatbelt.

According to an embodiment, clearance formation between the rotary member and the recessed housing portion can be reduced, leading to a more favorable appearance. Moreover, the trajectory of rotation of the rotary member becomes larger, and the amount of movement of the seatbelt can be ensured. According to an embodiment, the probability of tangling the seatbelt can be reduced. Moreover, the rotary member can be biased toward the housing position by its own weight, and the probability of deforming the rotary member due to the load received from the outside can be reduced. According to an embodiment, the rotary member is disposed at the position more apart from the face of the seated passenger as compared to a typical implementation. Thus, the feeling of discomfort of the seated passenger can be reduced. According to an embodiment, displacement of the seatbelt in the right-to-left direction can be reduced by the position restriction portion.

According to an embodiment, when the seatbelt is attached to a buckle, it is easy to reduce the state in which the rotary member at the protruding position remains to push out a portion of the seatbelt. Thus, a favorable performance of restraining the seated passenger by the seatbelt can be ensured. Moreover, the probability of pinching a portion of the seatbelt between the rotary member at the protruding position and the seat back is also reduced. According to an embodiment, recess formation at the front surface of the seat back can be reduced. Thus, the probability of foreign material entry can be reduced. Moreover, the feeling of discomfort of the seated passenger is reduced, and favorable appearance and merchantability are provided. According to an embodiment, a driven type seatbelt assist device having a relatively simple compact configuration can be provided.

According to an embodiment, the seatbelt assist device can be provided, which is configured to use the indicator section such as illumination, sound, or vibration to inform the seated passenger that a portion of the seatbelt has been moved to the position easily reachable by the seated passenger. According to an embodiment, since the light emission device informs the seated passenger by light emission, such informing is easily noticeable by the seated passenger. According to an embodiment, the vehicle seat is provided, which is configured to use the simple compact configuration to move the seatbelt to the position easily reachable by the seated passenger. According to an embodiment, the vehicle seat is provided, which is configured to use a relatively simple configuration to realize easy grasping of the belt portion.

DETAILED DESCRIPTION

First to fifth embodiments of the present disclosure are described below with reference to FIGS. 1 to 17.

First Embodiment of Belt Assist Device

The present embodiment relates to a vehicle seat including a seatbelt assist device attached to a lateral portion of a seat back and being configured to move a portion of a seatbelt placed on the lateral portion to a position easily reachable by a seated passenger. The seatbelt assist device includes a rotary member attached to a recessed housing portion of the lateral portion via a rotary shaft and configured to rotate up and down between a housing position at which the rotary member is housed in the seat back and a protruding position at which the rotary member rotates to protrude forward of the seat back to push out a portion of the seatbelt. The rotary member is disposed forward of a belt guide provided at the periphery of an upper end of the seat back. Note that in the description herein, a passenger seating side with respect to the seat back of the vehicle seat is referred to as a front side.

Figure 1:
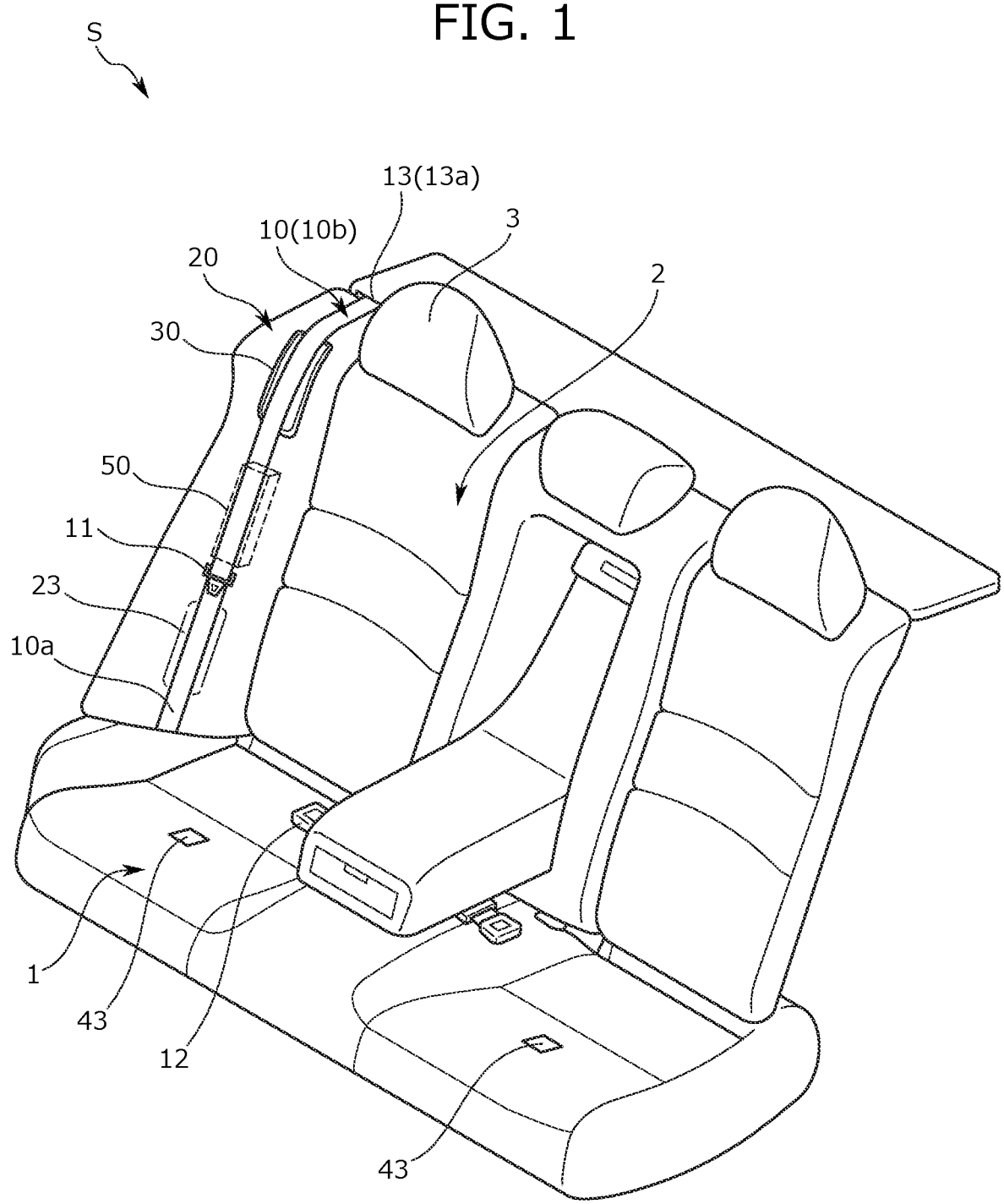
FIG. 1 is an external perspective view of a vehicle seat of an embodiment.

A vehicle seat S of the present embodiment is a rear seat equivalent to a back seat of a vehicle, for example. Note that the vehicle seat S can be also utilized as a middle seat in the second row in a vehicle including three rows of seats in a vehicle front-to-back direction. As illustrated in FIG. 1, the vehicle seat S generally includes a seat body having a seat cushion 1, a seat back 2, and a head rest 3; and a seatbelt assist device 30 (hereinafter referred to as "belt assist devices 30") attached to an upper portion of a lateral portion of the seat back 2 in a right-to-left direction. Note that a belt guide 13 configured to guide an extension direction of a seatbelt 10 is provided at the periphery of an upper end of the lateral portion of the seat back 2 in the right-to-left direction, specifically a back portion with respect to the lateral portion in the right-to-left direction.

The vehicle seat S is a seat utilizing the belt assist device 30 to move at least a portion of the seatbelt 10 placed on the lateral portion of the seat back 2 in the right-to-left direction to a position easily reached by a seated passenger's hand. Specifically, the vehicle seat S is a seat configured to operate the belt assist device 30 to push out a portion of the seatbelt 10 from behind such that a clearance is formed between a front surface of the seat back 2 and the seatbelt 10 and between an upper end of the seat back 2 and the seatbelt 10. Details are described below.

As illustrated in FIG. 1, the seat cushion 1 is a seating portion configured to support the passenger from below, and is configured such that a cushion pad placed on a cushion frame (not shown) as a framework is covered with a cover material from above the cushion pad. The seat back 2 is a backrest configured to support the back of the passenger from behind, and is configured such that a cushion pad placed on a back frame (not shown) as a framework is covered with a cover material. The lateral portion of the seat back 2 in the right-to-left direction is formed as a back side portion 20 configured to support an upper side portion of the seated passenger. The head rest 3 is a head portion configured to support the head of the passenger from behind, and is configured such that a cushion pad placed on a pillar (not shown) as a core is covered with a cover material.

The seatbelt 10 is a band-shaped member configured to restrain the upper body of the passenger, and is placed to extend from an upper surface to a front surface of the back side portion 20 of the seat back 2. A tongue plate 11 is slidably attached to the seatbelt 10, and is fitted into a buckle 12 provided at a predetermined position of the seat cushion 1. A lower end side 10a of the seatbelt 10 is pulled in between a lower end of the seat back 2 and a back end of the seat cushion 1, and then, is fixed to a predetermined position of a vehicle body member behind the seat body. Moreover, an upper end side 10b is slidably inserted into the belt guide 13 behind an upper end of the back side portion 20, and is pulled toward a location behind a back surface of the seat back 2 from a back portion of the upper end of the seat back 2. Then, the pulled end portion is attached to an automatic winding device (not shown).

The belt guide 13 is a member made of hard resin and configured to guide the extension direction of the seatbelt 10 toward the front side, and is provided with a guide hole 13a into which the seatbelt 10 can be inserted. The belt assist device 30 is disposed at a front position of the belt guide 13.

Figure 2:
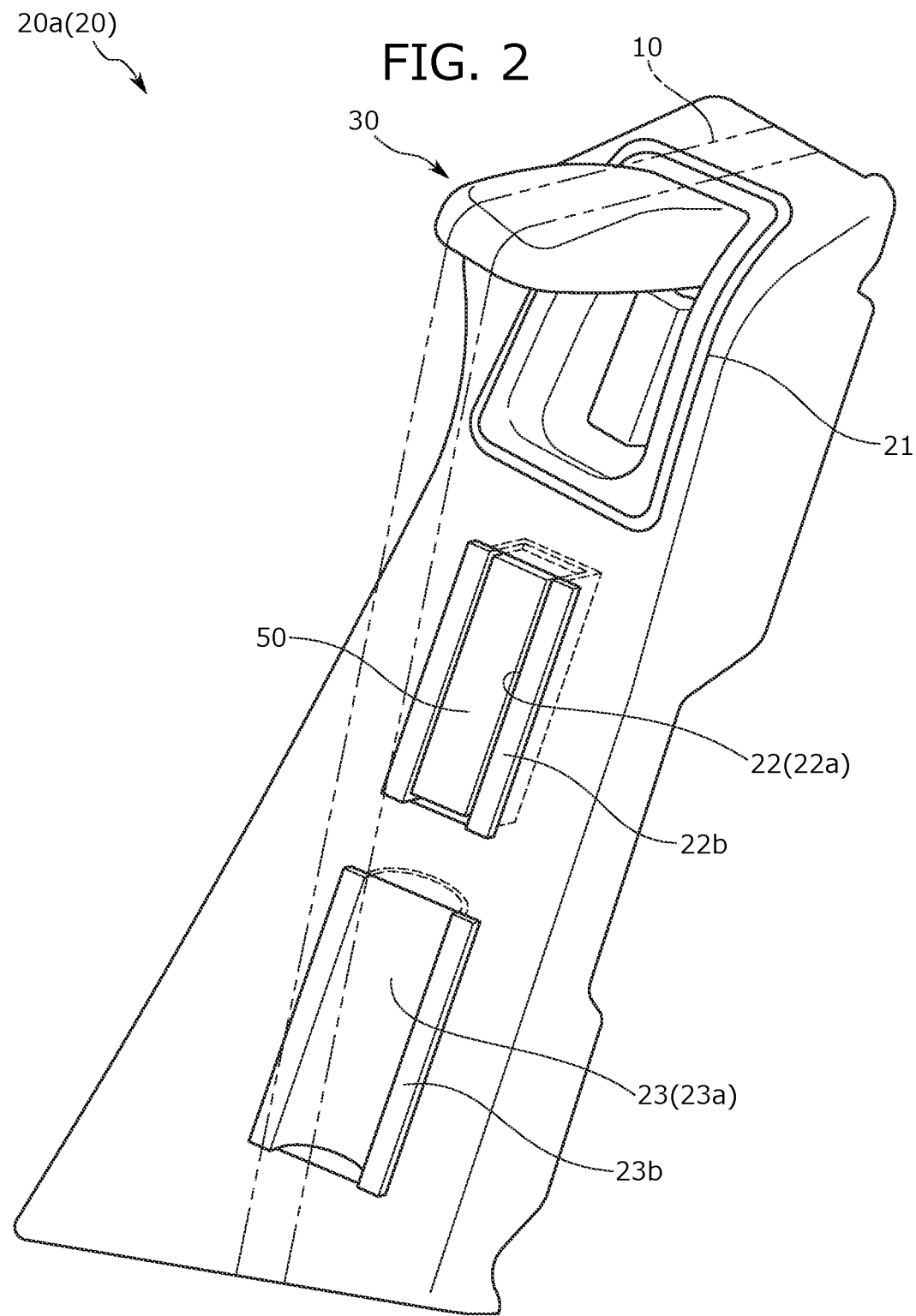
FIG. 2 is an enlarged view of a main portion of FIG. 1, and is an external perspective view of a belt assist device.

The back side portion 20 is configured such that a cushion pad 20b (FIG. 15) placed on a resin side base 20a is covered with a cover material 20c. As illustrated in FIG. 2, the side base 20a includes a frame member having a substantially inverted L-shaped longitudinal section, and is configured to house the belt assist device 30 and an airbag module 50. The side base 20a is provided with a recessed housing portion 21 recessed backward from an upper wall portion to a front wall portion at an upper position of the side base 20a, a recessed airbag housing portion 22 recessed backward at the front wall portion at a lower position of the recessed housing portion 21, and a belt facing recessed portion 23 recessed backward at the front wall portion at a lower position of the recessed airbag housing portion 22.

Figure 3:
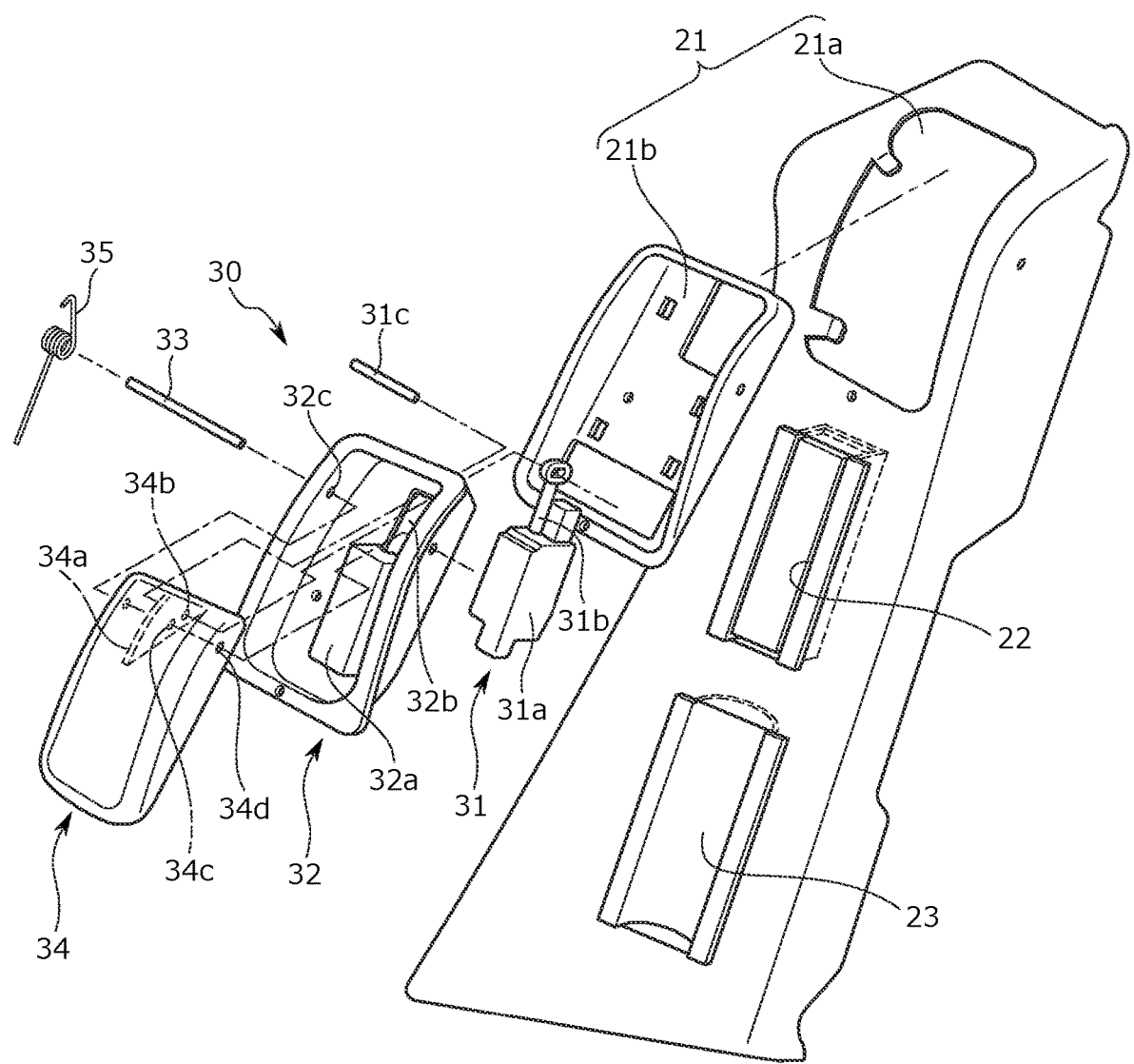
FIG. 3 is an exploded perspective view of the belt assist device.

As illustrated in FIG. 3, the recessed housing portion 21 is formed in such a manner that a recessed housing plate 21b is, by snap-fitting, fixed to a substantially rectangular opening 21a provided at the side base 20a. Similarly, the recessed airbag housing portion 22 is formed in such a manner that a recessed housing plate 22b is, by snap-fitting, fixed to a substantially rectangular opening 22a provided at the side base 20a, and the belt facing recessed portion 23 is formed in such a manner that a recessed housing plate 23b is, by snap-fitting, fixed to a substantially rectangular opening 23a provided at the side base 20a. In the above-described configuration, the belt assist device 30 is housed from the front side in the recessed housing portion 21, and the airbag module 50 is housed from the front side in the recessed airbag housing portion 22, as illustrated in FIGS. 2 and 3.

As illustrated in FIG. 1, the belt facing recessed portion 23 is a recessed portion elongated along the extension direction of the seatbelt 10, and is disposed at a position facing a portion of the seatbelt 10. Moreover, the belt facing recessed portion 23 is formed to be wider than the seatbelt 10. A clearance is formed between the belt facing recessed portion 23 and the seatbelt 10, and therefore, arrangement is made such that a child as the seated passenger can grasp the seatbelt 10 while inserting her hand into the clearance, for example.

As illustrated in FIG. 2, the belt assist device 30 is an assist device configured to push a portion of the seatbelt 10 forward and upward. As illustrated in FIG. 3, the belt assist device 30 generally includes a motor 31 housed in the recessed housing portion 21, a recessed support plate 32 fixed, by snap-fitting, to the recessed housing portion 21 to cover the motor 31 from the front side, a rotary shaft 33 pivotally supported in the support plate 32, a rotary member 34 attached via the rotary shaft 33, and an auxiliary spring 35 configured to bias the rotary member 34 toward a protruding position.

Figure 4A:
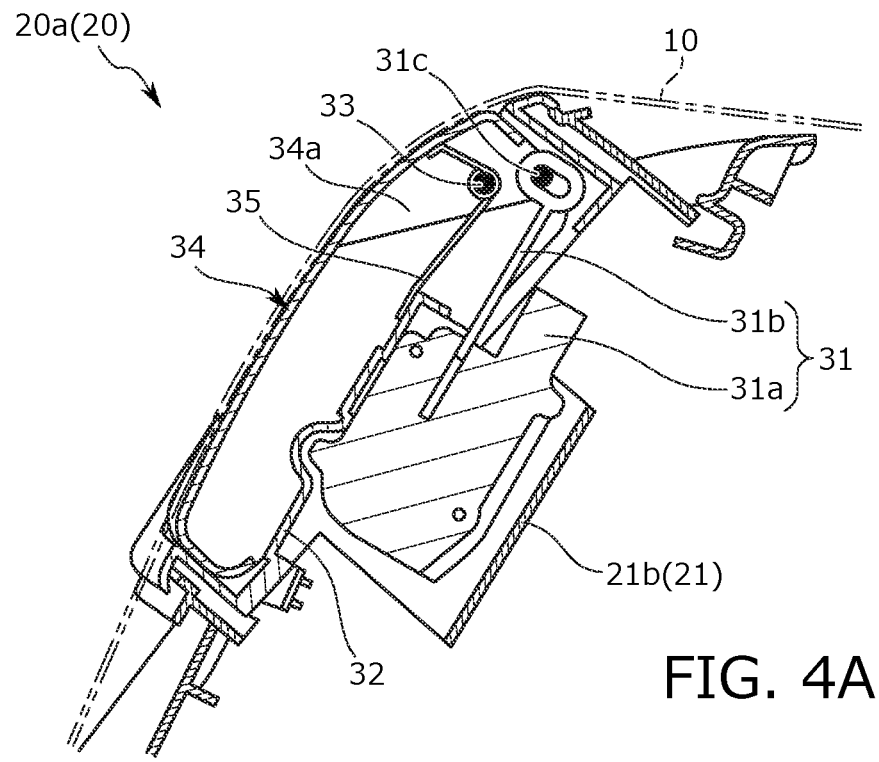
FIG. 4A is a side cross-sectional view of the belt assist device, and is a view of a housing position.
Figure 4B:
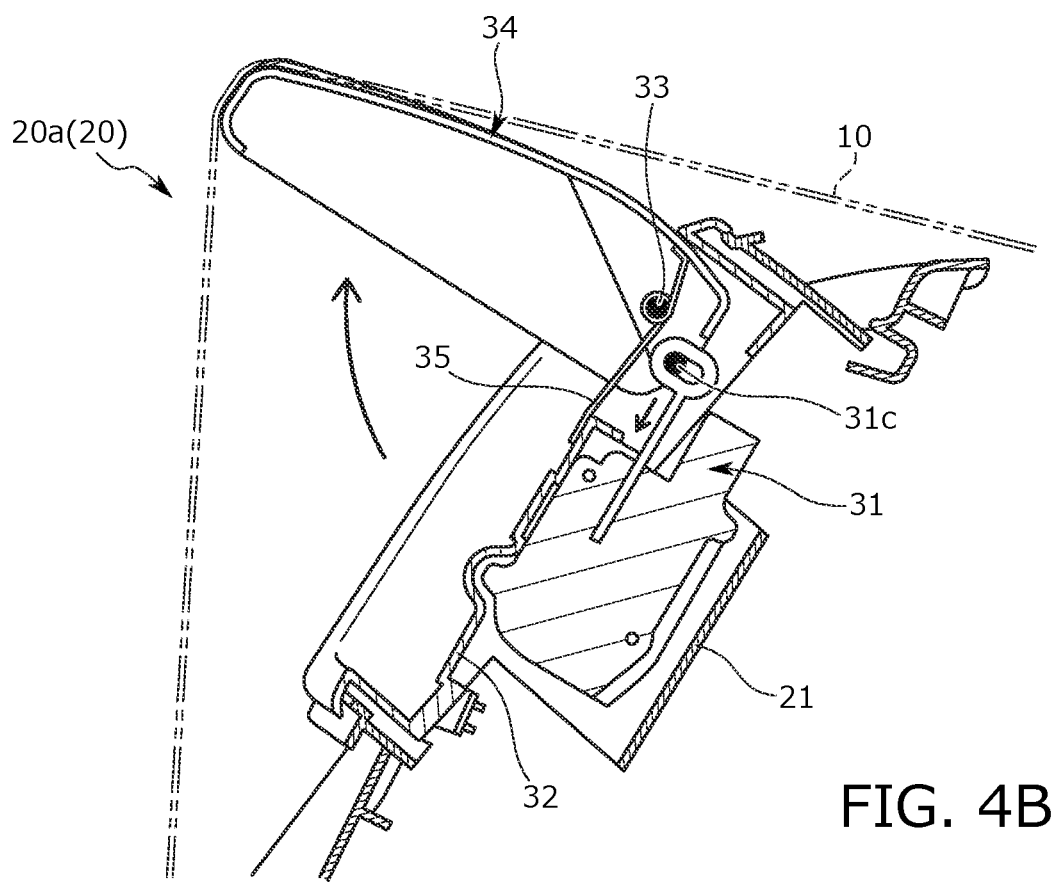
FIG. 4B is a view of a protruding position of the belt assist device.

As illustrated in FIGS. 4A and 4B, the belt assist device 30 is a device configured to rotate the rotary member 34 between a housing position at which the rotary member 34 is housed in the recessed housing portion 21 of the seat back 2 and the protruding position at which the rotary member 34 protrudes forward of the seat back 2 to push out a portion of the seatbelt 10. The belt assist device 30 is configured as follows: when the rotary member 34 is at the housing position as illustrated in FIG. 4A, the belt assist device 30 is substantially integrally housed without protruding beyond an outer surface of the seat back 2; and when the rotary member 34 is at the protruding position illustrated in FIG. 4B, the belt assist device 30 partially protrudes beyond the outer surface of the seat back 2 to push a portion of the seatbelt 10 forward and upward.

As illustrated in FIGS. 3, 4A, and 4B, the motor 31 is a stroke motor configured to move up and down the rotary member 34, and is attached to an attachment target portion 32a provided in the support plate 32. The motor 31 generally includes a motor body 31a and a cylinder 31b attached to move up and down relative to the motor body 31a, and is connected to a vehicle power source 42 via a drive circuit 41 (described below). When drive power is supplied to the motor body 31a, the cylinder 31b is configured to lower to a predetermined lowered position in response to each sensor (described below) and to lift to a predetermined lifted position (a standby position) in response to each sensor. When supply of the drive power is stopped, the cylinder 31b is configured to be stopped and held at a stop position.

A support shaft 31c extending in the right-to-left direction is pivotally supported in the state in which the support shaft 31c is inserted into an opening provided at a protruding tip end portion of the cylinder 31b. The support shaft 31c passes through an opening 32b provided at a back surface of the support plate 32, and then, is further pivotally supported by a support hole 34*b* provided at a back surface of the rotary member 34. With the above-described configuration, the motor 31 can move up and down the cylinder 31*b* to operate the rotary member 34 via the support shaft 31*c* in an interlocking manner.

The support plate 32 is a resin plate configured to rotatably support the rotary member 34, and a pair of support holes 32*c* configured to pivotally support the rotary shaft 33 are formed respectively at right and left lateral wall portions of the support plate 32. The rotary shaft 33 extends in the right-to-left direction, and is further pivotally supported by a shaft hole 34*c* and a pair of shaft holes 34*d* of the rotary member 34 with the rotary shaft 33 being pivotally supported by the pair of support holes 32*c*. The rotary shaft 33 is attached to upper portions (upper end portions) of the support plate 32 and the rotary member 34.

As illustrated in FIG. 3, the rotary member 34 includes a substantially recessed resin plate. The rotary member 34 is a member configured to push out a portion of the seatbelt 10 from behind, and is rotatably provided between the housing position of FIG. 4A and the protruding position of FIG. 4B. A reinforcement rib 34*a* is formed to extend backward from a center portion of a back surface of a front wall portion of the rotary member 34 in the right-to-left direction. The reinforcement rib 34*a* is provided with the support hole 34*b* configured to pivotally support the support shaft 31*c* and the shaft hole 34*c* configured to pivotally support the rotary shaft 33. Moreover, the pair of shaft holes 34*d* configured to further pivotally support the rotary shaft 33 are formed respectively at right and left lateral wall portions of the rotary member 34.

In the above-described configuration, the rotary member 34 is disposed to move to the protruding position of FIG. 4B in such a manner that the rotary member 34 rotates upward about the rotary shaft 33 from the housing position of FIG. 4A to protrude forward of the seat. The rotary member 34 is configured such that an angle with the seat back 2 is equal to or smaller than about 90 degrees when the rotary member 34 has moved to the protruding position.

Moreover, in the above-described configuration, the rotary member 34 includes the right and left lateral wall portions each bent continuously from a corresponding one of right and left end portions of the front wall portion and extending backward. Thus, when the rotary member 34 moves from the housing position to the protruding position or when the rotary member 34 is at the protruding position, pinching of the seatbelt 10 can be reduced.

Further, in the above-described configuration, the reinforcement rib 34*a* is formed on the back surface of the front wall portion of the rotary member 34. The reinforcement rib 34*a* pivotally supports the support shaft 31*c* and the rotary shaft 33. Thus, rigidity of the rotary member and attachment rigidity of the rotary member can be improved.

In addition, in the above-described configuration, a curvature radius is provided to a corner portion between the front wall portion and an upper wall portion of the rotary member 34 and a corner portion between the front wall portion and a bottom wall portion of the rotary member 34. Thus, these corner portions have no sharp edge, and therefore, safety can be ensured. Moreover, rigidity of the corner portions can be ensured, leading to favorable moldability.

Moreover, in the above-described configuration, a pair of protruding portions (not shown) protruding forward are formed respectively at right and left end portions of a front surface of the rotary member 34. The pair of protruding portions functions as a position restriction portion configured to sandwich a portion of the seatbelt 10 in the right-to-left direction when the rotary member 34 is at the protruding position, leading to reduction in displacement of the seatbelt 10 in the right-to-left direction.

Further, in the above-described configuration, a front surface of the front wall portion as an outer surface of the rotary member 34 is covered with the same cover material as that of the back side portion 20. Thus, a feeling of discomfort of the seated passenger between the back side portion 20 and the rotary member 34 (the belt assist device 30) can be reduced, and a favorable appearance is also provided. Note that the resin rotary member 34 and the cover material may be integrally molded, or may be bonded together.

Control Section of Belt Assist Device

Figure 5:
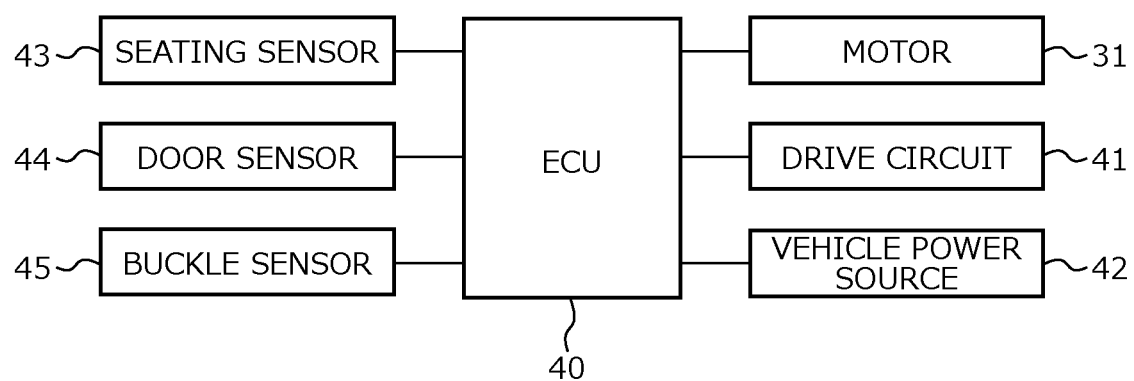
FIG. 5 is a block diagram of an electric structure of the belt assist device.

As illustrated in FIG. 5, the belt assist device 30 includes an electronic control unit (ECU) circuit 40 as a control section, the drive circuit 41 configured to supply the drive power to the motor 31, and the vehicle power source 42 connected to the motor via the drive circuit.

The ECU 40 is configured to control the drive power supplied from the drive circuit 41 to the motor 31 to control ON or OFF of current of an electromagnetic clutch (not shown), thereby controlling lifting/lowering of the motor 31, i.e., rotation of the rotary member 34. Moreover, the ECU 40 is connected to a seating sensor 43 provided at the seat cushion 1 and configured to detect that the passenger has been seated on the seat body, a door sensor 44 provided at a vehicle door and configured to detect that the vehicle door has been closed, and a buckle sensor 45 provided at each buckle 12 and configured to detect that the tongue plate 11 has been coupled with the buckle 12. In the above-described configuration, the ECU 40 controls operation of the motor 31, i.e., operation of the rotary member 34, based on a signal input from each sensor.

Figure 6:
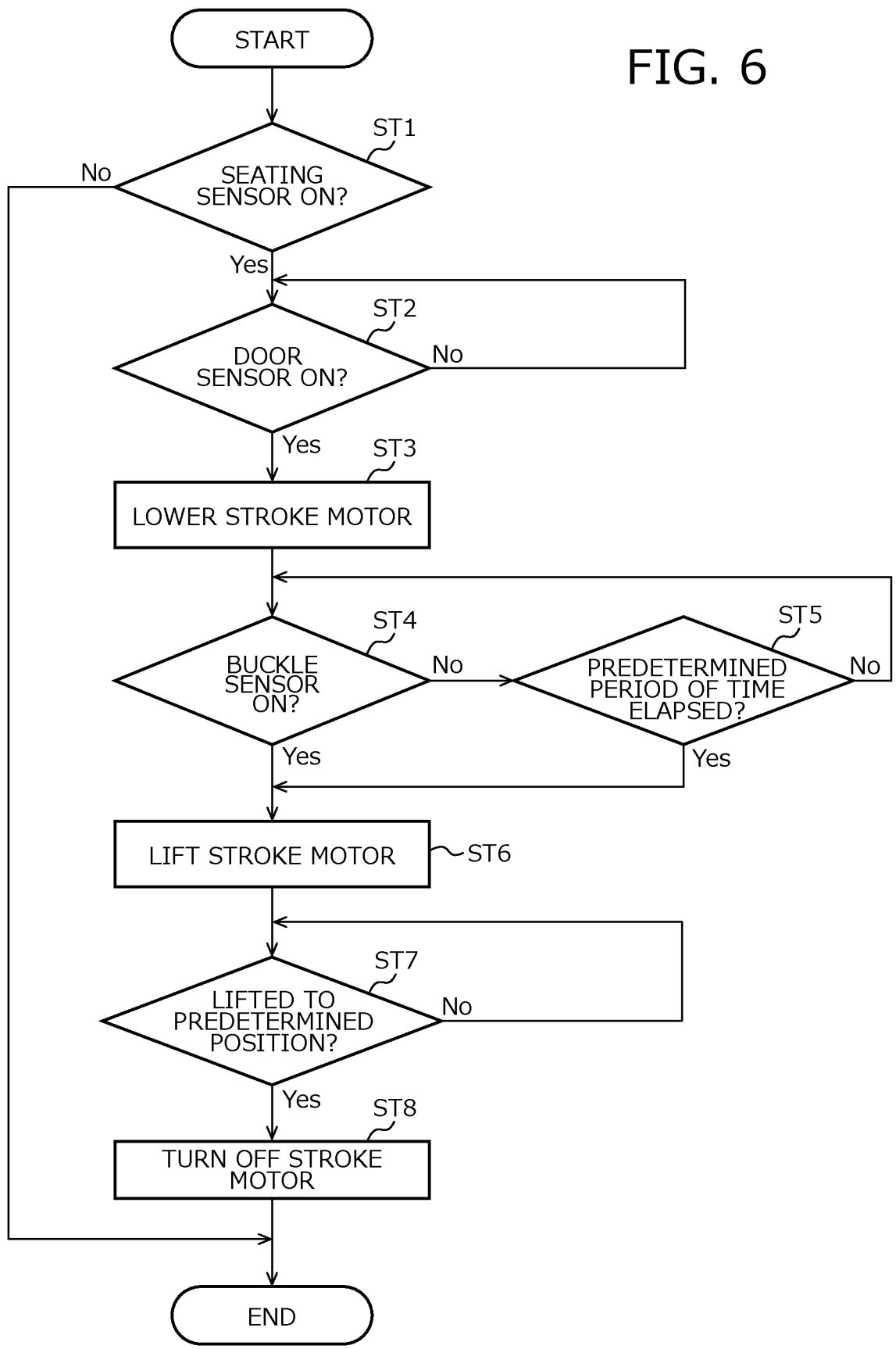
FIG. 6 is a flowchart of an example method of control of the belt assist device.

Processing of a flowchart of FIG. 6 is repeatedly executed during a period for which, e.g., control is made by the ECU 40 to turn on an ignition switch of a vehicle. In a normal state, the belt assist device 30 is at the housing position illustrated in FIG. 4A, and is integrally housed without protruding beyond the outer surface of the seat back 2 as illustrated in FIG. 1. The seatbelt 10 substantially closely contacts the outer surface of the seat back 2.

When the processing of the flowchart of FIG. 6 begins, it is, at a step ST1, first determined whether or not the seating sensor 43 is ON. When the seating sensor 43 is not ON (step ST1: No), nobody is seated on the vehicle seat S. Thus, an OFF signal is transmitted to the drive circuit 41, and supply of the drive power from the drive circuit 41 to the motor 31 is stopped to terminate the processing.

When the seating sensor 43 is ON (step ST1: Yes), it is, at a step ST2, further determined whether or not the door sensor 44 is ON. When the door sensor 44 is not ON (step ST2: No), the passenger has been seated on the vehicle seat S, but the vehicle door is not closed. Thus, the step ST2 is repeated until the vehicle door is closed.

When the door sensor 44 is ON (step ST2: Yes), it is determined that the passenger has been seated on the vehicle seat S, and that the vehicle door has been closed. However, it is determined that the seatbelt 10 has not been fastened yet. Thus, at a step ST3, an ON signal is transmitted to the drive circuit 41, and the drive power is supplied from the drive circuit 41 to the motor 31. Accordingly, the motor 31 (the cylinder 31*b*) lowers to the predetermined lowered position, and such lowering movement is transmitted to the rotary member 34 via the support shaft 31*c*. Then, the rotary member 34 rotates upward about the rotary shaft 33 to the protruding position. The rotary member 34 rotates upward to protrude forward, thereby pushing the seatbelt 10 forward and upward.

Next, at a step ST4, it is determined whether or not the buckle sensor 45 at a position corresponding to the seating sensor 43 in an ON state is ON. When the buckle sensor 45 is not ON (step ST4: No), it is determined that the passenger has been seated but the seatbelt 10 has not been fastened yet, and the drive power is continuously supplied from the drive circuit 41 to the motor 31. Note that when the motor 31 (the cylinder 31*b*) has already lowered to the lowered position, the motor 31 (the cylinder 31*b*) is held at the lowered position even when supply of the drive power is stopped.

The step ST4 is repeated until the buckle sensor 45 is turned on or until a predetermined period of time is elapsed after start of lowering of the motor 31 at a step ST5. Accordingly, the motor 31 (the cylinder 31*b*) is held at the predetermined lowered position, and the rotary member 34 is held at the protruding position. The seatbelt 10 is held with the seatbelt 10 being pushed out by the rotary member 34. Note that at this point, an announcement such as "please fasten the seatbelt," warning sound, or vibration may be simultaneously emitted.

When the buckle sensor 45 is ON (step ST4: Yes), the seated passenger on the vehicle seat S has fastened the seatbelt 10. Thus, at a step ST6, another ON signal is transmitted to the drive circuit 41, and the drive power is supplied from the drive circuit 41 to the motor 31. Accordingly, the motor 31 (the cylinder 31*b*) lifts to the predetermined lifted position (the standby position), and such lifting movement is transmitted to the rotary member 34 via the support shaft 31*c*. Then, the rotary member 34 rotates downward from the protruding position to the housing position. Alternatively, when the predetermined period of time has been elapsed at the step ST5, the seated passenger does not fasten the seatbelt 10 yet, but the processing proceeds to a step ST6.

When the motor 31 (the cylinder 31*b*) has lifted to the predetermined lifted position (the standby position) (step ST7: Yes), an OFF signal is transmitted to the drive circuit 41 at a step ST8. Then, supply of the drive power from the drive circuit 41 to the motor 31 is stopped. Accordingly, the motor 31 is held at the lifted position, and the rotary member 34 is held at the housing position. Note that when the motor 31 does not lift to the lifted position (step ST7: No), the step ST7 is repeated. The processing of FIG. 6 ends through the steps ST1 or ST8 described above.

By the above-described processing flow, before the seated passenger on the vehicle seat S fastens the seatbelt 10, the belt assist device 30 can move at least a portion of the seatbelt 10 to the position easily reached by the seated passenger's hand. After the seated passenger has fastened the seatbelt 10, the belt assist device 30 is integrally housed in the vehicle seat S without causing obstruction.

Note that in the above-described processing flow, determination on both of the seating sensor 43 and the door sensor 44 is required at the steps ST1, ST2, but the embodiments of the present disclosure are not limited to such a configuration. Needless to say, determination on any one of the seating sensor 43 or the door sensor 44 may be omitted. Moreover, when the predetermined period of time has been elapsed at the step ST5, the processing also proceeds to the step ST6 to start lifting of the motor 31 to start movement of the rotary member 34 from the protruding position to the housing position. However, it may be configured such that the processing does not proceed to the step ST6 until the buckle sensor 45 is turned on at the step ST4, needless to say.

Second Embodiment of Belt Assist Device

Figure 7:
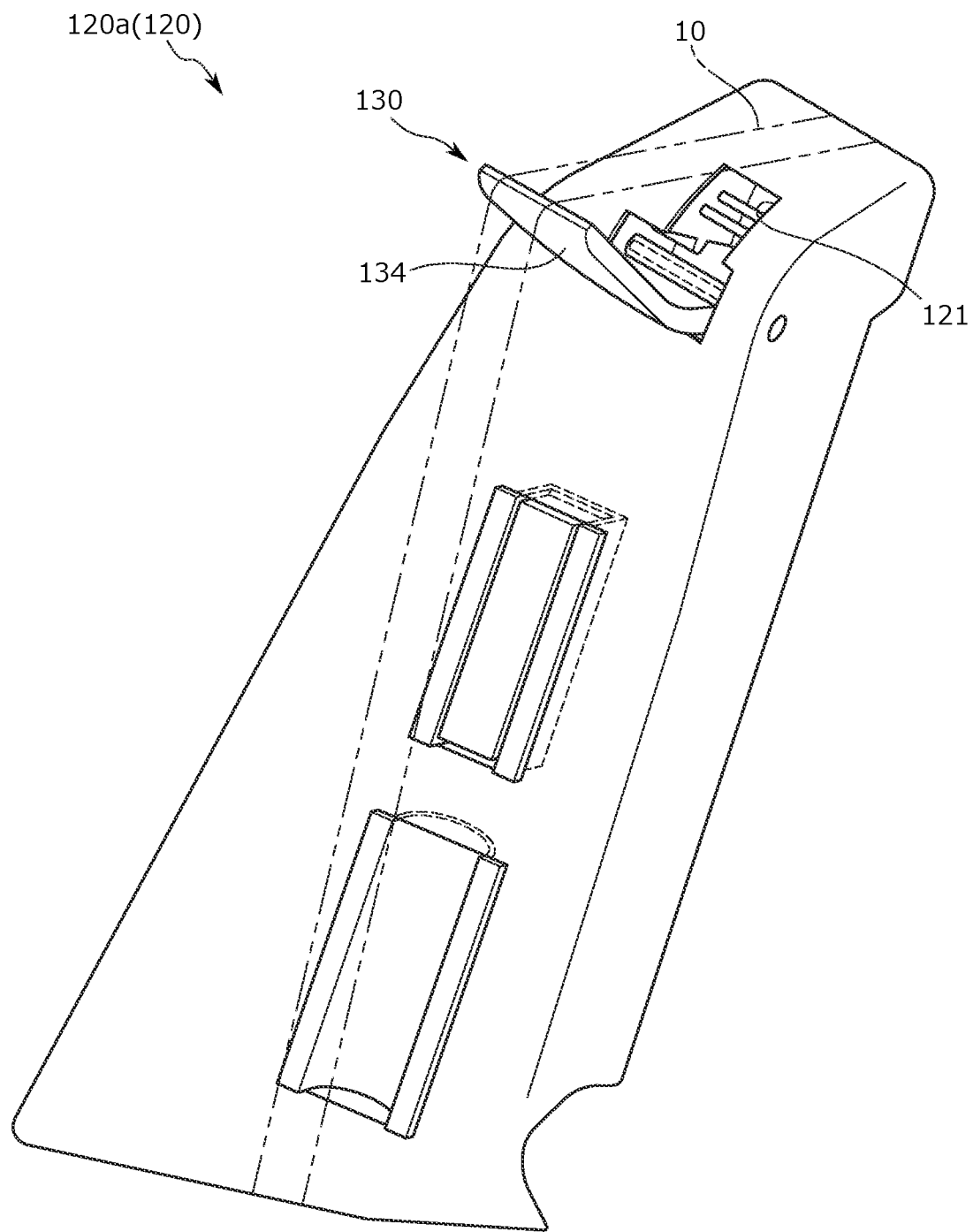
FIG. 7 is an external perspective view of a belt assist device of a second embodiment.

Next, the second embodiment of the belt assist device is described with reference to FIGS. 7 to 9. Note that contents overlapping with those of the above-described belt assist device 30 will not be repeated. A belt assist device 130 of the second embodiment is attached to an upper portion of a back side portion 120.

The belt assist device 130 generally includes a support 132 fixed, by snap-fitting, to a substantially inverted T-shaped opening 121*a* provided at a side base 120*a*, a rotary shaft 133 pivotally supported in the support 132, and a rotary member 134 attached via the rotary shaft 133. Note that a drive motor (not shown) configured to drive the rotary member 134 is attached to the rotary member 134.

Figure 9A:
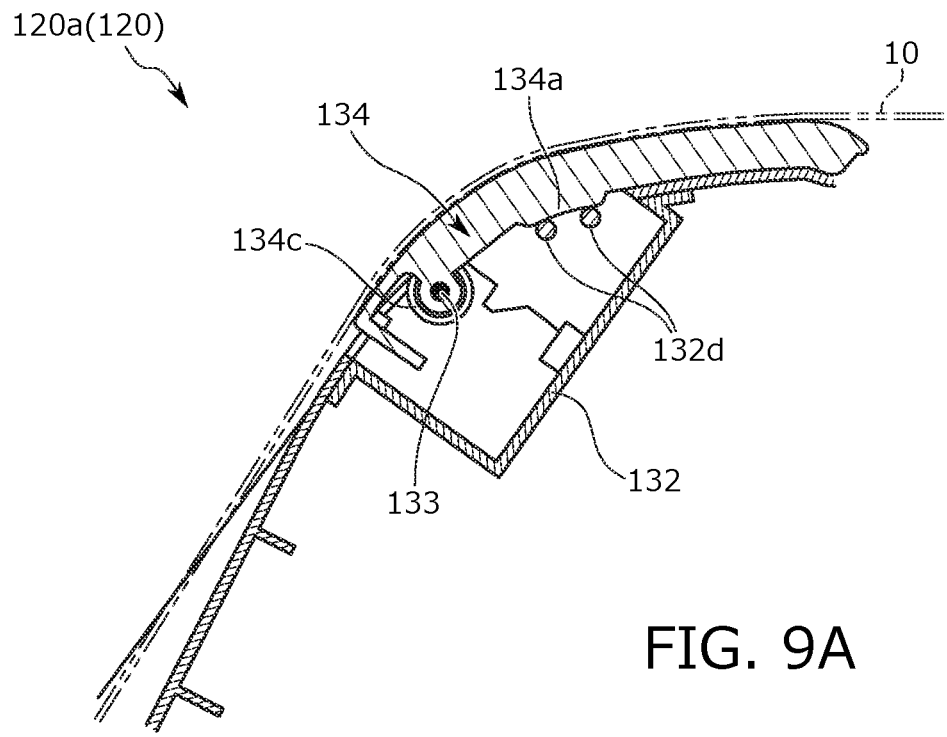
FIG. 9A is a side cross-sectional view of the belt assist device of the second embodiment, and is a view of a housing position.
Figure 9B:
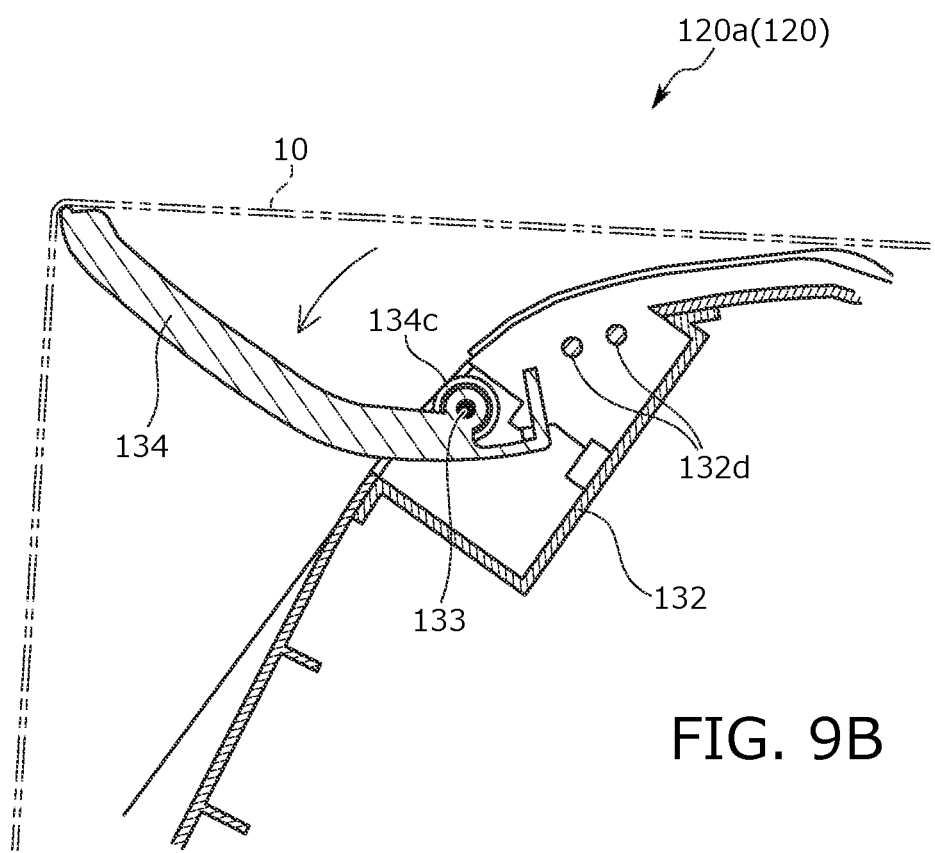
FIG. 9B is a view of a protruding position of the belt assist device.

As illustrated in FIGS. 9A and 9B, the belt assist device 130 is a device configured to rotate the rotary member 134 between a housing position at which the rotary member 134 is housed in a housing portion 121 of the back side portion 120 and a protruding position at which the rotary member 134 protrudes forward of the back side portion 120 to push out a portion of a seatbelt 10.

The support 132 is a resin body configured to rotatably support the rotary member 134, and a pair of support holes 132*c* configured to pivotally support the rotary shaft 133 are formed respectively at right and left lateral wall portions of the support 132. Moreover, a plurality of substantially columnar coupling portions 132*d* coupling the right and left lateral wall portions together are provided at an upper portion of the support 132. The rotary shaft 133 extends in a right-to-left direction, and is further pivotally supported by a shaft hole 134*c* of the rotary member 134 with the rotary shaft 133 being pivotally supported by the pair of support holes 132*c*. Further, the rotary shaft 133 is attached to lower portions (lower end portions) of the support 132 and the rotary member 134.

Figure 8:
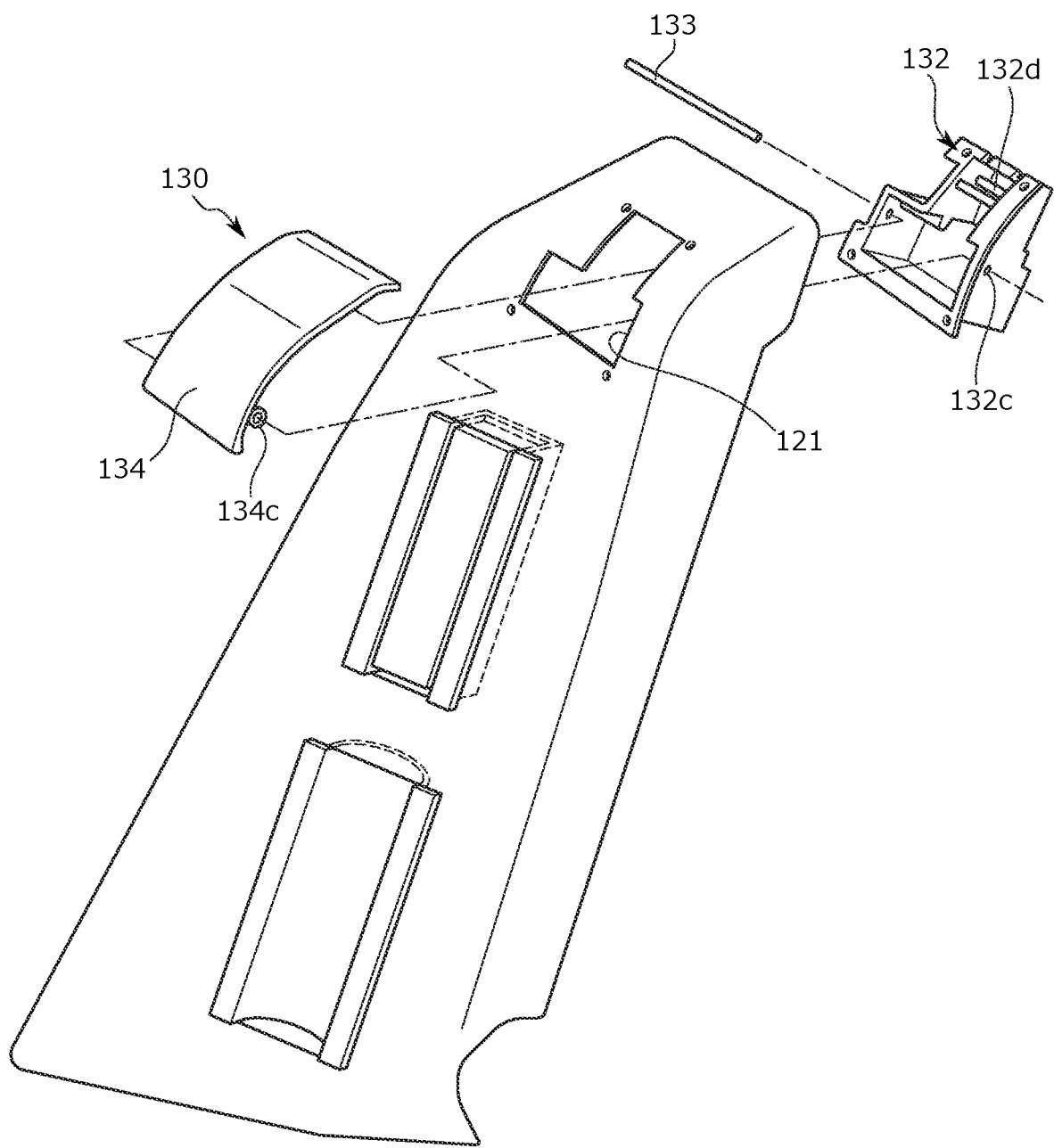
FIG. 8 is an exploded perspective view of the belt assist device of the second embodiment.

As illustrated in FIG. 8, the rotary member 134 is a member including a resin plate and configured to push out a portion of the seatbelt 10 from behind. The rotary member 134 is rotatably provided between the housing position of FIG. 9A and the protruding position of FIG. 9B. A reinforcement rib 134*a* illustrated in FIGS. 9A and 9B is formed to extend backward from a center portion of a back surface of the rotary member 134 in the right-to-left direction. Moreover, the shaft hole 134*c* extending in the right-to-left direction is, across the right-to-left direction, integrally attached to a lower portion of the back surface of the rotary member 34. The rotary shaft 133 is inserted into the shaft hole 134*c* across the right-to-left direction.

In the above-described configuration, the rotary member 134 is disposed to move to the protruding position of FIG. 9B in such a manner that the rotary member 134 rotates downward about the rotary shaft 133 from the housing position of FIG. 9A to protrude forward of a seat. The rotary member 134 is configured such that an angle with the back side portion 120 is equal to or smaller than about 90 degrees when the rotary member 134 has moved to the protruding position.

Moreover, in the above-described configuration, when the rotary member 134 has moved to the protruding position, the reinforcement rib 134*a* is disposed to contact the coupling portions 132*d* of the support 132. Thus, the rotary member 134 can be positioned at the protruding position, and can be stably supported by the support 132.

Third Embodiment of Belt Assist Device

Next, the third embodiment of the belt assist device is described with reference to FIGS. 10A and 10B. A belt assist device 230 of the third embodiment is attached to an upper portion of a back side portion 220. The belt assist device 230 generally includes a rotary shaft 233 pivotally supported in a side base 220a, and a rotary member 234 attached via the rotary shaft 233. Note that a drive motor (not shown) configured to drive the rotary member 234 is attached to the rotary member 234.

Figure 10A:
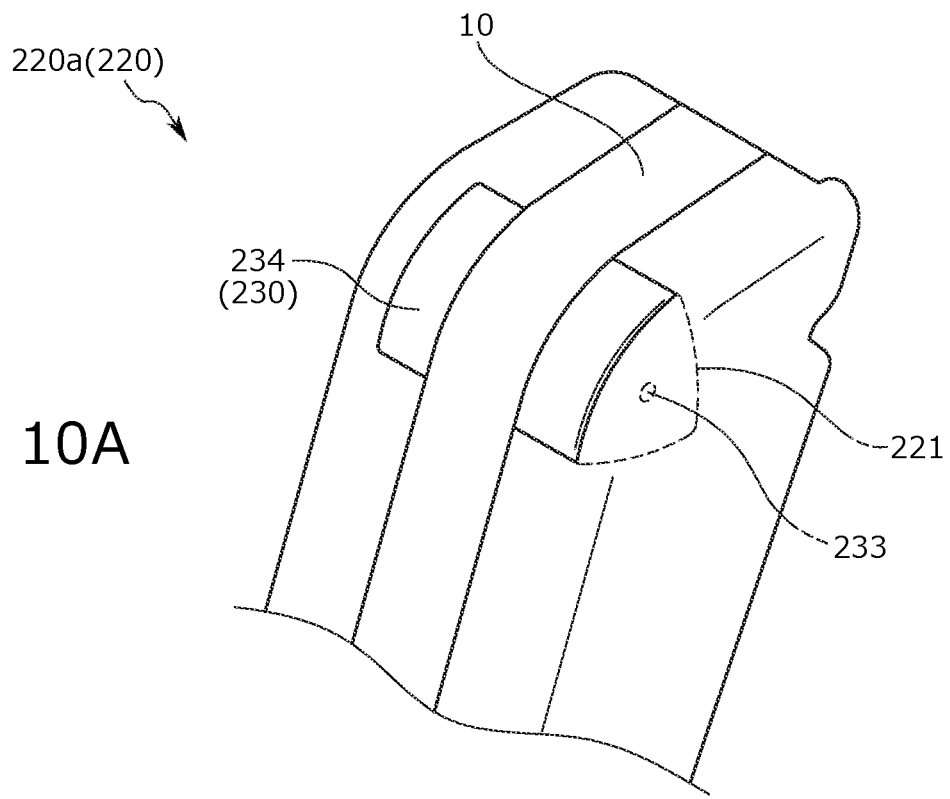
FIG. 10A is an external perspective view of a belt assist device of a third embodiment, and is a view of a housing position.
Figure 10B:
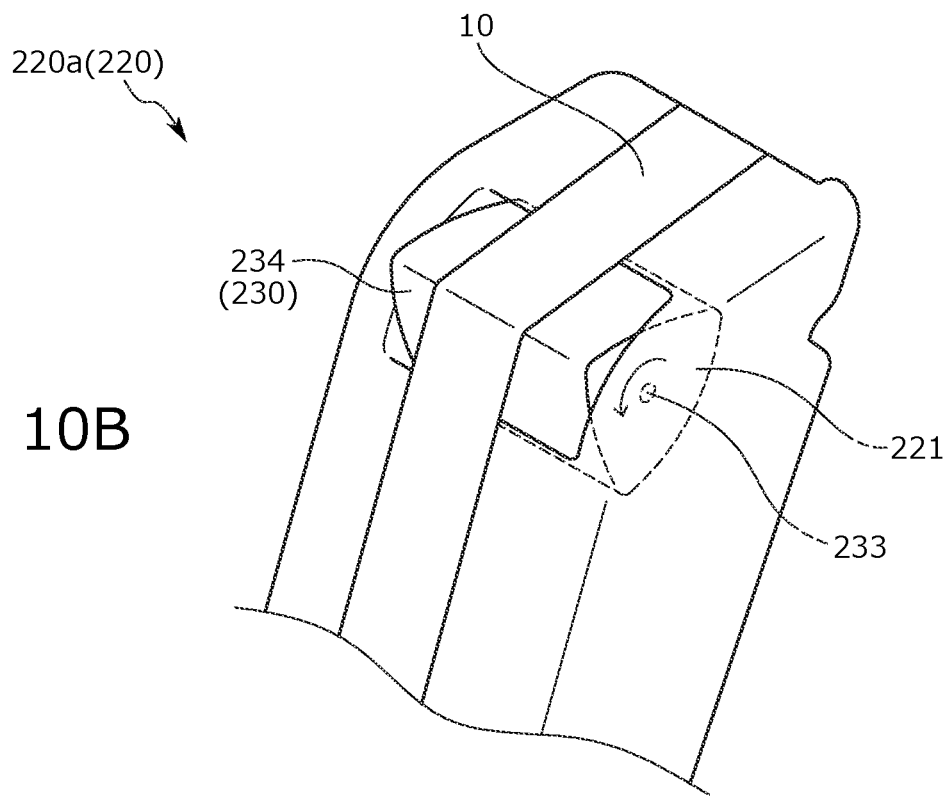
FIG. 10B is a view of a protruding position of the belt assist device.

As illustrated in FIGS. 10A and 10B, the belt assist device 230 is a device configured to rotate the resin rotary member 234 having a rotary shape between a housing position at which the rotary member 234 is housed in a housing portion 221 of the back side portion 220 and a protruding position at which the rotary member 234 partially protrudes forward of the back side portion 220 to push out a portion of a seatbelt 10. With the above-described configuration, the belt assist device 230 having a simple compact configuration can be provided.

Fourth Embodiment of Belt Assist Device

Next, the fourth embodiment of the belt assist device is described with reference to FIGS. 11 to 17. A belt assist device 330 of the fourth embodiment is a device configured to rotate a rotary member 334 between a protruding position illustrated in FIG. 11 and a housing position illustrated in FIG. 12.

Figure 11:
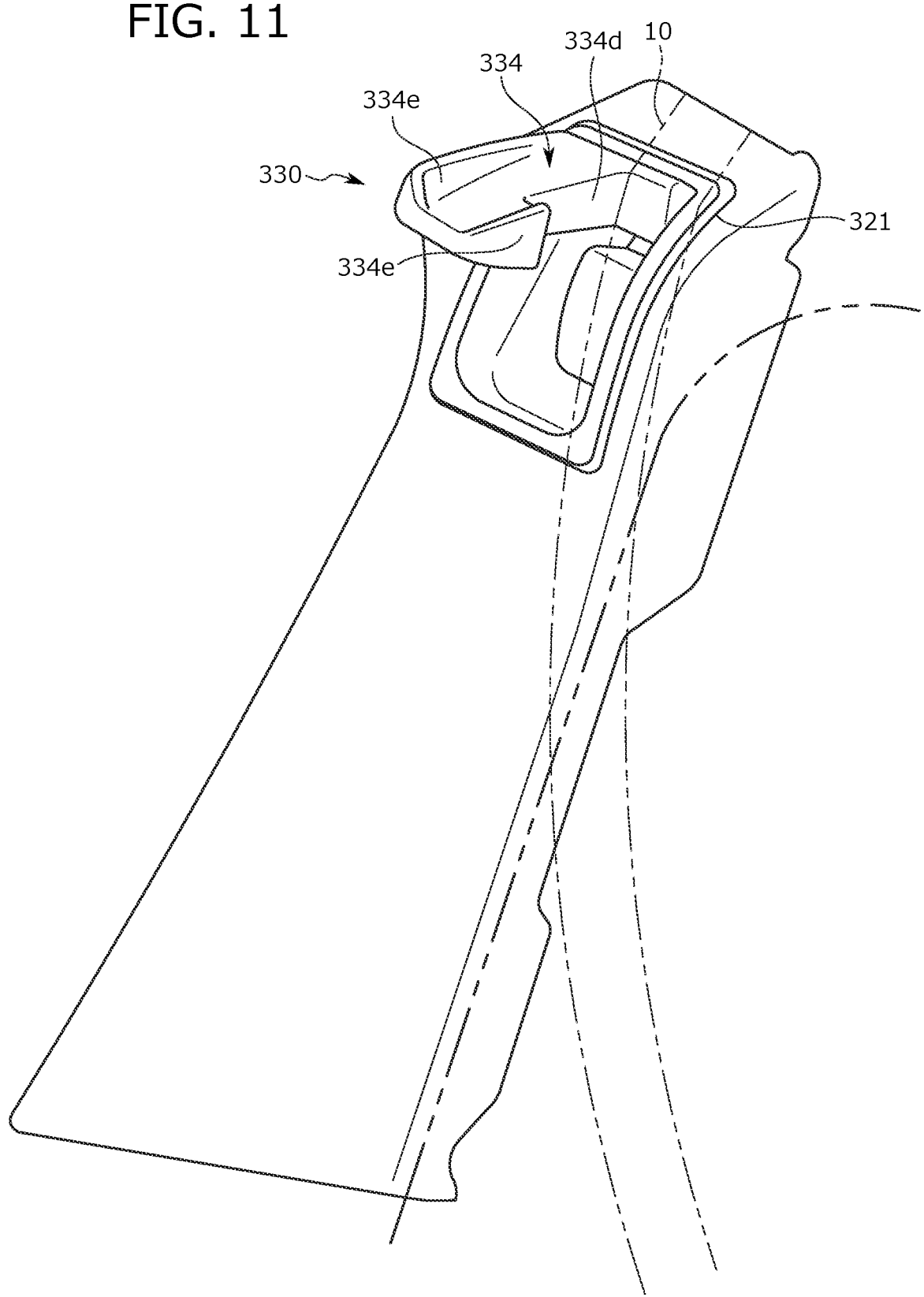
FIG. 11 is a perspective view of a belt assist device of a fourth embodiment, and is a view in the state in which a rotary member is at a protruding position.

The rotary member 334 is attached to a lateral portion of a seat back 2 in a right-to-left direction as illustrated in FIG. 1. Of right and left end portions of the rotary member 334, an inner end portion close to a center portion of the seat back 2 is provided with a cutout portion 334d cut out in a substantially rectangular shape toward an outer end portion farther from the center portion of the seat back 2. As illustrated in FIG. 11, the cutout portion 334d is more cut out toward the outer end portion when extending from a lower end portion to an upper end portion of the rotary member 334. Thus, as illustrated in FIG. 11, when a seatbelt 10 is pulled toward a seated passenger's body so that a seated passenger can fasten the seatbelt 10, the rotary member 334 is easily used without a portion of the seatbelt 10 being pinched in a clearance between the rotary member 334 at the protruding position and the seat back 2.

Moreover, as illustrated in FIG. 11, lower end portions of right and left end portions of a front surface of the rotary member 334 are provided respectively with a position restriction portion 334e protruding forward and configured to restrict movement of the seatbelt 10 in the right-to-left direction. In other words, the rotary member 334 is in such a shape that a center portion of the front surface of the rotary member 334 is recessed backward of the right and left end portions. Thus, when the rotary member 334 is at the protruding position at which a portion of the seatbelt 10 is pushed forward, the right and left position restriction portions 334e can reduce displacement of the seatbelt 10 in the right-to-left direction, and therefore, the seatbelt 10 can be stably pushed out.

Figure 12:
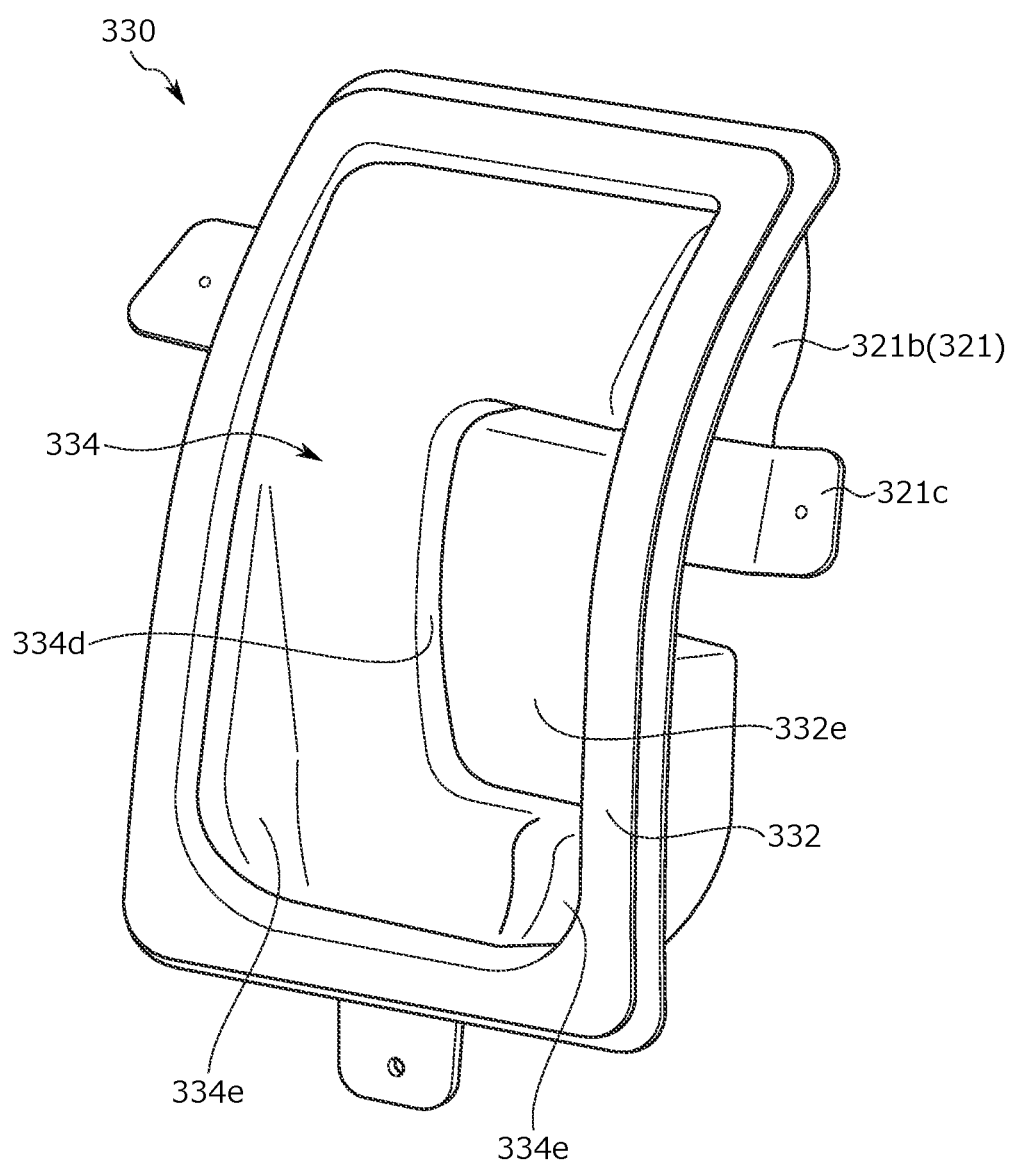
FIG. 12 is a perspective view of the belt assist device of the fourth embodiment, and is a view in the state in which the rotary member is at a housing position.
Figure 13:
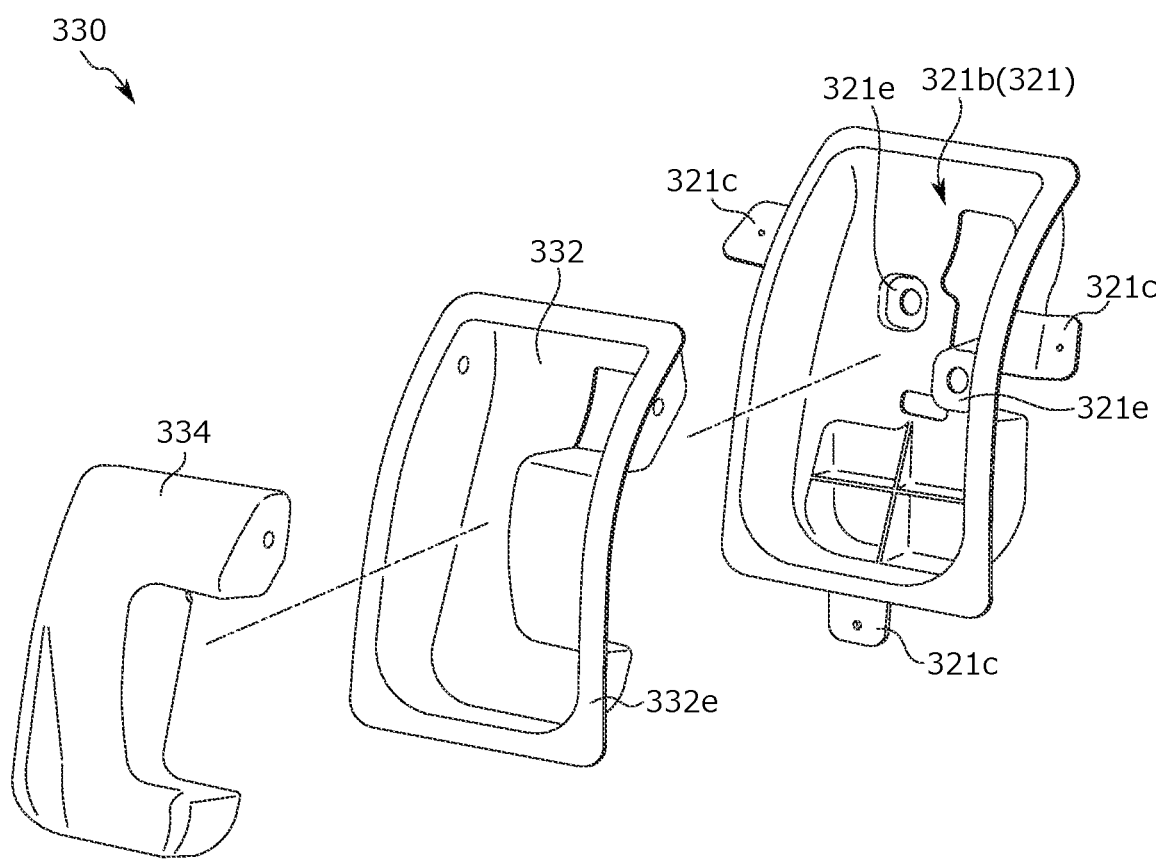
FIG. 13 is an exploded perspective view of the belt assist device of the fourth embodiment.

The rotary member 334 is attached to a recessed housing portion 321 provided at the seat back 2, the recessed housing portion 321 being configured to house the rotary member 334. As illustrated in FIGS. 12 and 13, a support plate 332 configured to support the rotary member 334 is attached between the rotary member 334 and the recessed housing portion 321, the support plate 332 being configured to house the rotary member 334. A portion of the support plate 332 corresponding to the cutout portion 334d is provided with a protruding raised portion 332e protruding forward toward the rotary member 334. The protruding raised portion 332e includes a substantially rectangular body, and is substantially formed flush with the front surface of the rotary member 334 when a front surface of the protruding raised portion 332e is at the housing position illustrated in FIG. 12.

Figure 14:
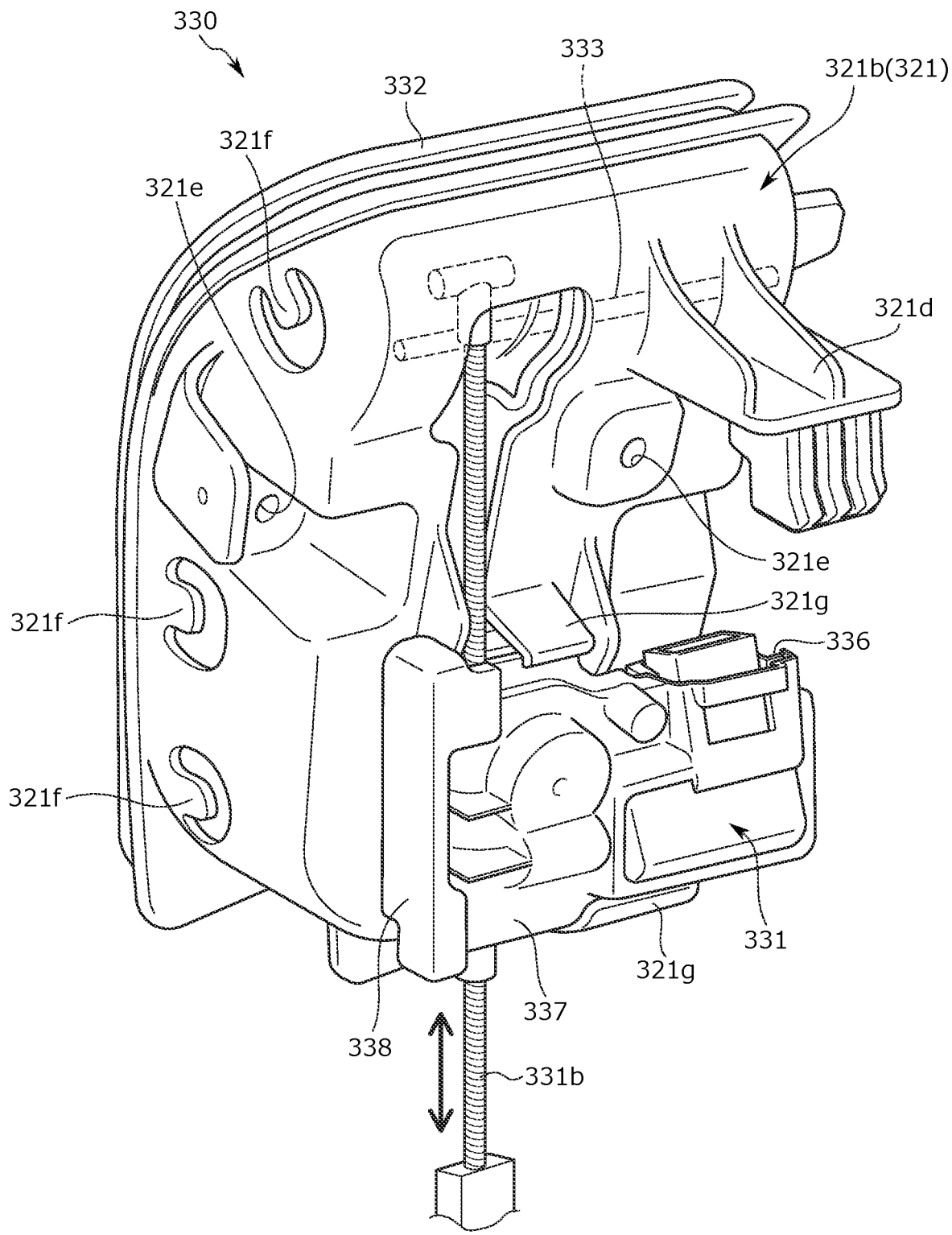
FIG. 14 is a perspective view of the belt assist device of the fourth embodiment from a back side.

The recessed housing portion 321 is formed in such a manner that a recessed housing plate 321b is attached to an opening formed at the seat back 2. Specifically, as illustrated in FIGS. 12 and 13, back attachment portions 321c protruding respectively toward outer right and left sides and being attachable respectively to attachment target portions (not shown) provided at the seat back 2 are formed respectively at right and left end portions of the housing plate 321b. As illustrated in FIG. 14, a body attachment portion 321d protruding backward toward a vehicle body (a transportation body) and being attachable to an attachment target portion (not shown) provided at a vehicle body is formed on a back surface of the housing plate 321b. Thus, assembly rigidity of the housing plate 321b with the seat back 2 and the vehicle body is stabilized.

Note that as illustrated in FIG. 14, a rotary shaft 333 of the rotary member 334 is disposed at a position facing the body attachment portion 321d in a direction of attachment of the housing plate 321b to the support plate 332. Thus, the rotary shaft 333 is, at the housing plate 321b, disposed near the body attachment portion 321d whose rigidity is relatively enhanced, and therefore, rotation of the rotary member 334 is easily stabilized.

Of the housing plate 321b, a substantially center portion and a portion corresponding to the protruding raised portion 332e are provided with a snap-fit hole 321e facing a hole (not shown) provided at a back surface of the support plate 332 and being attachable to the support plate 332 by snap-fitting, as illustrated in FIGS. 13 and 14. Thus, assembly of the housing plate 321b with the support plate 332 is stabilized.

Figure 15:
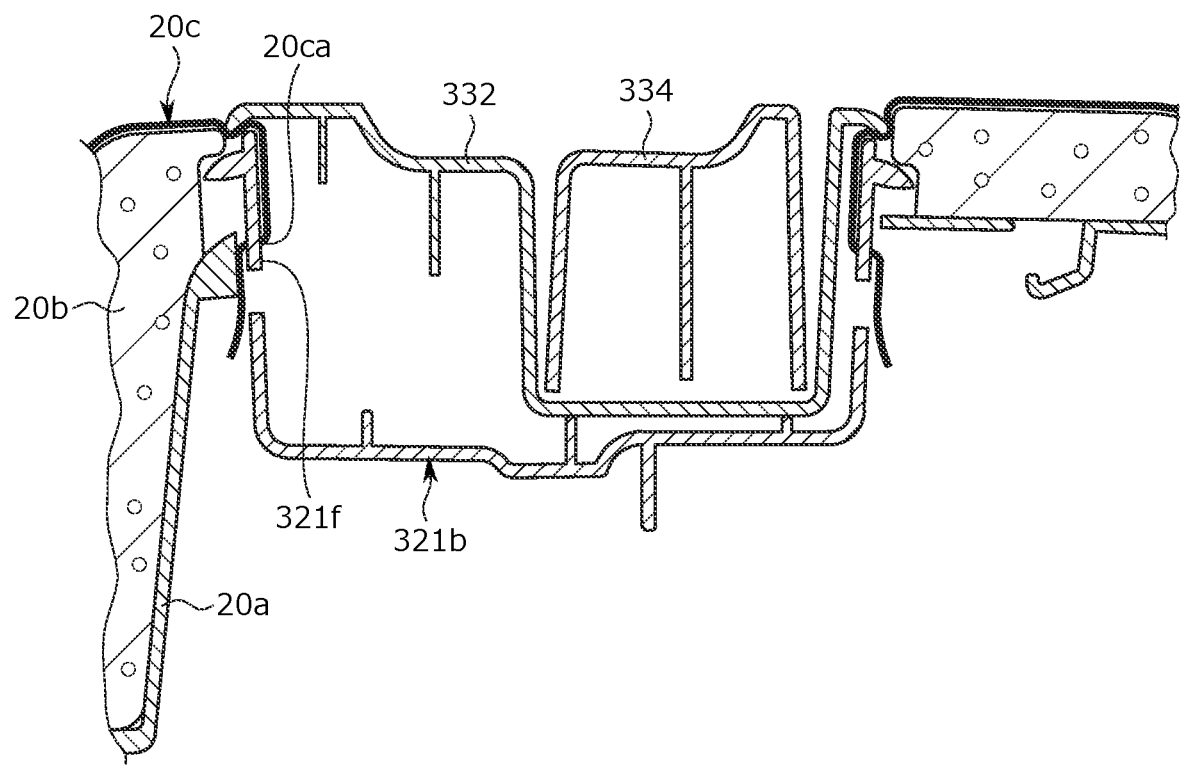
FIG. 15 is a cross-sectional view of the belt assist device of the fourth embodiment, and is a view in the state in which a cover material is hooked with the cover material being sandwiched between a support plate and a housing plate.

As illustrated in FIGS. 14 and 15, a plurality of hook claw portions 321f for hooking of an end portion of a cover material 20c are formed at outer right and left surfaces of the housing plate 321b, the hook claw portions 321f being formed with spacing in an upper-to-lower direction. Specifically, the end portion of the cover material 20c extends to cover a cushion pad 20b, and then, is attached with the cover material 20c being sandwiched in a front-to-back direction between the housing plate 321b and the support plate 332, as illustrated in FIG. 15. Opening holes 20ca provided on a tip end side of such an end portion are hooked onto the hook claw portions 321f. Thus, attachability of the end portion of the cover material 20c is stabilized, and appearance and merchantability are improved without causing recesses, wrinkles, gaps, etc. at the end portion of the cover material 20c at the periphery of the rotary member 334.

Further, the belt assist device 330 generally includes, as illustrated in FIG. 14, a motor 331 housed in the recessed housing portion 321, and a drive shaft 331b interposed between the motor 331 and the rotary member 334 and configured to move up and down in association with driving of the motor 331 to rotate the rotary member 334.

Figure 16A:
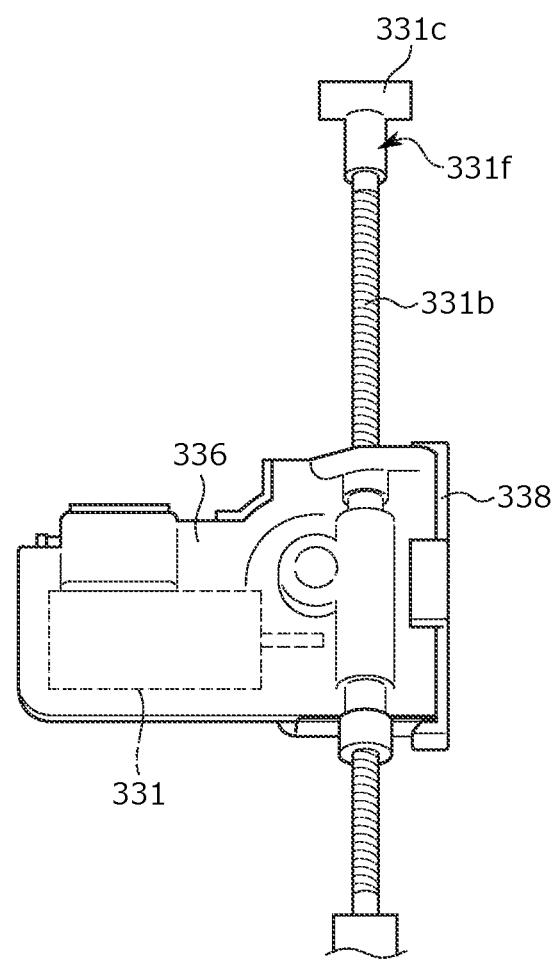
FIG. 16A is a view of a front cover for protecting a motor and a drive shaft of the fourth embodiment.
Figure 16B:
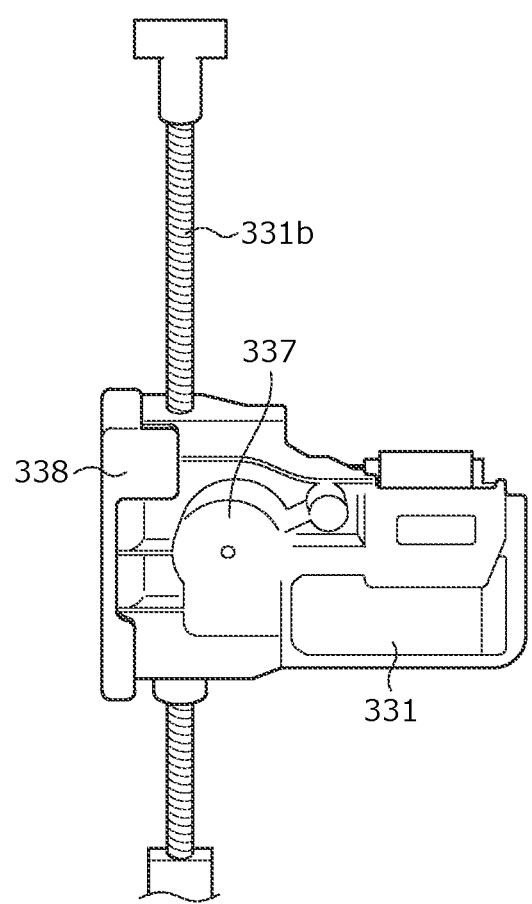
FIG. 16B is a view of a back cover for protecting the motor and the drive shaft.

As illustrated in FIGS. 14 and 16, the motor 331 is a rotary motor including a drive shaft extending in the right-to-left direction, and is attached to the back surface of the housing plate 321b. Specifically, the motor 331 is assembled with the motor 331 being sandwiched in the front-to-back direction between a front cover 336 and a back cover 337 as resin molded articles. Moreover, the motor 331 is held with the motor 331 being sandwiched in the upper-to-lower direction between upper and lower protruding holding portions 321g formed on the back surface of the housing plate 321b. Further, the front cover 336 and the back cover 337 are assembled with these covers 336, 337 being sandwiched in a lateral cover 338 in the front-to-back direction. Thus, assembly of the motor 331 with the housing plate 321b is stabilized.

Figure 17:
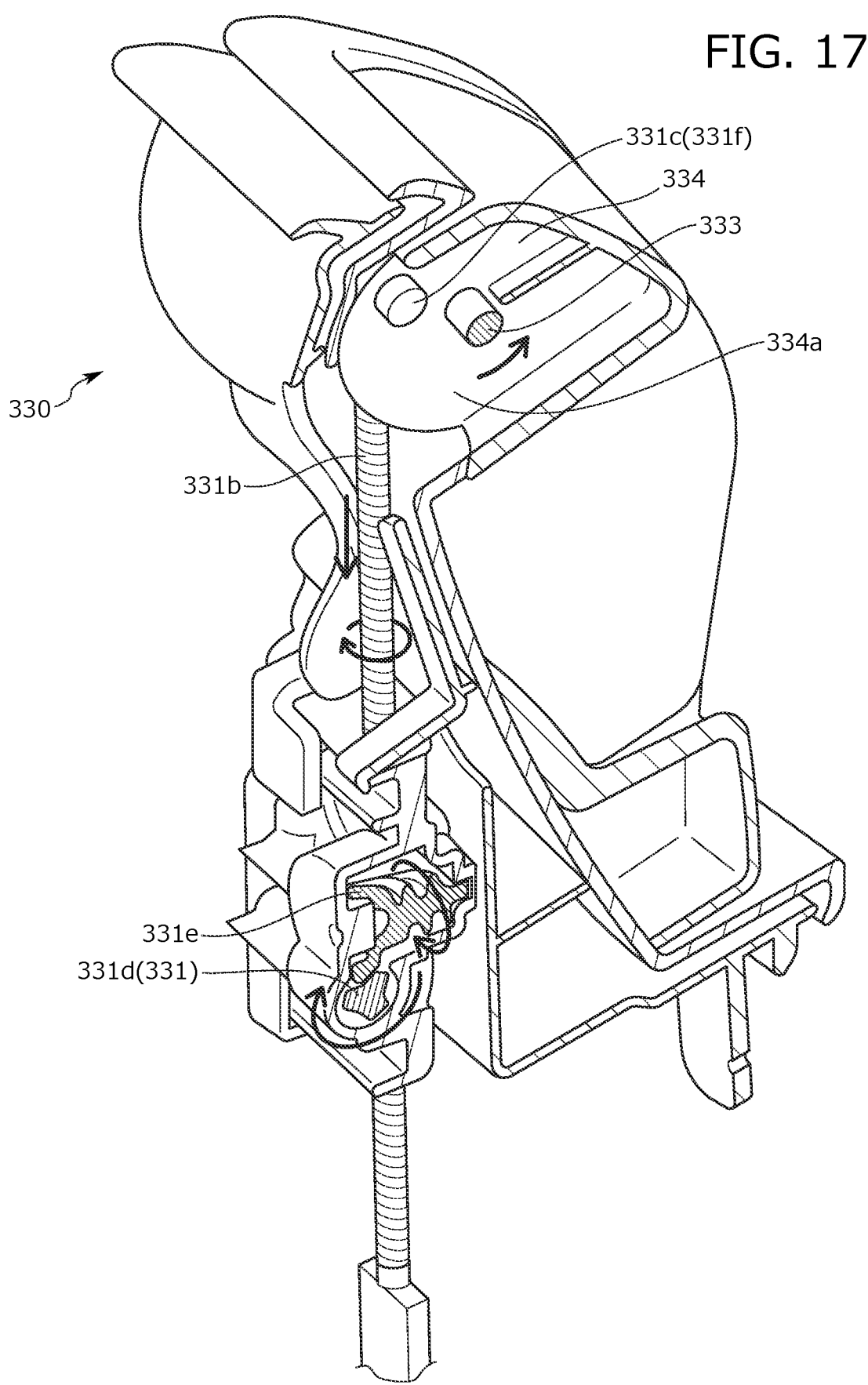
FIG. 17 is a longitudinal sectional view of the belt assist device of the fourth embodiment, and is a view in the state in which the drive shaft, a worm gear, and a wheel gear engage with each other.

As illustrated in FIG. 17, a wheel gear 331d configured to rotate about an axis along the right-to-left direction in association with driving of the motor 331 and a worm gear 331e engaging with the wheel gear 331d and configured to rotate about an axis along the front-to-back direction in association with rotation of the wheel gear 331d are attached to a tip end of the drive shaft of the motor 331. A screw gear portion of the drive shaft 331b on an outer surface thereof engages with the worm gear 331e such that the drive shaft 331b lifts/lowers while rotating about an axis along the upper-to-lower direction in association with rotation of the worm gear 331e.

As illustrated in FIG. 17, the drive shaft 331b is configured such that an upper end side thereof is attached to a reinforcement rib 334a provided on a back surface of the rotary member 334 and such that a lower end side thereof is attached to the drive shaft of the motor 331. The drive shaft 331b is disposed forward of a seat with respect to the drive shaft of the motor 331. As illustrated in FIGS. 16 and 17, a support 331f coupling the rotary member 334 (the reinforcement rib 334a) and the drive shaft 331b together and including a support shaft portion 331c extending along the right-to-left direction is attached to an upper end portion of the drive shaft 331b. Thus, lifting/lowering of the drive shaft 331b can be efficiently transmitted to the rotary member.

The support 331f includes a substantially T-shaped body. An upper portion of the support 331f is the support shaft portion 331c configured to support the rotary member 334, and a lower portion of the support 331f is a portion coupled with the drive shaft 331b. The support 331f is configured to transmit lifting/lowering of the drive shaft 331b to the rotary member 334. Note that a structure is preferably made, in which the drive shaft 331b idles in the support 331f. Note that the support 331f and the support shaft portion 331c may be formed as separate bodies. In the case of the separate bodies, it may be configured such that the support shaft portion 331c is pivotally supported by an opening provided at the support 331f.

In the above-described configuration, the motor 331 is disposed without protruding outward from upper and lower ends of the housing plate 321b and without protruding outward from right and left ends of the housing plate 321b, as illustrated in FIG. 14. Thus, compact attachment to the seat back 2 can be provided, and a clearance with respect to a vehicle-side body panel or other peripheral components is easily ensured.

Moreover, in the above-described configuration, the motor 331 is disposed at a lower portion of the back surface of the housing plate 321b at a position different from an upper portion provided with the body attachment portion 321d, as illustrated in FIG. 14. Thus, contact between the motor 331 and each of the body attachment portion 321d and the vehicle body can be reduced, leading to compact arrangement.

Other Embodiments

In the above-described embodiment, the belt assist device 30 is configured to rotate the rotary member 34 by lifting/lowering of the motor 31 as illustrated in FIGS. 3 and 4, but the present disclosure is not limited to the stroke motor. Driving of other well-known drive motors, actuators, springs, etc. may be utilized to rotate the rotary member 34.

Moreover, in the above-described embodiment, the rotary member 34 is attached to the upper portion of the back side portion 20 of the seat back 2 as illustrated in FIGS. 1 and 2, but the present disclosure is not limited to such a configuration. Needless to say, the rotary member 34 may be attached to a center or lower portion in the upper-to-lower direction. For example, the rotary member 34 is preferably disposed at a lower position of a lower end of the head rest 3, and is preferably disposed at a lower position of the upper end of the seat back 2.

Further, in the above-described embodiment, the rotary member 34 is formed as the resin member, but is changeable without limiting the present disclosure to such a rotary member. For example, the rotary member 34 may be formed as a metal member. Note that when the rotary member 34 is made of resin, the reinforcement rib 34a, a lateral wall flange portion, etc. can be integrally molded, and rigidity can be relatively easily improved.

In addition, in the above-described embodiment, a rubber member such as an elastomer material may be separately attached to upper end portions and lower end portions of the rotary member 34. With such a configuration, positioning is facilitated in opening/closing of the rotary member 34, and rattling can be reduced.

Moreover, in the above-described embodiment, the pair of protruding portions (not shown) protruding forward is formed respectively at the right and left end portions of the front surface of the rotary member 34, and function as the position restriction portion for the position of the seatbelt 10 in the right-to-left direction. However, this is changeable without limiting the present disclosure to such a configuration. For example, a recessed portion recessed backward at a center portion of the front surface of the rotary member 34 in the right-to-left direction may be formed as the position restriction portion.

Fifth to ninth embodiments of the present disclosure are described with reference to FIGS. 18 to 30.

Fifth Embodiment of Belt Assist Device

The present embodiment relates to a vehicle seat including a seatbelt assist device attached to a seat back and being configured to move a portion of a seatbelt placed on the seat back to a position easily reachable by a seated passenger. The seatbelt assist device includes a movable member attached to a recessed housing portion of the seat back via a rotary shaft and configured to rotate up and down between a housing position at which the movable member is housed in the seat back and a protruding position at which the movable member rotates to protrude forward of the seat back to push out a portion of the seatbelt, and an indicator section configured to inform the seated passenger, by light emission, that the movable member is at the protruding position. Note that the movable member is equivalent to a rotary member.

Figure 18:
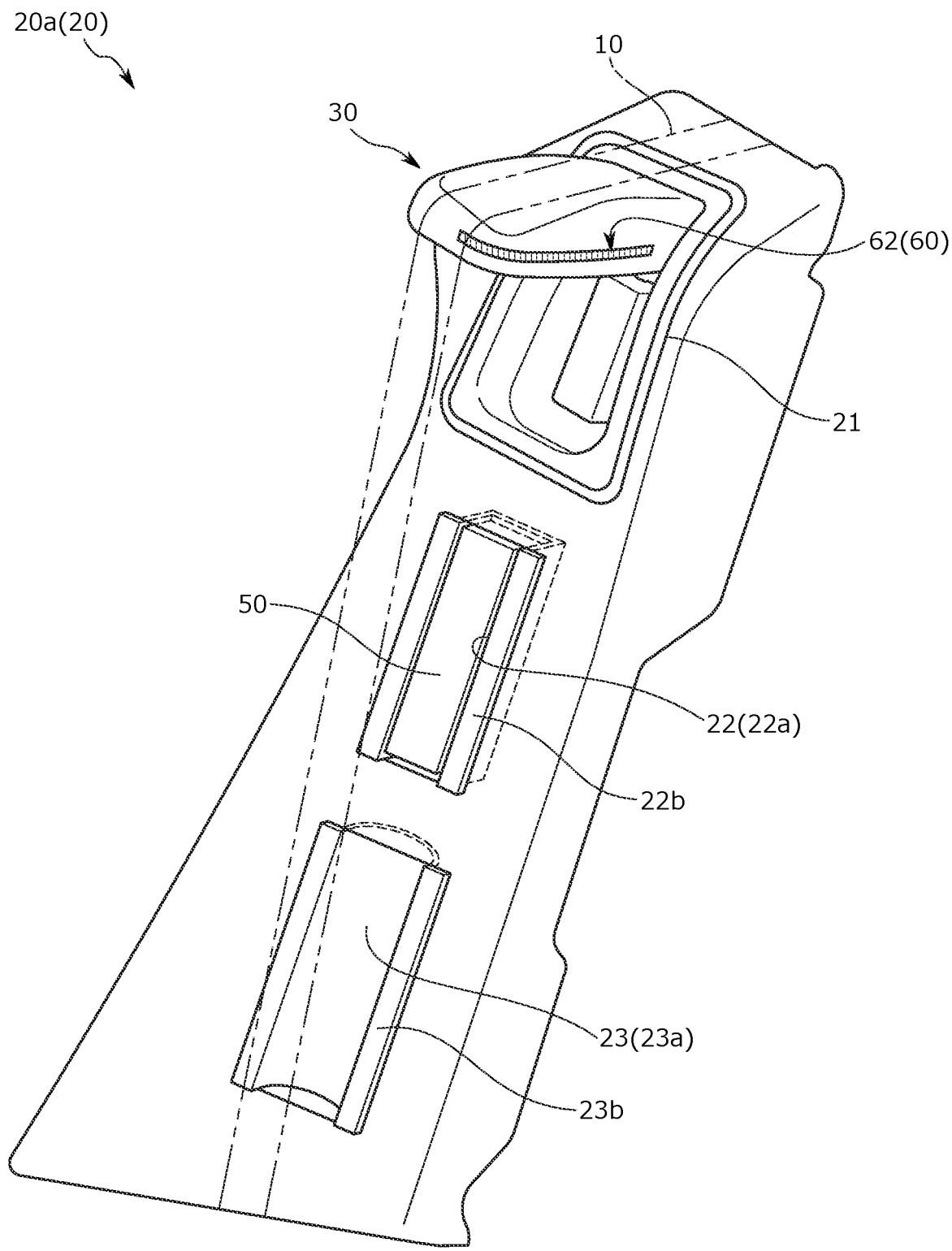
FIG. 18 is an external perspective view of a belt assist device of a fifth embodiment.

As illustrated in FIG. 18, a vehicle seat S is a seat configured to inform a seated passenger by light emission while a belt assist device 30 is pushing out a portion of a seatbelt 10. The belt assist device 30 is an assist device configured to push a portion of the seatbelt 10 forward and upward, as well as being configured to inform the seated passenger, by light emission, that a portion of the seatbelt 10 has been pushed out.

Figure 19:
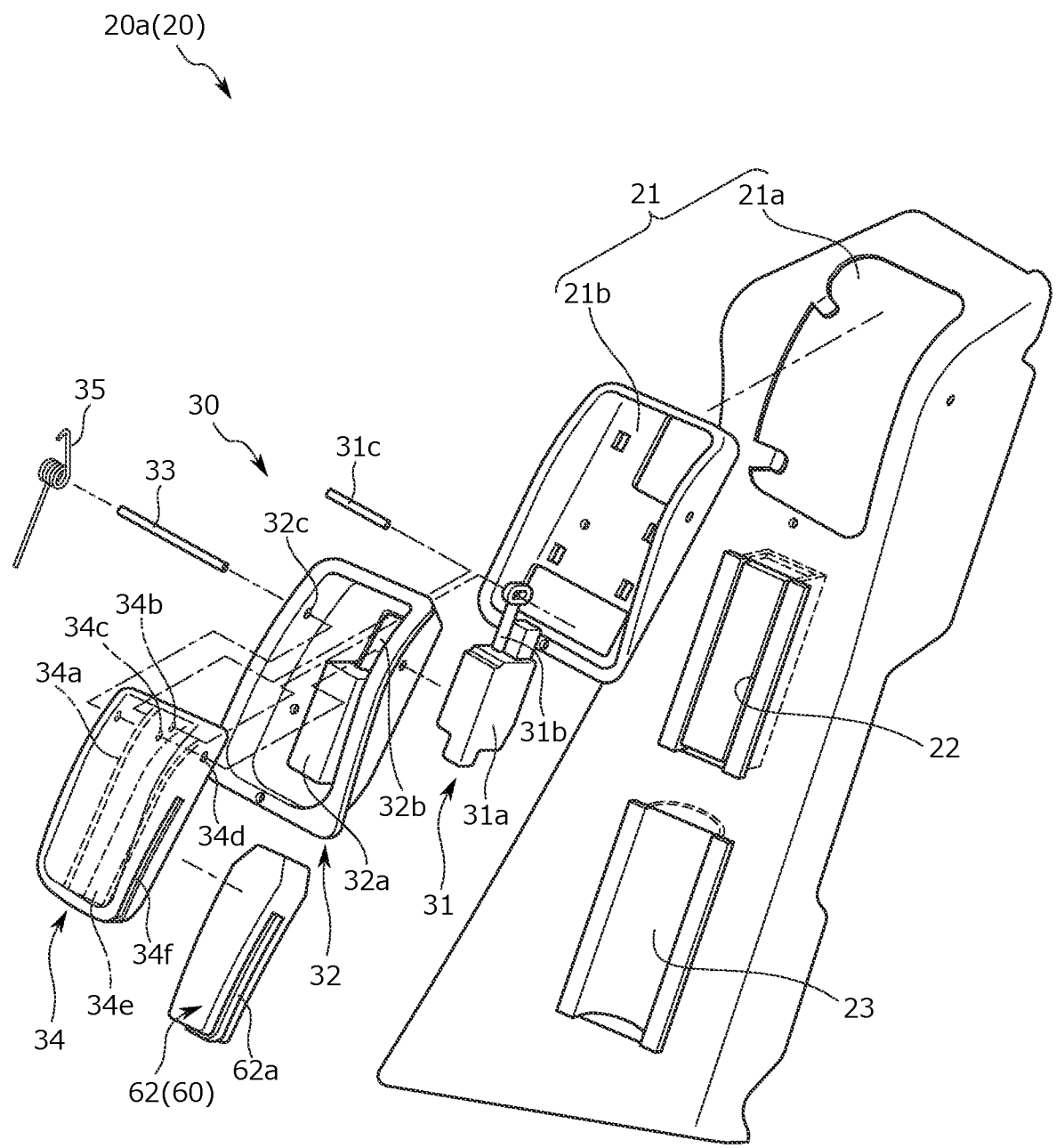
FIG. 19 is an exploded perspective view of the belt assist device of the fifth embodiment.

As illustrated in FIG. 19, the belt assist device 30 generally includes a motor 31, a support plate 32, a rotary shaft 33, a movable member 34, and an auxiliary spring 35. Moreover, the belt assist device 30 further includes a light emission device 60 (a light guide body 62) assembled such that a portion of the light emission device 60 is exposed behind the movable member 34 in the movable member 34 and being configured to emit light from the exposed portion.

Figure 20A:
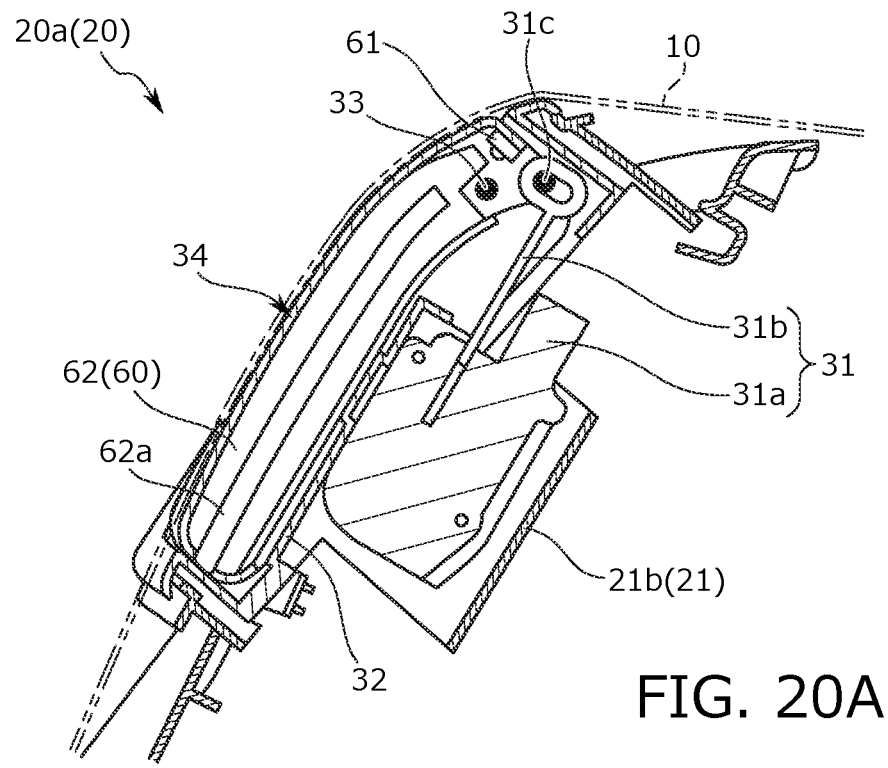
FIG. 20A is a side cross-sectional view of the belt assist device of the fifth embodiment, and is a view for describing a housing position.
Figure 20B:
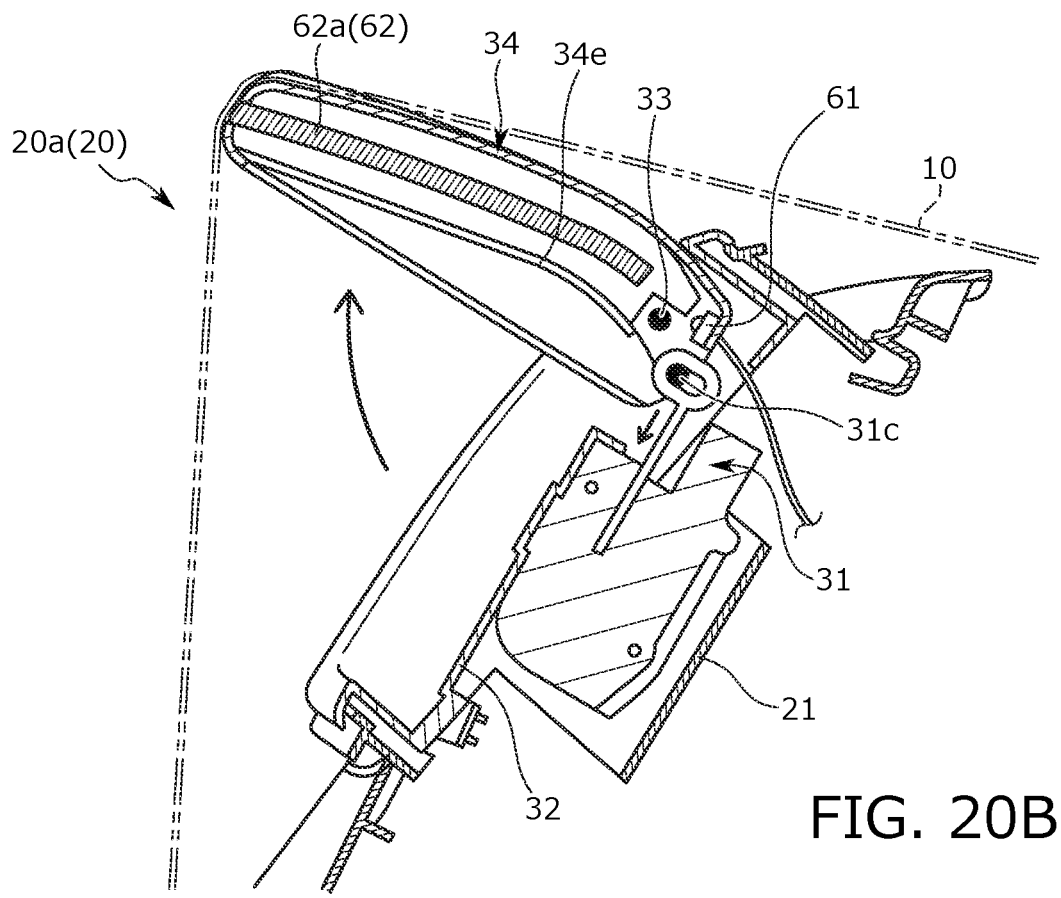
FIG. 20B is a view for describing a protruding position of the belt assist device.

As illustrated in FIGS. 20A and 20B, the belt assist device 30 is a device configured to rotate the movable member 34 between a housing position at which the movable member 34 is housed in a recessed housing portion 21 of a seat back 2 and a protruding position at which the movable member 34 protrudes forward of the seat back 2 to push out a portion of the seatbelt 10. It is configured to inform, by light emission from the light emission device 60, the seated passenger of the movable member 34 being at the protruding position.

At a center portion of a back surface of a front wall portion of the movable member 34 in a right-to-left direction, a reinforcement rib 34a is formed to extend backward as illustrated in FIG. 19. The reinforcement rib 34a is provided with a support hole 34b configured to pivotally support a support shaft 31c and a shaft hole 34c configured to pivotally support the rotary shaft 33. Moreover, a pair of shaft holes 34d configured to further pivotally support the rotary shaft 33 are formed respectively at right and left lateral wall portions of the movable member 34.

A support rib 34e slightly extending toward the seated passenger in the right-to-left direction and configured to support the light guide body 62 (described below) in an assembled state thereof is formed at an extending end portion of the reinforcement rib 34a. A substantially L-shaped slit 34f is formed to continuously extend across a front surface of the movable member 34 and a lateral surface of the movable member 34 close to the seated passenger in the right-to-left direction. The slit 34f is provided such that the light guide body 62 (described below) is partially exposed in the assembled state of the light guide body 62.

The light emission device 60 is a device configured to inform the seated passenger, by light emission, that the movable member 34 is at the protruding position. The light emission device 60 generally includes a light source body 61 configured to emit light as illustrated in FIGS. 20A and 20B, and the light guide body 62 configured to guide the light emitted from the light source body 61 as illustrated in FIGS. 19 and 20. The light emission device 60 is connected to a vehicle power source 42 via a drive circuit 46 equivalent to a harness (described below). The light source body 61 is an LED light source unit. The light source body 61 is attached to an inner surface of an upper wall portion of the movable member 34, and is disposed in such a direction that light can be emitted to the light guide body 62. Moreover, the light source body 61 is connected to the vehicle power source 42 via the drive circuit 46.

The light guide body 62 is a light guide plate made of polycarbonate resin, and is in such a shape that the light guide body 62 can be assembled with a seated-passenger-side half of an inner back portion of the movable member 34 in the right-to-left direction. The light guide body 62 is assembled such that a portion of the light guide body 62 is exposed to the outside through the slit 34f of the movable member 34. The light guide body 62 is designed to receive light into the light guide body 62 via a light reception surface close to the light source body 61 and to optionally reflect and guide the received light toward a front surface and a seated-passenger-side lateral surface, specifically an exposed portion 62a exposed through the movable member 34. The exposed portion 62a protrudes toward a front side and a seated passenger side (a lateral side) with respect to a body portion of the light guide body 62.

In the above-described configuration, the light guide body 62 is attached to a back surface of the movable member 34 on a seat back side when the movable member 34 is at the housing position illustrated in FIG. 20A. Thus, the light guide body 62 can be protected when the movable member 34 is at the housing position, and an increase in the size of the belt assist device 30 can be suppressed.

Moreover, in the above-described configuration, the light guide body 62 is, as illustrated in FIGS. 19 and 20, disposed on the seated-passenger-side lateral surface of the movable member 34 in the right-to-left direction and on a protruding tip end side of the movable member 34. Thus, light emission from the light guide body 62 is more noticeable by the seated passenger, and a light emission area of the light guide body 62 can be easily ensured.

Further, in the above-described configuration, the light guide body 62 is attached so that the light guide body 62 and the movable member 34 can be together housed in the recessed housing portion 21, and is disposed at a front position of the recessed housing portion 21 when the movable member 34 is at the protruding position. Thus, the light guide body 62 can be protected from scratching, contamination, etc. while the light emission area of the light guide body 62 can be easily ensured.

In addition, in the above-described configuration, the light guide body 62 is supported in the state in which the light guide body 62 is surrounded by the front wall portion, the seated-passenger-side lateral wall portion, the reinforcement rib 34a, and the support rib 34e of the movable member 34. Thus, ease of assembly of the light guide body 62 is improved.

Moreover, in the above-described configuration, it is configured such that reflection prisms are formed respectively on the seated-passenger-side lateral surface and the opposite lateral surface of the light guide body 62 in the right-to-left direction and that a slightly embossed portion is formed (e.g., frosted) on the seated-passenger-side lateral surface by, e.g., sandblasting. Thus, light can be preferentially surface-emitted from the seated-passenger-side lateral surface of the light guide body 62. In addition, surface emission can be made with light being diffused as in frosted glass. Thus, designability is improved.

Further, in the above-described configuration, the light guide body 62 and the movable member 34 show color tones or color patterns with a contrast between the light guide body 62 and the movable member 34. Specifically, the light guide body 62 is mixed with a pigment, a colorant, or a fluorescence agent such that at least the exposed portion 62a has a "warm" resin color such as amber or red. On the other hand, the movable member 34 is formed to have a "cold" resin color such as white or blue. Thus, e.g., when control is made not to emit light from the light guide body 62 during the day and to emit light from the light guide body 62 during the night, the seated passenger can easily recognize the presence of the movable member 34 by the warm color during the day, and can easily recognize the presence of the movable member 34 by light emission during the night. In particular, since the light guide body 62 and the movable member 34 show the color tones or the color patterns with the contrast, even when the seated passenger is an aged person with reduced vision, such a seated passenger can easily recognize the presence of the movable member 34. Note that a cover material of a vehicle rear seat typically has a color of black or a similar color, and therefore, the contrast between the light guide body 62 and the movable member 34 become more visually prominent.

Figure 21:
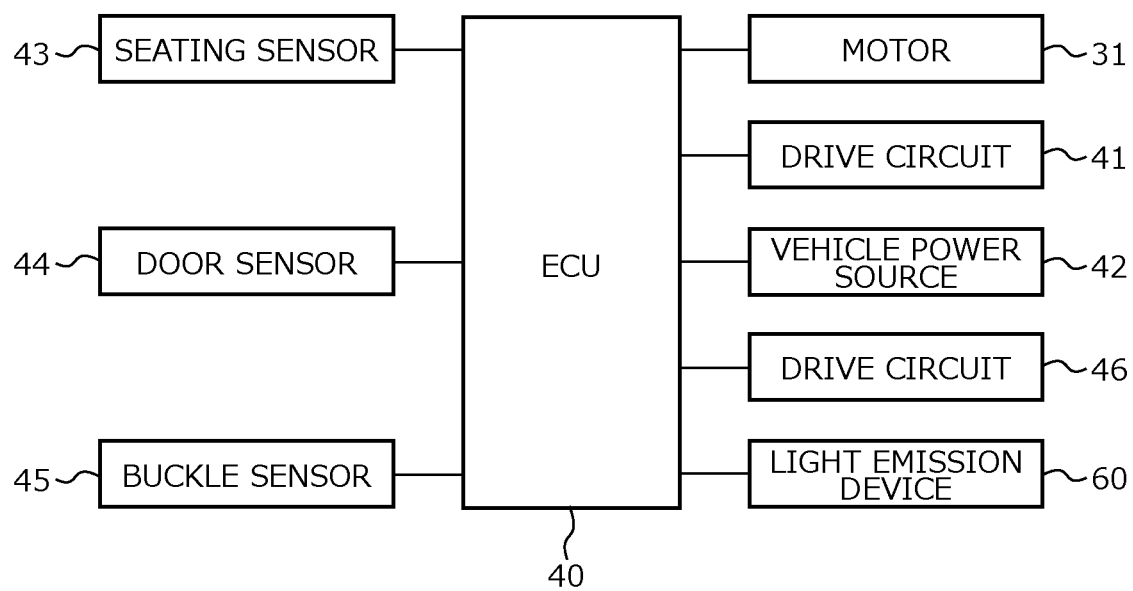
FIG. 21 is a block diagram of an electric structure of the belt assist device of the fifth embodiment.

Next, a control section of the belt assist device 30 is described with reference to FIGS. 21 and 22. As illustrated in FIG. 21, the belt assist device 30 includes an ECU 40, the drive circuits 41, 46 configured to supply drive power to the motor 31 and the light emission device 60, and the vehicle power source 42 connected to the motor 31 via the drive circuit 41 and connected to the light emission device 60 via the drive circuit 46.

The ECU 40 is configured to control the drive power supplied from the drive circuit 41 to the motor 31 to control ON or OFF of current of an electromagnetic clutch (not shown), thereby controlling lifting/lowering of the motor 31, i.e., rotation of the movable member 34. Moreover, the ECU 40 is configured to control the drive power supplied from the drive circuit 46 to the light emission device 60 to control ON or OFF of current of the electromagnetic clutch (not shown), thereby controlling ON/OFF of the light emission device 60.

The ECU 40 is provided at a seat cushion 1, and is connected to a seating sensor 43, a door sensor 44, a buckle sensor 45. In the above-described configuration, the ECU 40 controls operation of the motor 31, i.e., operation of the movable member 34, and light emission from the light emission device 60 based on a signal input from each sensor.

Figure 22:
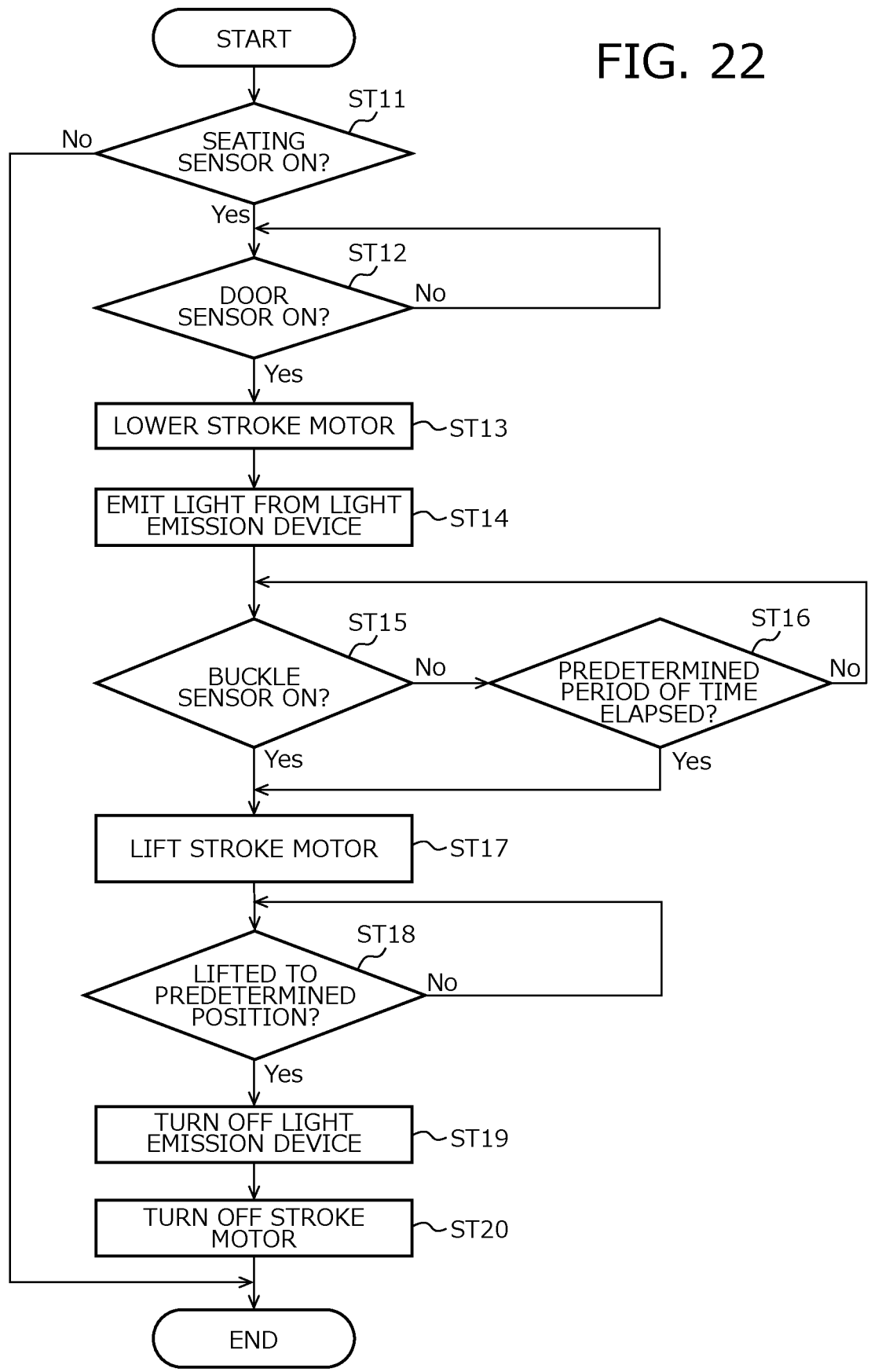
FIG. 22 is a flowchart of an example method of control of the belt assist device of the fifth embodiment.

Processing of a flowchart of FIG. 22 is repeatedly executed during a period for which, e.g., control is made by the ECU 40 to turn on an ignition switch of a vehicle. In a normal state, the belt assist device 30 is at the housing position illustrated in FIG. 20A, and is integrally housed without protruding beyond an outer surface of the seat back 2. The seatbelt 10 substantially closely contacts the outer surface of the seat back 2.

When the processing of the flowchart of FIG. 22 begins, it is, at a step ST11, first determined whether or not the seating sensor 43 is ON. When the seating sensor 43 is not ON (step ST11: No), nobody is seated on the vehicle seat S. Thus, an OFF signal is transmitted to the drive circuit 41, and supply of the drive power from the drive circuit 41 to the motor 31 is stopped to terminate the processing.

When the seating sensor 43 is ON (step ST11: Yes), it is, at a step ST12, further determined whether or not the door sensor 44 is ON. When the door sensor 44 is not ON (step ST12: No), the passenger has been seated on the vehicle seat S, but a vehicle door is not closed. Thus, the step ST12 is repeated until the vehicle door is closed.

When the door sensor 44 is ON (step ST12: Yes), the passenger has been seated on the vehicle seat S, and the vehicle door has been closed. However, it is determined that the seatbelt 10 has not been fastened yet. Thus, at a step ST13, an ON signal is transmitted to the drive circuit 41, and the drive power is supplied from the drive circuit 41 to the motor 31. Accordingly, the motor 31 (a cylinder 31b) lowers to a predetermined lowered position, and such lowering movement is transmitted to the movable member 34 via the support shaft 31c. Then, the movable member 34 rotates upward about the rotary shaft 33 to the protruding position. The movable member 34 rotates upward to protrude forward, thereby pushing the seatbelt 10 forward and upward.

Next, at a step ST14, an ON signal is transmitted to the drive circuit 46, and the drive power is supplied from the drive circuit 46 to the light emission device 60. Accordingly, the light guide body 62 (the exposed portion 62a) begins emitting of light in response to (in association with) lowering of the motor 31. The light guide body 62 preferably begins, as the timing of beginning light emission, emitting light in time with start of movement of the movable member 34.

Next, at a step ST15, it is determined whether or not the buckle sensor 45 at a position corresponding to the seating sensor 43 in an ON state is ON. When the buckle sensor 45 is not ON (step ST15: No), it is taken as the passenger being seated but the seatbelt 10 being not fastened yet, and the drive power is continuously supplied from the drive circuit 41 to the motor 31. Note that when the motor 31 (the cylinder 31b) has already lowered to the lowered position, the motor 31 (the cylinder 31b) is held at the lowered position even when supply of the drive power is stopped.

The step ST15 is repeated until the buckle sensor 45 is turned on or until a predetermined period of time is elapsed after start of lowering of the motor 31 at a step ST16. Accordingly, the motor 31 (the cylinder 31b) is held at the predetermined lowered position, and the movable member 34 is held at the protruding position. The seatbelt 10 is held with the seatbelt 10 being pushed out by the movable member 34. At this point, the light guide body 62 continuously emits light while the movable member 34 is at the protruding position. Note that at this point, an announcement such as "please fasten the seatbelt," warning sound, or vibration may be simultaneously emitted.

When the buckle sensor 45 is ON (step ST15: Yes), the seated passenger on the vehicle seat S has fastened the seatbelt 10. Thus, at a step ST17, another ON signal is transmitted to the drive circuit 41, and the drive power is supplied from the drive circuit 41 to the motor 31. Accordingly, the motor 31 (the cylinder 31b) lifts to a predetermined lifted position (a standby position), and such lifting movement is transmitted to the movable member 34 via the support shaft 31c. Then, the movable member 34 rotates downward from the protruding position to the housing position. Alternatively, when the predetermined period of time has been elapsed at the step ST16, the seated passenger has not yet fastened the seatbelt 10, but the processing proceeds to the step ST17.

When the motor 31 (the cylinder 31b) has lifted to the predetermined lifted position (the standby position) (step ST18: Yes), an OFF signal is transmitted to the drive circuit 46 at a step ST19. Then, supply of the drive power from the drive circuit 46 to the light emission device 60 is stopped. This turns off the light emission device 60. Further, at a step ST20, an OFF signal is transmitted to the drive circuit 41, and supply of the drive power from the drive circuit 41 to the motor 31 is stopped. Accordingly, the motor 31 is held at the lifted position, and the movable member 34 is held at the housing position. Note that when the motor 31 does not lift to the lifted position (step ST18: No), the step ST18 is repeated. The processing of FIG. 22 ends through the steps ST11 or ST20 described above.

By the above-described processing flow, before the seated passenger on the vehicle seat S fastens the seatbelt 10, the belt assist device 30 can move at least a portion of the seatbelt 10 to a position easily reached by a seated passenger's hand, and can inform, by light emission from the light emission device 60, the seated passenger of the seatbelt 10 being moved. After the seated passenger has fastened the seatbelt 10, the belt assist device 30 is integrally housed in the vehicle seat S, and turns off the light emission device 60. Thus, no obstruction is caused.

Sixth Embodiment of Belt Assist Device

Next, the sixth embodiment of the belt assist device is described with reference to FIGS. 23 to 25. A belt assist device 130 of the sixth embodiment is attached to an upper portion of a back side portion 120.

The belt assist device 130 generally includes a support 132 fixed, by snap-fitting, to a substantially inverted T-shaped opening 121a provided at a side base 120a, a rotary shaft 133 pivotally supported in the support 132, and a movable member 134 attached via the rotary shaft 133. Moreover, a plate-shaped light guide body 162 (a light emission device 160) and a plate-shaped cover member 163 covering the movable member 134 and the light guide body 162 are attached to a seated-passenger-side half of a back surface of the movable member 134 in a right-to-left direction.

The belt assist device 130 is a device configured to rotate the movable member 134 between a housing position at which the movable member 134 is housed in a housing portion 121 of the back side portion 120 and a protruding position at which the movable member 134 protrudes forward of the back side portion 120 to push out a portion of a seatbelt 10.

The support 132 is a resin body configured to rotatably support the movable member 134, and a pair of support holes 132c configured to pivotally support the rotary shaft 133 are formed respectively at right and left lateral wall portions of the support 132. Moreover, a plurality of substantially columnar coupling portions 132d coupling the right and left lateral wall portions together are provided at an upper portion of the support 132. The rotary shaft 133 extends in the right-to-left direction, and is further pivotally supported by shaft holes 134c of the movable member 134 with the rotary shaft 133 being pivotally supported by the pair of support holes 132c. Further, the rotary shaft 133 is attached to lower portions (lower end portions) of the support 132 and the movable member 134.

Figure 24:
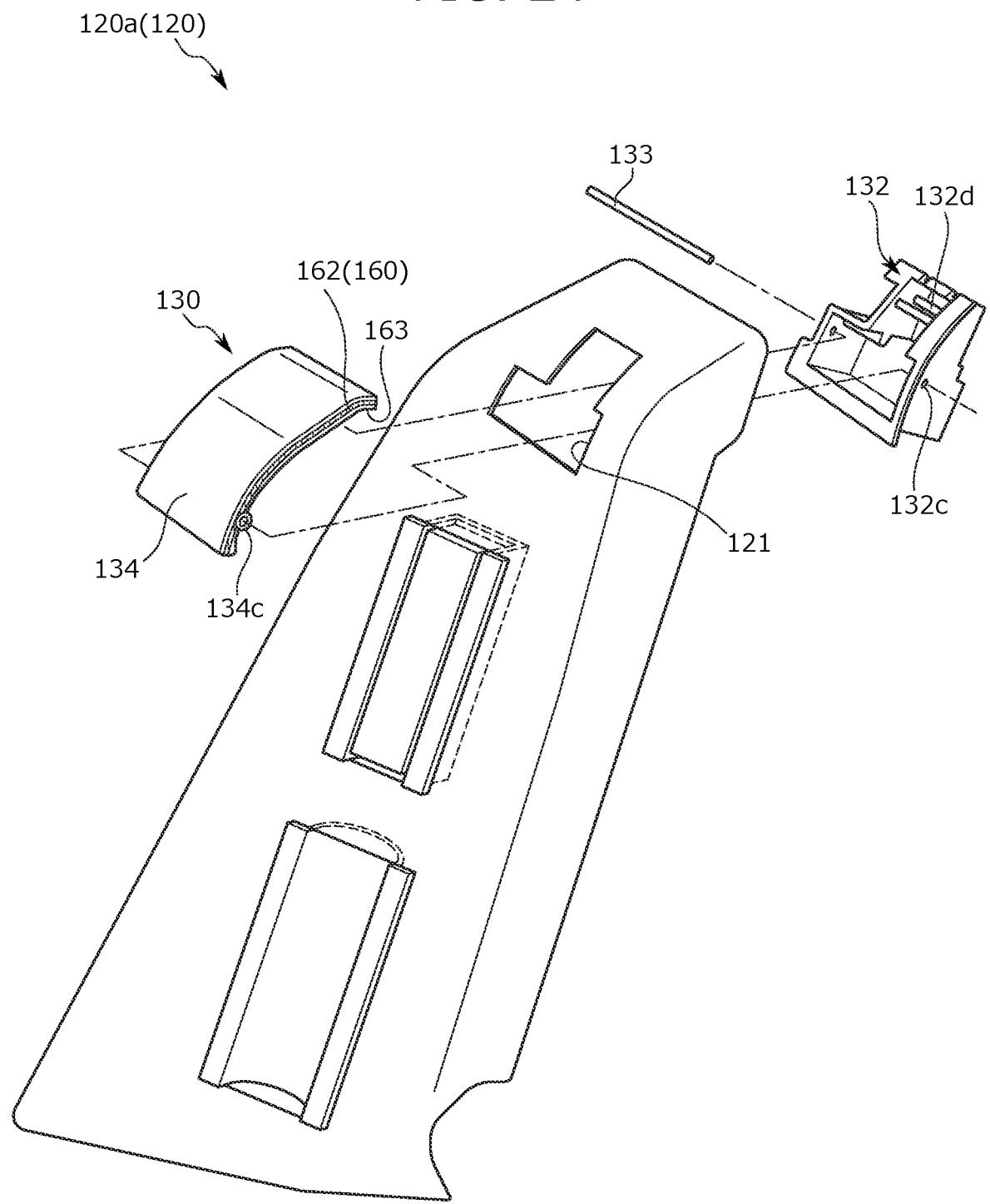
FIG. 24 is an exploded perspective view of the belt assist device of the sixth embodiment.
Figure 25:
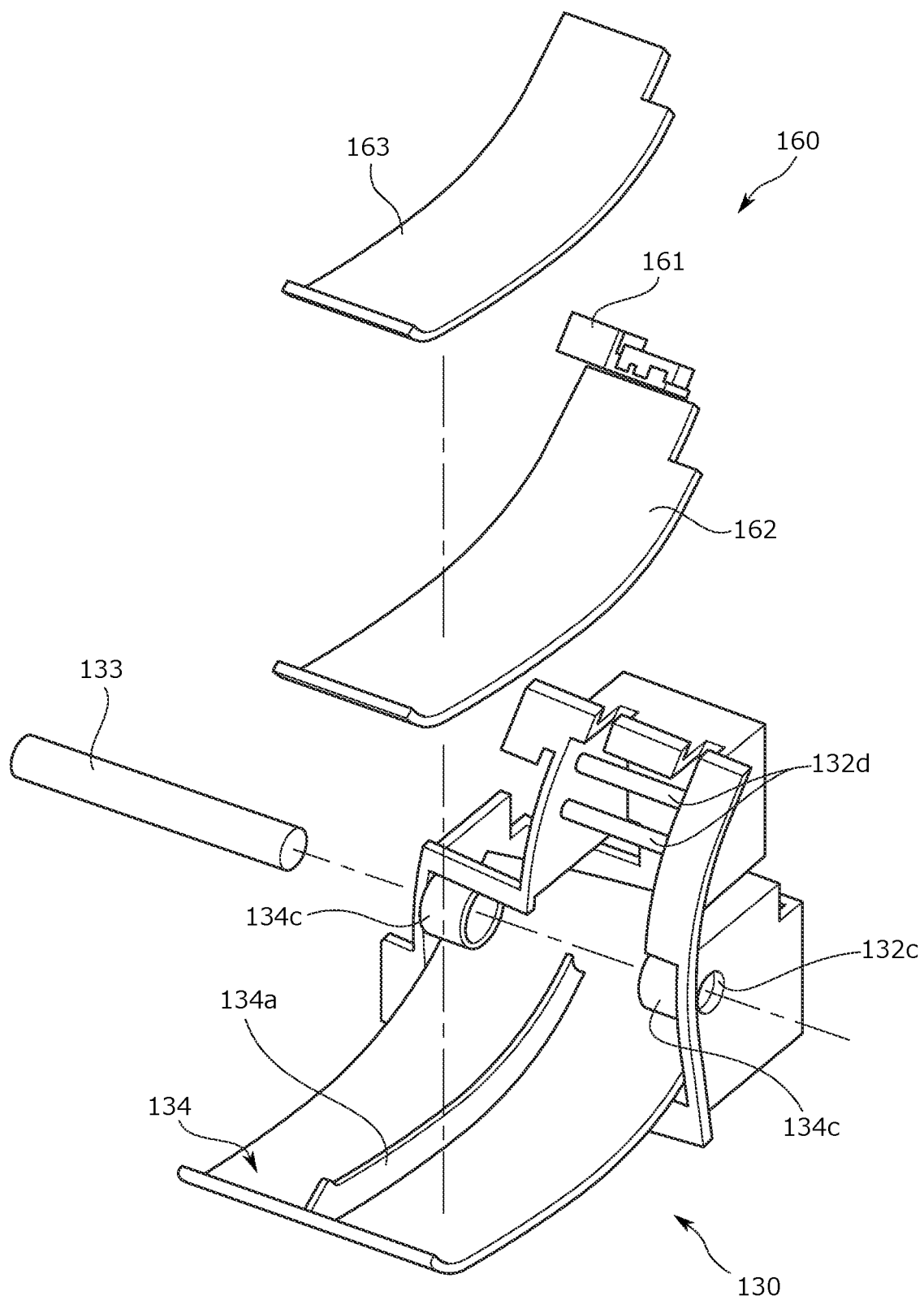
FIG. 25 is an exploded perspective view of the belt assist device of the sixth embodiment.

As illustrated in FIG. 24, the movable member 134 is a member including a resin plate and configured to push out a portion of the seatbelt 10 from behind. The movable member 134 is rotatably provided between the housing position and the protruding position. A reinforcement rib 134a illustrated in FIG. 25 is formed to extend backward from a center portion of the back surface of the movable member 134 in the right-to-left direction. Moreover, the pair of shaft holes 134c extending in the right-to-left direction are integrally attached respectively to right and left end portions of a lower portion of the back surface of the movable member 134. The rotary shaft 133 is inserted into the pair of shaft holes 134c across the right-to-left direction.

Figure 23:
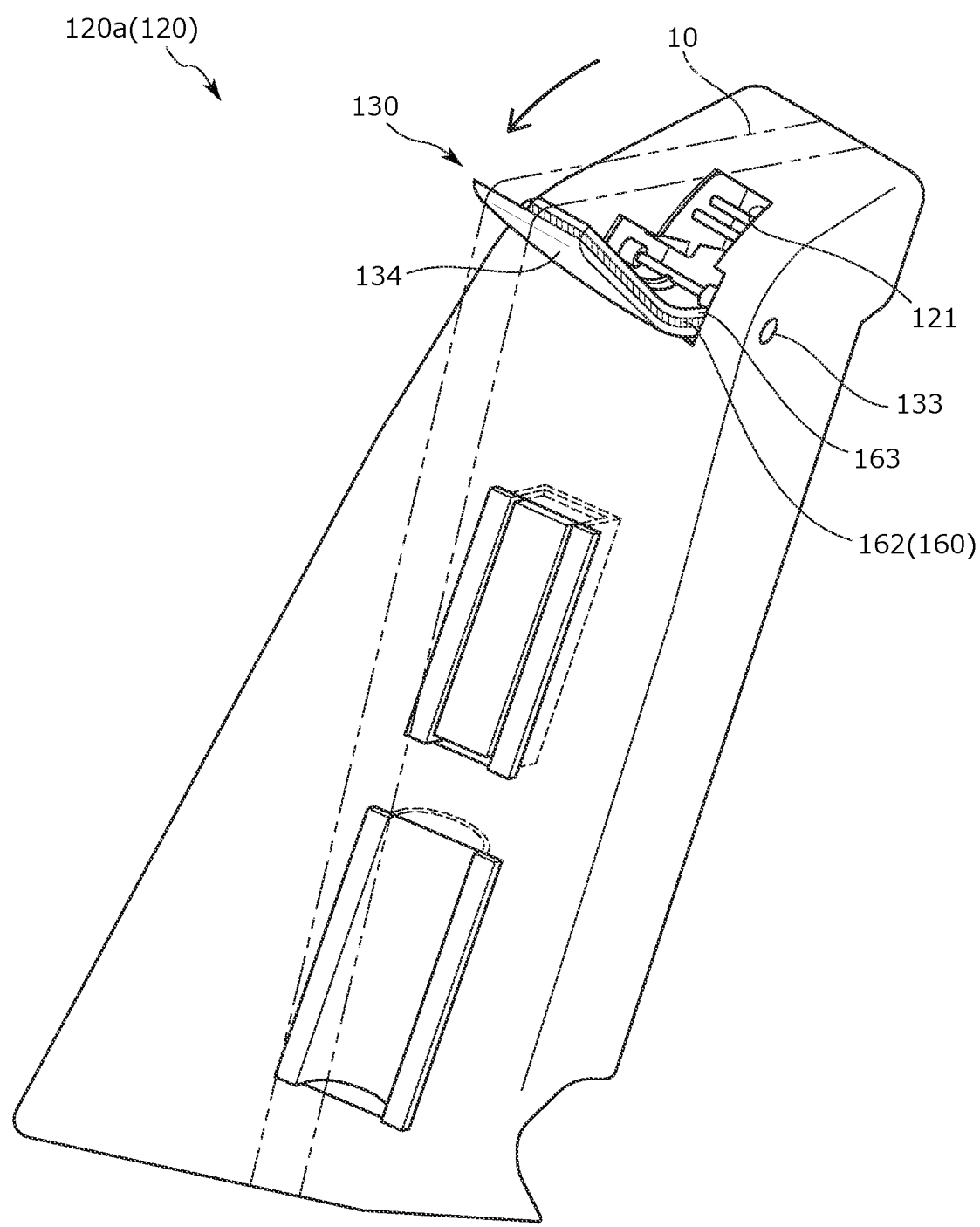
FIG. 23 is an external perspective view of a belt assist device of a sixth embodiment.

In the above-described configuration, the movable member 134 is disposed to move to the protruding position of FIG. 23 in such a manner that the movable member 134 rotates downward about the rotary shaft 133 from the housing position to protrude forward of a seat.

Moreover, in the above-described configuration, when the movable member 134 has moved to the protruding position, the reinforcement rib 134a is disposed to contact the coupling portions 132d of the support 132. Thus, the movable member 134 can be positioned at the protruding position, and can be stably supported by the support 132.

The light emission device 160 is a device configured to inform the seated passenger, by light emission, that the movable member 134 is at the protruding position. The light emission device 160 generally includes a light source body 161 configured to emit light, and the light guide body 162 configured to guide the light emitted from the light source body 161, as illustrated in FIG. 25. The light guide body 162 is a light guide plate made of polycarbonate resin, and is configured to receive light into the light guide body 162 via a light reception surface close to the light source body 161 and to optionally reflect and guide the received light toward a front surface and a seated-passenger-side lateral surface.

In the above-described configuration, the movable member 134, the light guide body 162, and the cover member 163 show color tones or color patterns with a contrast between adjacent ones of these components. Specifically, the movable member 134 and the cover member 163 are formed to have a "cold" resin color such as white or blue, and the light guide body 162 is formed to have a "warm" resin color such as amber or red. Thus, the seated passenger can more easily recognize the presence of the movable member 134 by the warm color during the day, and can easily recognize the presence of the movable member 134 by light emission during the night, for example.

Seventh Embodiment of Belt Assist Device

Figure 26:
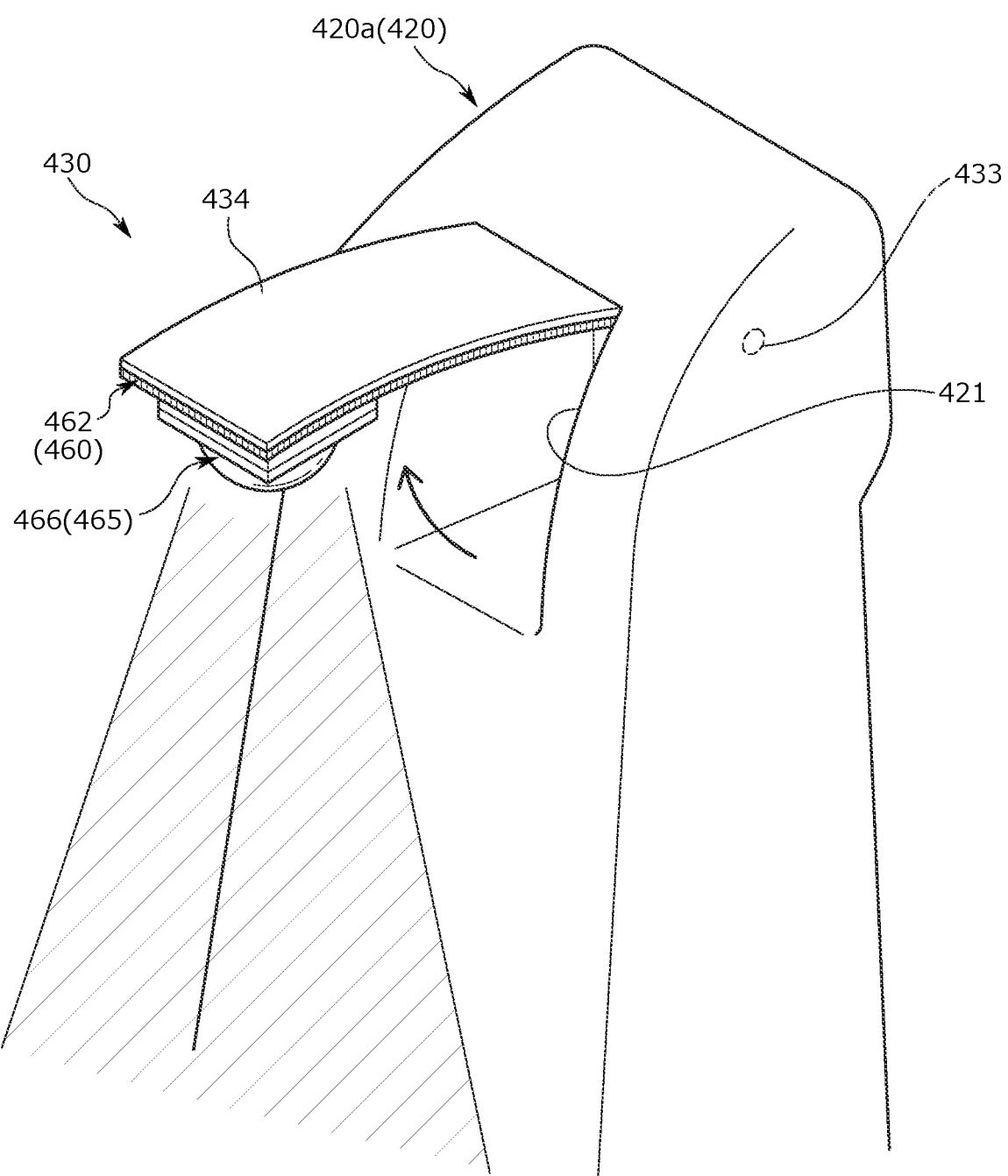
FIG. 26 is an external perspective view of a belt assist device of a seventh embodiment.
Figure 27:
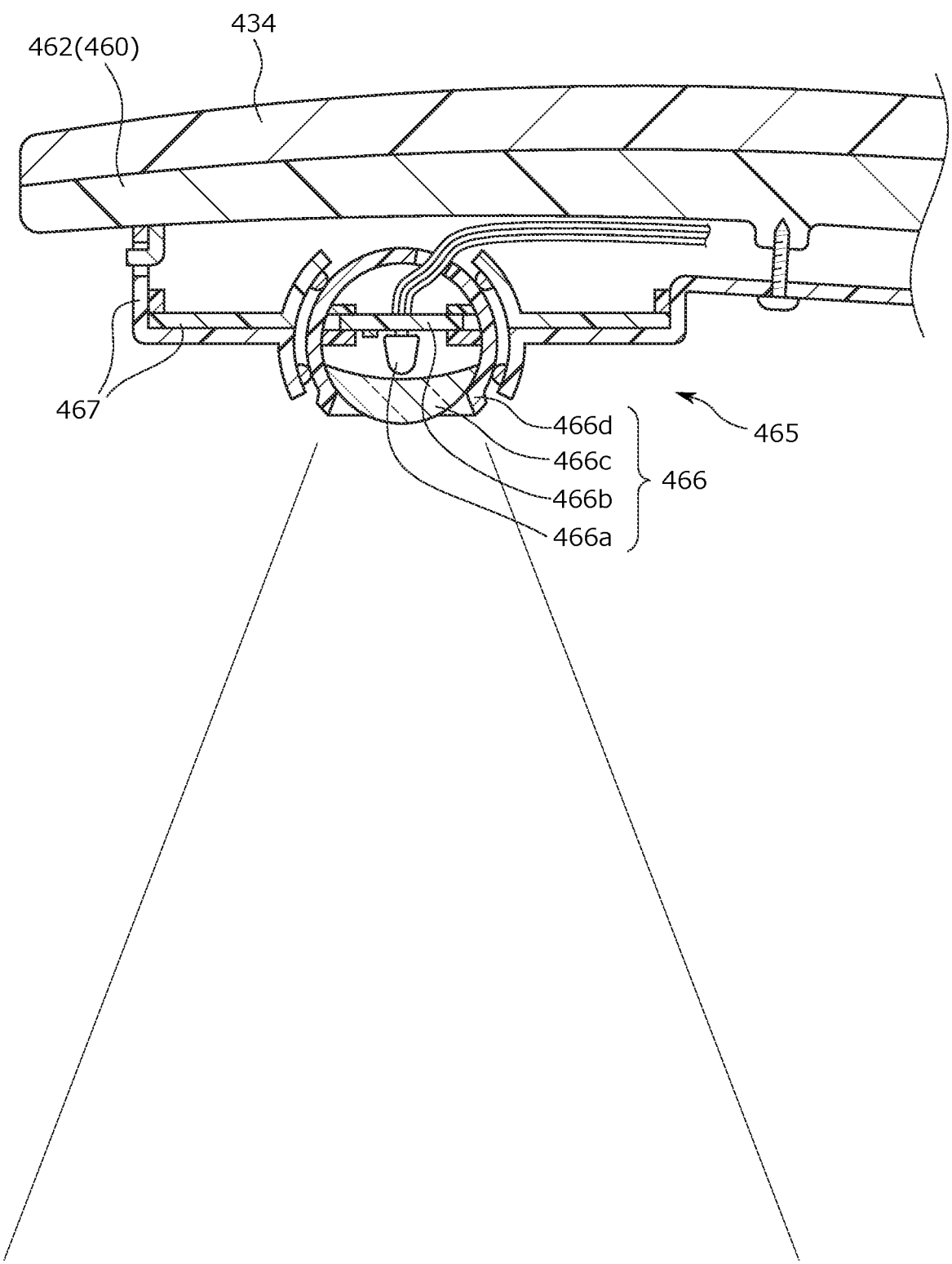
FIG. 27 is a side cross-sectional view of the belt assist device of the seventh embodiment.

Next, the seventh embodiment of the belt assist device is described with reference to FIGS. 26 and 27. A belt assist device 430 of the seventh embodiment is attached to an upper portion of a back side portion 420. As illustrated in FIG. 26, the belt assist device 430 generally includes a rotary shaft 433 pivotally supported in a side base 420a, and a movable member 434 attached via the rotary shaft 433. Moreover, a flat plate-shaped light guide body 462 (a light emission device 460) and a light emission body 466 (a light emission device 465) on a back surface (a bottom surface) of the light guide body 462 are attached to a back surface (a bottom surface) of the movable member 434 in a substantially flat plate shape.

The light emission device 460 is a device configured to inform the seated passenger, by light emission, that the movable member 434 is at a protruding position. The light emission device 460 generally includes a light source body (not shown) and the light guide body 462 configured to guide the light emitted from the light source body. The light emission device 465 is a device configured to irradiate a seated passenger with light when the movable member 434 is at the protruding position. The light emission device 465 generally includes the light emission body 466 having an LED light source unit, and an assembly member 467 for assembly of the light emission body 466, as illustrated in FIG. 27.

The light emission body 466 generally includes a light source 466a, a substrate 466b to which the light source 466a is fixed, a dome-shaped lens 466c configured to converge or diverge light emitted from the light source 466a, and a knob 466d configured to adjust a light distribution angle of the lens 466c.

In the above-described configuration, the rotary shaft 433 is attached to an upper end portion of the movable member 434, and the light emission device 465 is attached to a lower end portion of the movable member 434. Thus, a simple compact configuration is provided, and a light emission area of the light emission device 465 is easily ensured.

Moreover, in the above-described configuration, the light emission device 465 is the device configured to irradiate the seated passenger with light, and includes the knob 466d configured to adjust a light distribution angle of the light emission body 466. Thus, the light emission body 466 can illuminate an optional site of the seated passenger, and can also serves as, e.g., a reading light in addition to the function of informing the seated passenger of the presence of the movable member 434. Note that in the case of utilizing the light emission body 466 as the reading light, the color of light emitted from the light emission body 466 is preferably white or a light bulb color.

Eighth Embodiment of Belt Assist Device

Figure 28:
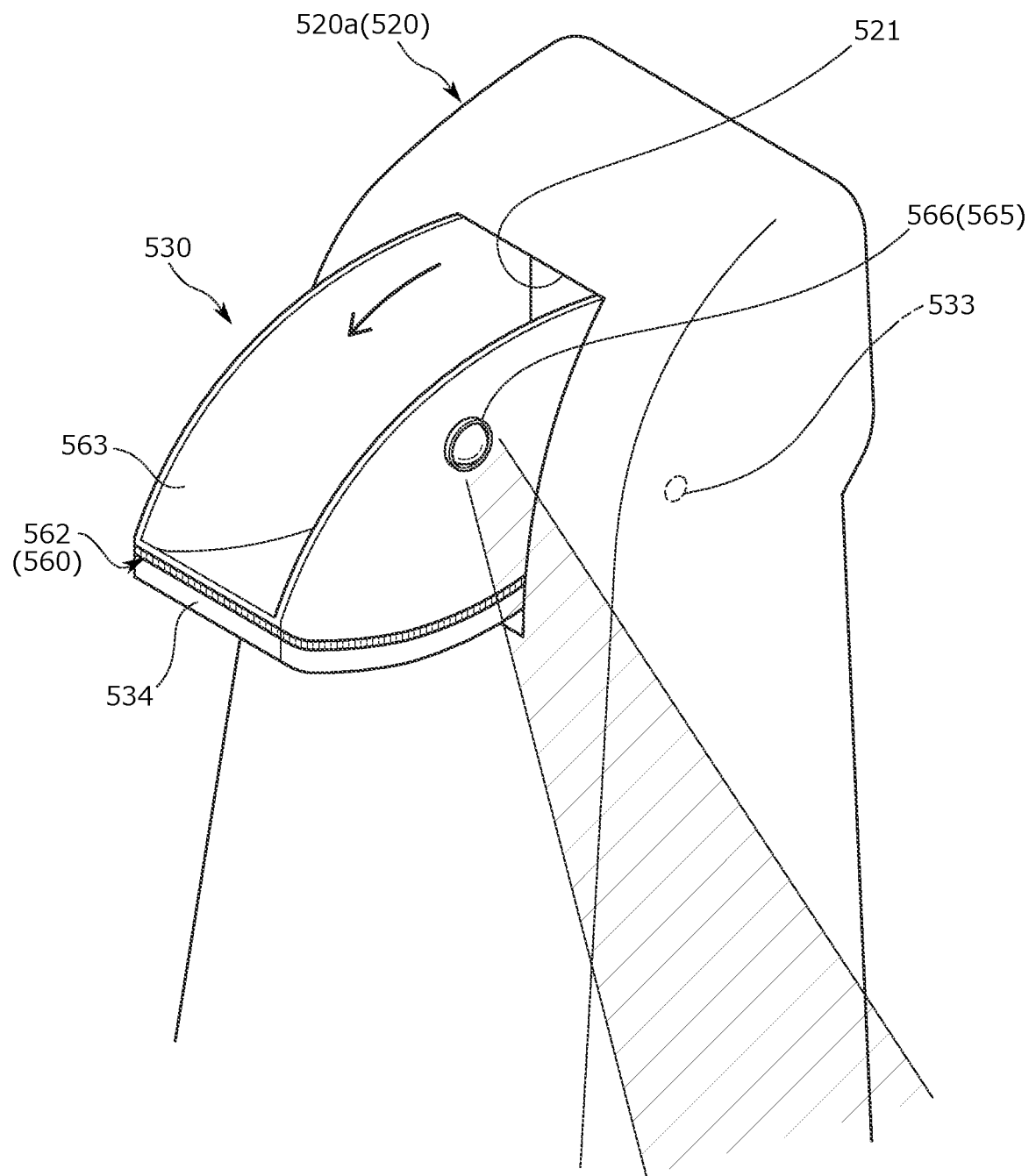
FIG. 28 is an external perspective view of a belt assist device of an eighth embodiment.
Figure 29:
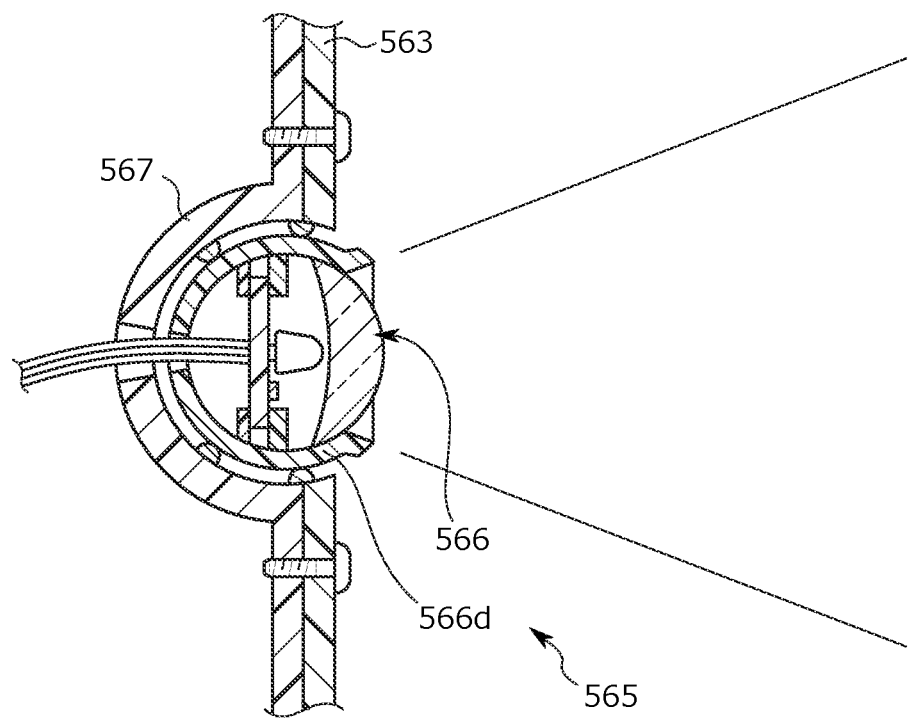
FIG. 29 is a front cross-sectional view of the belt assist device of the eighth embodiment.

Next, the eighth embodiment of the belt assist device is described with reference to FIGS. 28 and 29. A belt assist device 530 of the eighth embodiment is attached to an upper portion of a back side portion 520. As illustrated in FIG. 28, the belt assist device 530 generally includes a rotary shaft 533 pivotally supported in a side base 520a, and a movable member 534 attached via the rotary shaft 533. Moreover, a flat plate-shaped light guide body 562 (a light emission device 560), a cover member 563 having a substantially recessed shape on a back surface (an upper surface) of the light guide body 562, and a light emission body 566 (a light emission device 565) on a seated-passenger-side lateral surface of the cover member 563 are attached to a back surface (an upper surface) of the movable member 534 in a substantially flat plate shape.

The light emission device 560 is a device configured to inform the seated passenger, by light emission, that the movable member 534 is at a protruding position. The light emission device 560 generally includes a light source body (not shown) and the light guide body 562. The light emission device 565 is a device configured to irradiate a seated passenger with light when the movable member 534 is at the protruding position. The light emission device 565 generally includes the light emission body 566 having an LED light source unit, and an assembly member 567 for assembly of the light emission body 566, as illustrated in FIG. 29.

In the above-described configuration, the light emission device 565 is the device configured to irradiate the seated passenger with light, and is attached to the seated-passenger-side lateral surface of the cover member 563. Moreover, the light emission device 565 includes a knob 566d configured to adjust a light distribution angle of the light emission body 566. Thus, the light emission body 566 can more easily illuminate an optional site of the seated passenger, and can be also effectively utilized as, e.g., a reading light in addition to the function of informing the presence of the movable member 534.

Ninth Embodiment of Belt Assist Device

Figure 30:
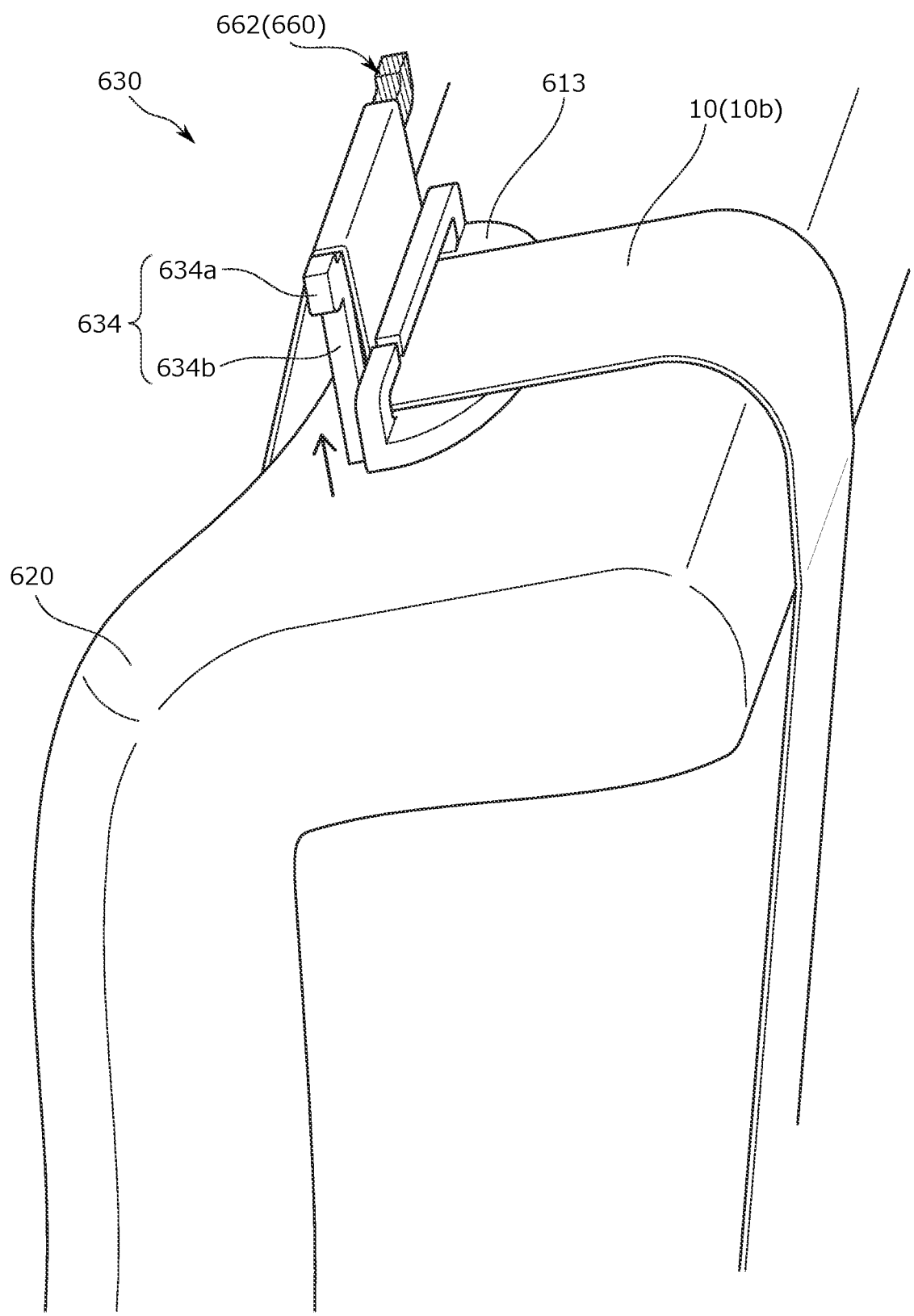
FIG. 30 is an external perspective view of a belt assist device of a ninth embodiment.

Next, the ninth embodiment of the belt assist device is described with reference to FIG. 30. A belt assist device 630 of the ninth embodiment is attached to an upper end portion of a back side portion 620, and is disposed forward of a belt guide 613. The belt assist device 630 is a device configured to move up and down a movable member 634 between a housing position at which the movable member 634 is housed in the back side portion 620 and a protruding position at which the movable member 634 protrudes upward of the back side portion 620 to push a portion of a seatbelt 10 upward.

The movable member 634 generally includes a flat plate-shaped belt support 634a configured to support a portion of the seatbelt 10, and a pair of slide legs 634b configured to support the belt support 634a from below. A light guide body 662 (a light emission device 660) having a flat plate shape is attached to a seated-passenger-side end portion of the belt support 634a in a right-to-left direction. The light emission device 660 is a device configured to inform the seated passenger, by light emission, that the movable member 634 is at the protruding position. The light emission device 660 generally includes a light source body (not shown) and the light guide body 662.

Other Embodiments

In the above-described embodiment, the light emission device 60 is attached to the movable member 34 of the belt assist device 30 as illustrated in FIG. 19, but the present disclosure is not limited to such a configuration. The light emission device 60 may be attached onto the seat back 2 at the periphery of the belt assist device 30, or may be attached to the inside of the seat back 2. Needless to say, the light emission device 60 may be attached to the vehicle body.

Moreover, in the above-described embodiment, the light guide body 62 of the light emission device 60 is, as an indicator section, controlled to continuously emit light while the movable member 34 is at the protruding position. However, the light guide body 62 may be controlled to emit light while blinking Such a configuration can more easily inform the seated passenger of the position of the movable member 34 by blinking light emission of the light guide body 62.

Further, in the above-described embodiment, the light guide body 62 is the light guide plate designed such that polycarbonate resin is injection-molded and the slightly embossed portion and the reflection prisms are provided for light emission. However, this is changeable without limiting the present disclosure to such a configuration. For example, the light guide body 62 may be a light guide plate made of acrylic resin, or may be a soft side light emission fiber etc., needless to say. Similarly, the light source body 61 is not limited to the LED light source. For example, the light source body 61 may be an organic electroluminescent (EL) light source, a light bulb, etc. With such a configuration, the light guide body and the light source body providing brightness, a light emission area, a light emission color optimal for the shape structure of the belt assist device 30 can be selected.

The tenth to thirteenth embodiments of the present disclosure are described below with reference to FIGS. 31 to 42.

Basic Structure of Vehicle Seat

A vehicle seat (hereinafter referred to as a "present seat S") of the present embodiments is first described with reference to FIG. 31. The present seat S forms a back seat of a vehicle. Note that contents of the present disclosure are applicable not only to the back seat, but also to a front seat on a vehicle front side.

Figure 31:
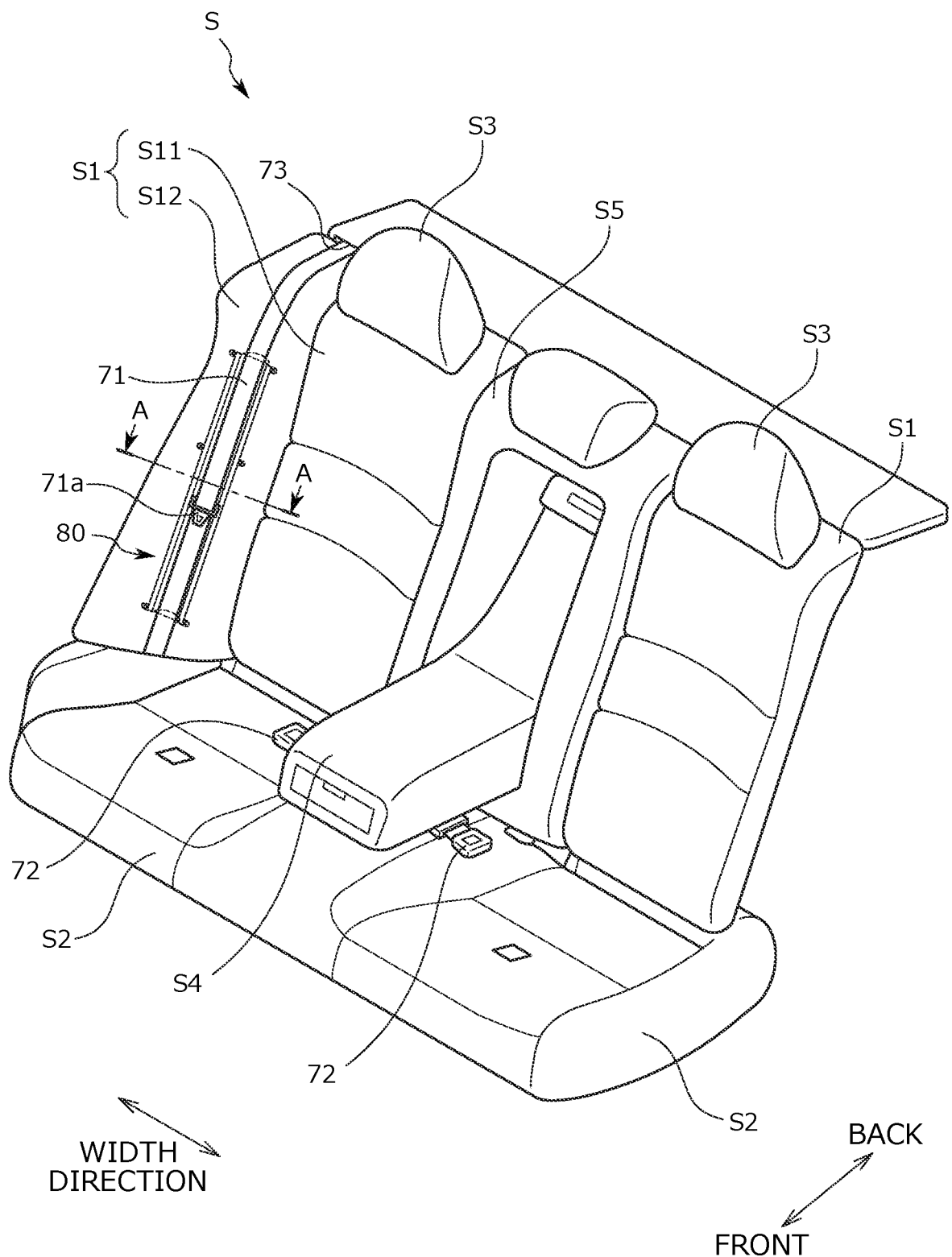
FIG. 31 is a perspective view of a vehicle seat of a tenth embodiment.

Moreover, in a configuration illustrated in FIG. 31, two present seats S are arranged next to each other to sandwich a movable arm rest S4 and a housing box S5 of the arm rest S4. Note that the two right and left present seats S are bilaterally symmetrical, but have substantially similar configurations. Thus, only the structure of the present seat S positioned on the left side (the left side as viewed in FIG. 31) is described below.

As illustrated in FIG. 31, the present seat S includes a seat back S1 on which the upper body of a seated passenger on the seat leans, a seat cushion S2 on which the hip of the seated passenger is placed, and a head rest S3 configured to support the head of the seated passenger. The present disclosure is generally characterized by the seat back S1, and therefore, the seat back S1 is generally described below.

As illustrated in FIG. 31, the seat back S1 includes a support portion S11 configured to support the back of the seated passenger from behind, and a lateral portion S12 positioned lateral to the support portion S11 (precisely, a side close to a vehicle door). The support portion S11 is configured such that a pad material (not shown) placed on a seat back frame (not shown) is covered with a cover material. Moreover, the head rest S3 is attached to the center of an upper end surface of the support portion S11 via a head rest pillar.

Figure 32:
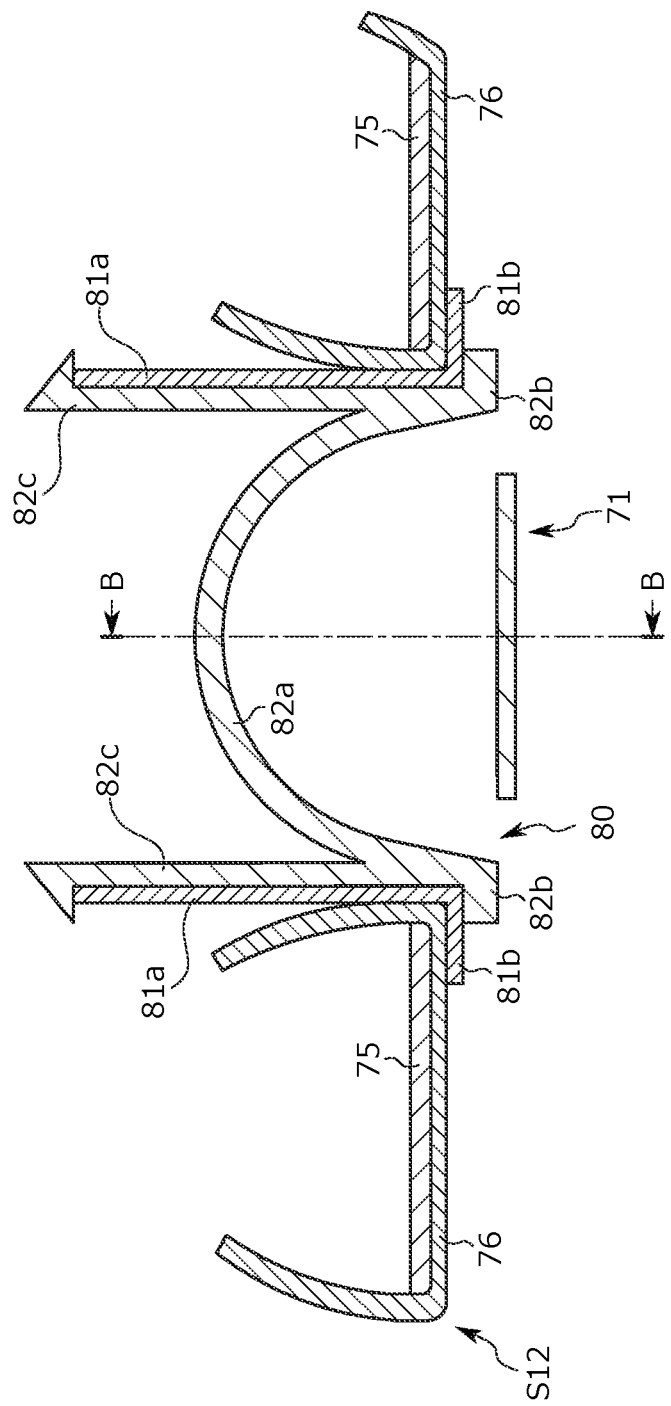
FIG. 32 is a view for describing a space formation portion of the tenth embodiment, and is a cross-sectional view along an A-A line of FIG. 31.

The lateral portion S12 is positioned at the side of the seated passenger on the present seat S, and is configured such that a resin plate 75 illustrated in FIG. 32 is covered with a cover material 76, for example. Moreover, the lateral portion S12 is disposed such that a front surface of the lateral portion S12 is inclined with respect to a front surface of the support portion S11. Further, in the present embodiment, an upper end of the lateral portion S12 is at the same position as that of an upper end of the support portion S11 in an upper-to-lower direction, and a lower end of the lateral portion S12 is at the substantially same position as that of a lower end portion of the support portion S11 in the upper-to-lower direction. A pullout port 73 is provided at an upper back position of the upper end of the lateral portion S12. A webbing 71 of a seatbelt is pulled out of the pullout port 73.

The webbing 71 is equivalent to a belt portion (a band-shaped portion) of the seatbelt. When the seatbelt is at a standby position in an unlocked state, the webbing 71 is disposed at a position illustrated in FIG. 31. The unlocked state described herein means a state in which the posture of the seated passenger is not restrained and a state in which a tongue (a lock metal fitting) 71a attached to a predetermined portion of the webbing 71 is not fixed to a buckle 72 disposed at the side of the seat. Moreover, the standby state means the position of the seatbelt before the seatbelt is fastened (e.g., when the passenger boards the vehicle).

Moreover, when the seatbelt is at the standby position in the unlocked state, the webbing 71 is in such a posture that the webbing 71 is stretched in the upper-to-lower direction by a retractor (not shown) and that the webbing 71 extends longitudinally across the lateral portion S12 as illustrated in FIG. 31. In other words, the front surface of the lateral portion S12 of the seat back S1 includes a region (hereinafter referred to as an "opposing region") facing the webbing 71 from the upper end to the lower end of the lateral portion S12. As illustrated in FIG. 31, the opposing region is a band-shaped region positioned at a center portion of the lateral portion S12 in a width direction. When the seatbelt is at the standby position in the unlocked state, the opposing region faces the webbing 71 from an upper end to a lower end of such a region.

On the other hand, when the seatbelt is fastened, the webbing 71 in the above-described posture is grasped and pulled forward by the seated passenger, and is bridged from the shoulder (the right shoulder) to the left side of the seated passenger. In such a state, when the tongue 71a is attached to the buckle 72, the webbing 71 is locked, and the posture of the seated passenger is restrained by the webbing 71.

Note that when the seatbelt is at the standby position in the unlocked state, the webbing 71 faces a predetermined region of the front surface of the lateral portion S12 in the present embodiments, but the present disclosure is not limited to such a configuration. When the seatbelt is at the standby position in the unlocked state, the webbing 71 may face a predetermined region of the front surface of the support portion S11.

Tenth Embodiment

Figure 33:
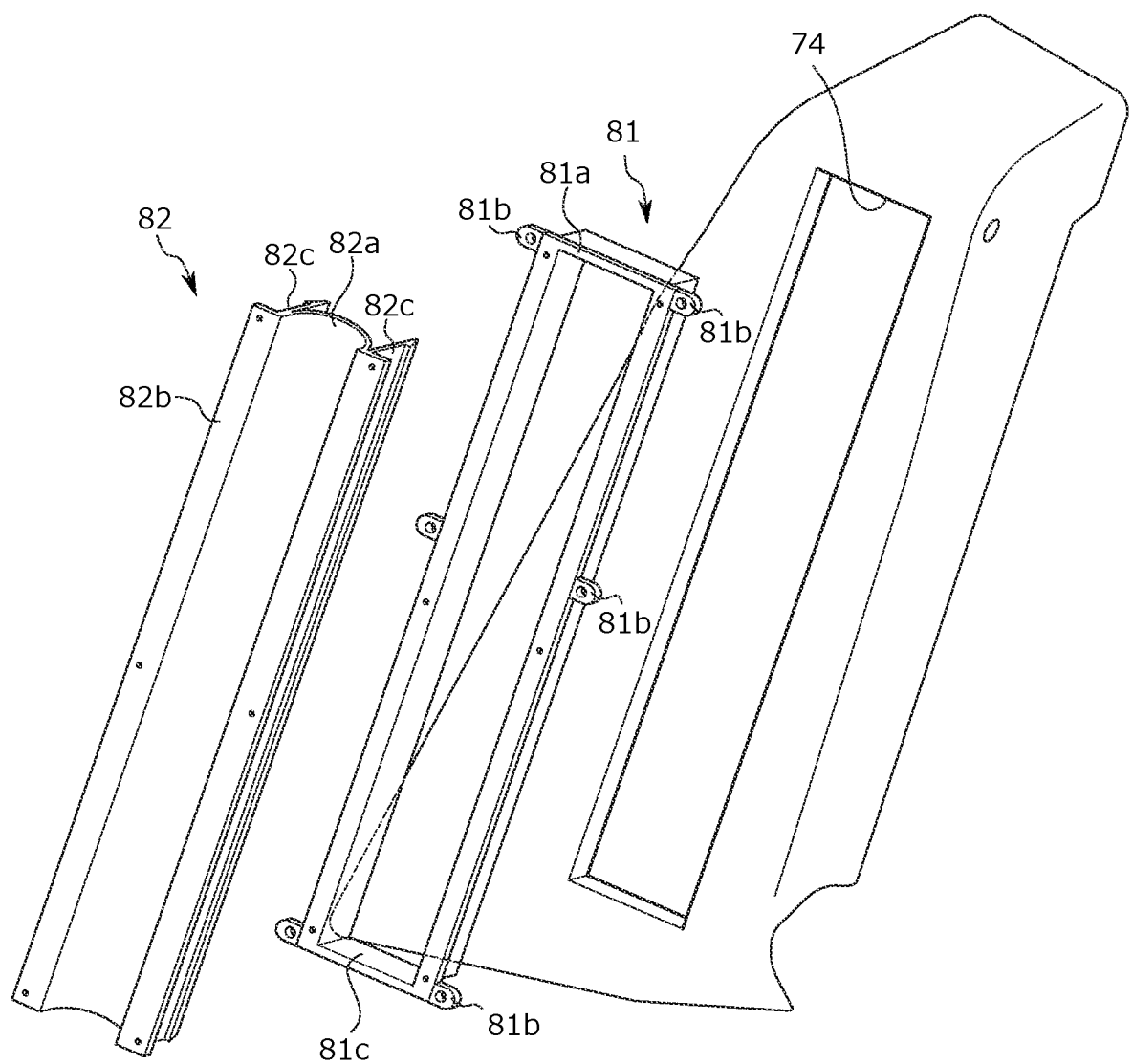
FIG. 33 is an exploded view of the space formation portion of the tenth embodiment.
Figure 34:
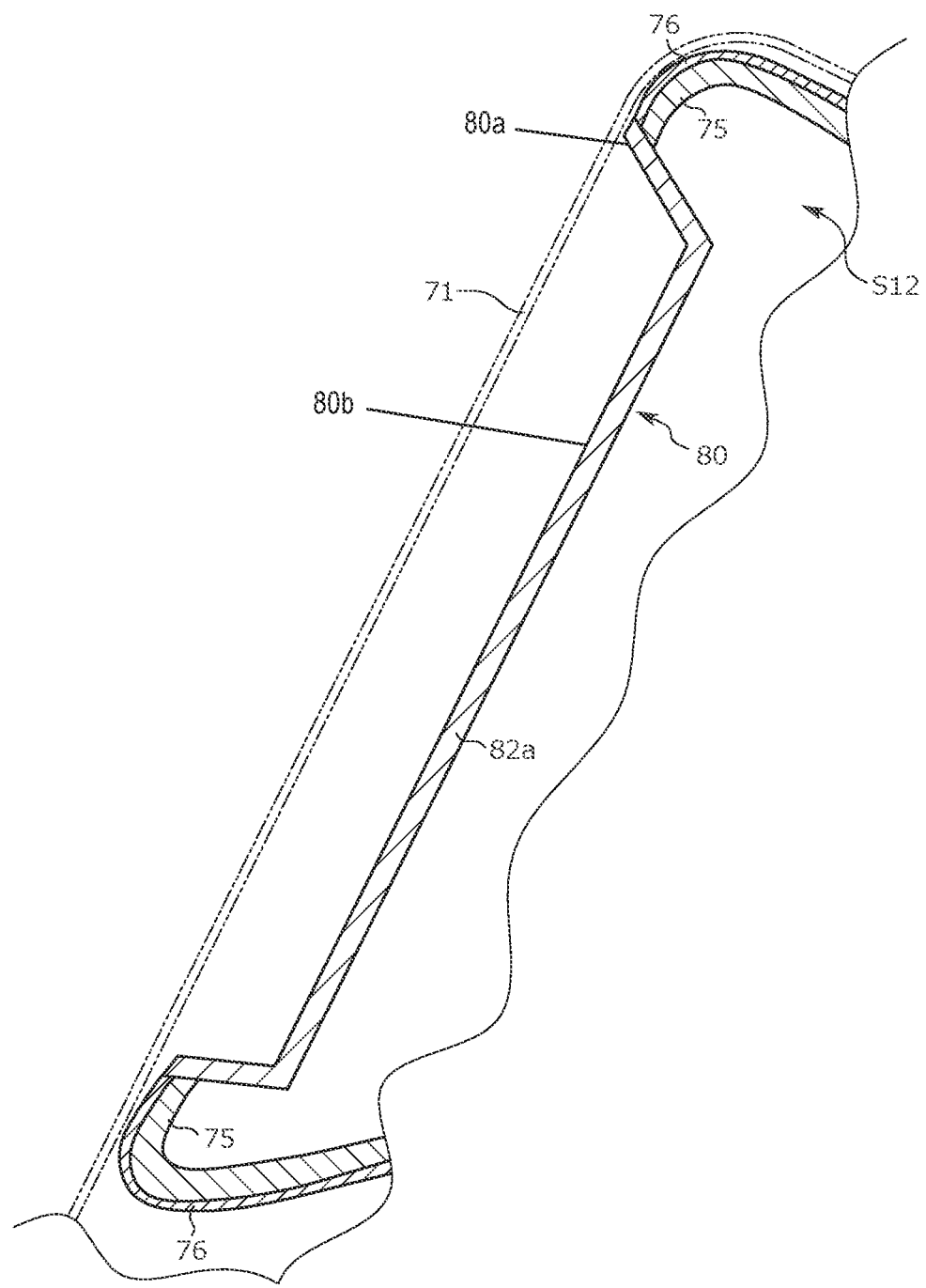
FIG. 34 is a view for describing the space formation portion of the tenth embodiment, and is a cross-sectional view along a B-B line of FIG. 32.

Next, the tenth embodiment is described with reference to FIGS. 31 to 35. In the tenth embodiment, a space formation portion 80 is provided in an opposing region formed at a front surface of a lateral portion S12 of a seat back S1. The space formation portion 80 is provided for forming a space between the opposing region and a webbing 71 as illustrated in FIG. 34 when a seatbelt is at a standby position in an unlocked state. In particular, as illustrated in FIG. 31, the space formation portion 80 is provided across the substantially entirety of the opposing region in an upper-to-lower direction.

Since the space formation portion 80 forms the space between the opposing region and the webbing 71, a seated passenger easily grasps the webbing 71. Specifically, since the above-described space is formed, a space is ensured, into which the seated passenger inserts one's finger between the opposing region and the webbing 71 to grasp the webbing 71.

The space formation portion 80 is provided in the opposing region as described above, and is formed by a recessed portion recessed with respect to the periphery of a portion provided with the space formation portion 80. In order to provide such a recessed portion in the opposing region, a decorative component illustrated in FIGS. 32 and 33 is used. The decorative component (i.e., the space formation portion 80) for formation of the recessed portion includes two components, and specifically includes an inner portion 81 and an outer portion 82. The materials of the inner portion 81 and the outer portion 82 are not particularly limited, but a resin molded article or a metal member is a preferable material, for example.

The inner portion 81 includes, as a body, a quadrangular frame body 81a, and the outer portion 82 is housed in a housing space 81c formed in the frame body 81a. Moreover, each portion of the frame body 81a has an L-shaped cross sectional shape. Tongue-shaped protrusions 81b extend outward respectively from corner and center portions of the frame body 81a, as illustrated in FIG. 33. These tongue-shaped protrusions 81b are attached to the opposing region of the lateral portion S12 by fasteners such as bolts or screws. Specifically, as illustrated in FIG. 33, a rectangular hole 74 corresponding to the outer shape of the frame body 81a is formed in the opposing region. The frame body 81a is fitted into the rectangular hole 74 while the protrusions 81b are fastened to a portion of the lateral portion S12 at the periphery of the rectangular hole 74.

The outer portion 82 has a half cylindrical curved portion 82a and a lateral end portion attached to each lateral end of the curved portion 82a and having a substantially L-shaped cross section. The curved portion 82a is a portion forming a recessed portion. Specifically, when the outer portion 82 is assembled with the inner portion 81, the curved portion 82a is fitted into the inside of the frame body 81a of the inner portion 81, i.e., the housing space 81c, in the state in which a surface on a recessed side is positioned on a front side. Note that for the purpose of improving decorativeness of the outer portion 82, a cover material similar to a cover material 76 used as the material of the lateral portion S12 may be attached to the surface of the curved portion 82a on the recessed side.

Of the L-shaped lateral end portion, a portion forming one side is a protruding portion 82b protruding outward from each end of the curved portion 82a. The protruding portion 82b is screwed to the frame body 81a of the inner portion 81 when the outer portion 82 is assembled with the inner portion 81. Of the L-shaped lateral end portion, a portion forming the other side is a perpendicular portion 82*c* extending in a direction perpendicular to the protruding portion 82*b*. When the outer portion 82 is assembled with the inner portion 81, the perpendicular portion 82*c* is inserted into the housing space 81*c* formed in the frame body 81*a*. Subsequently, the perpendicular portion 82*c* engages, at a tip end portion in an extension direction thereof, with the frame body 81*a* as illustrated in FIG. 32. Since the perpendicular portion 82*c* engages with the frame body 81*a* as described above, a favorable assembly state of the outer portion 82 and the inner portion 81 is held.

The decorative component configured such that the outer portion 82 is assembled with the inner portion 81 is fixed to the lateral portion S12 in the state in which the decorative component is fitted into the rectangular hole 74 formed at the lateral portion S12, thereby functioning as the space formation portion 80. More specifically, in a vehicle equipped with a present seat S, the above-described decorative component is disposed in the opposing region such that an opening of the outer portion 82 assembled with the inner portion 81 faces the front surface of the lateral portion S12. On the other hand, as illustrated in FIG. 31, when the seatbelt is at the standby position in the unlocked state, the webbing 71 is at a front position of the above-described opening. As a result, as illustrated in FIG. 34, when the seatbelt is at the standby position in the unlocked state, the space of the recessed portion formed by the outer portion 82 is formed between the webbing 71 and the front surface (precisely, the opposing region) of the lateral portion S12.

In the present embodiment, the length of the above-described recessed portion in a horizontal width direction is longer than the width of the webbing 71 as illustrated in FIG. 32. Thus, when the seatbelt is at the standby position in the unlocked state, one end and the other end of the webbing 71 in the width direction are positioned between one end and the other end of the recessed portion in the horizontal width direction. The horizontal width of the recessed portion described herein is the opening width of the recessed portion, and the horizontal width direction is a direction along the width direction of the present seat S.

Simply speaking, each end of the recessed portion in the horizontal width direction is positioned outside a corresponding one of the ends of the webbing 71 in the width direction. Thus, the size (particularly, the length in the horizontal width direction) of the recessed portion is large, but the finger can be inserted into the space of the recessed portion from each end of the webbing 71 in the width direction. This allows the seated passenger to more easily grasp the webbing 71.

Note that in the above-described embodiment, each end of the recessed portion in the horizontal width direction is positioned outside a corresponding one of the ends of the webbing 71 in the width direction. However, the present disclosure is not limited to such a configuration. Only one of the ends of the recessed portion in the horizontal width direction may be positioned outside a corresponding one of the ends of the webbing 71 in the width direction. In other words, when the seatbelt is at the standby position in the unlocked state, one end (the left end) of the recessed portion in the horizontal width direction may be positioned farther from one end (the right end) of the webbing 71 in the width direction than from the other end (the left end) of the webbing 71 in the width direction, and the other end of the recessed portion in the horizontal width direction may be positioned between one end and the other end of the webbing 71 in the width direction. In such a positional relationship, the recessed portion is provided at a position close to one end side of the webbing 71 in the width direction. According to such a configuration, e.g., when the finger is inserted into the space of the recessed portion, the finger is inserted only from one end side (the left side) of the webbing 71 in the width direction. Although there are certain limitations on a direction in which the finger is inserted as described above, the size of the recessed portion can be more reduced according to the above-described configuration.

When compactness of the size of the recessed portion is more emphasized than easy grasping of the webbing 71, each end of the recessed portion in the horizontal width direction may be positioned inside both ends of the webbing 71 in the width direction.

Of the dimensions of the recessed portion, a length in a direction (i.e., the upper-to-lower direction) intersecting the horizontal width direction of the recessed portion is, in the present embodiment, longer than a length in the horizontal width direction as illustrated in FIGS. 31 and 33. Simply speaking, the recessed portion forming the space formation portion 80 is an elongated recessed portion in the tenth embodiment. In this case, the space of the recessed portion is also formed elongated. With such an elongated recessed portion, the seated passenger can easily grasp the webbing 71 regardless of the body type of the seated passenger.

Moreover, in the present embodiment, the recessed portion forming the space formation portion 80 has a cross-sectional shape such that the webbing 71 can be more easily grasped. Specifically, the recessed portion is provided with an opening 80*a* facing the webbing 71 and a bottom surface 80*b* positioned opposite to the opening. In the tenth embodiment, the area of the opening of the recessed portion is larger than that of the bottom surface of the recessed portion. More specifically, the recessed portion of the present embodiment expands from the bottom surface toward an opening end as illustrated in FIG. 34. As long as the recessed portion is in a shape such that the opening is larger than the bottom surface as described above, the finger can be more easily inserted into the recessed portion. Thus, the webbing 71 can be much more easily grasped.

The degree of expansion of the recessed portion from the bottom surface 80*b* toward the opening 80*a* is lower in the upper-to-lower direction than in the horizontal width direction. In other words, a difference between the length of the opening 80*a* and the length of the bottom surface 80*b* is smaller in the upper-to-lower direction than in the horizontal width direction. With such a size relationship, the size of the recessed portion can be further reduced.

Further, in the present embodiment, the component forming the space formation portion 80 and a component forming a peripheral portion of the space formation portion 80 are separate components as illustrated in FIG. 33. Specifically, the decorative component forms the space formation portion 80, and is incorporated into the present seat S in such a manner that the decorative component is fitted into the rectangular hole 74 formed in the opposing region of the lateral portion S12 of the seat back S1. The decorative component incorporated into the present seat S is assembled and integrated with a portion of the lateral portion S12 at the periphery of the decorative component. As described above, in the present embodiment, the component forming the space formation portion 80 is separated from the peripheral component, and therefore, the degree of freedom in molding of the space formation portion 80 is increased. Thus, in the present embodiment, the space formation portion 80 molded into a desired shape can be more easily obtained.

In the configuration in which the component forming the space formation portion 80 and the peripheral component are separated from each other, a seat manufacturing cost is increased by such a configuration. On the other hand, when the component forming the space formation portion 80 and the peripheral component are integrally molded, the cost can be reduced to a lower cost. Note that examples of such a method include a method in which the above-described recessed portion is integrally (simultaneously) molded with the lateral portion S12 (precisely, a resin plate 75 as a base portion of the lateral portion S12) when the lateral portion S12 is molded by vacuum molding.

Figure 35:
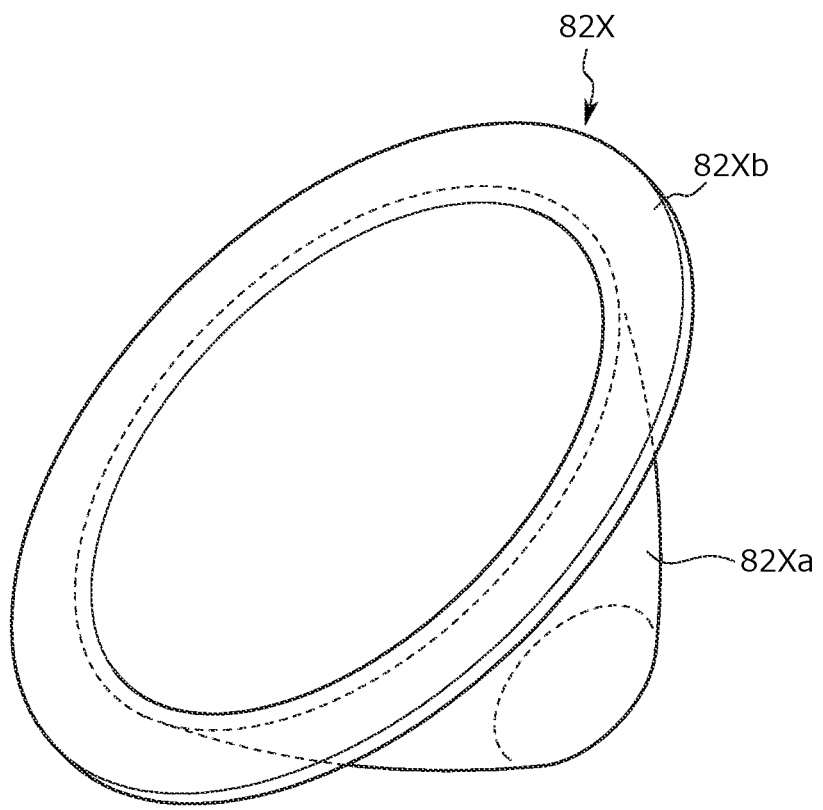
FIG. 35 is a view of a variation of the shape of the space formation portion.

In the present embodiment, the recessed portion forms the space formation portion 80, and particularly, the recessed portion formed by the half cylindrical component (specifically, the outer portion 82 of the decorative component) forms the space formation portion 80. The shape of the recessed portion described herein is not particularly limited. For example, a bowl-shaped component may form the recessed portion as illustrated in FIG. 35. The component illustrated in FIG. 35 is equivalent to a variation of the outer portion 82 of the decorative component forming the recessed portion, and is hereinafter referred to as an "outer portion 82X" of the variation. The outer portion 82X of the variation has, as illustrated in FIG. 35, a bowl-shaped portion 82Xa functioning as a portion forming the recessed portion, and a flange portion 82Xb as a peripheral edge portion of an opening end of the bowl-shaped portion 82Xa. The bowl-shaped portion 82Xa is equivalent to the curved portion 82a of the outer portion 82 described above, and the flange portion 82Xb is equivalent to the protruding portion 82b of the outer portion 82. Using the outer portion 82X of the variation, the bowl-shaped recessed portion is formed.

In addition, in the present embodiment, the recessed portion forms the space formation portion 80 as described above, but the present disclosure is not limited to such a configuration. That is, as long as the space is formed between the opposing region and the webbing 71 when the seatbelt is at the standby position in the unlocked state, the space formation portion 80 is not limited to the recessed portion, and a raised portion may form the space formation portion 80.

Eleventh Embodiment

Next, the eleventh embodiment is described with reference to FIGS. 36 to 38. In the eleventh embodiment, an airbag module M is built in a lateral portion S12 of a seat back S1. The airbag module M is a module of an airbag (precisely, a side airbag) configured to expand when a lateral impact load acts on a vehicle and equipment relating to the airbag. Note that in the present embodiment, the airbag module M (indicated by a dashed line in FIG. 36) is disposed on a back side of an opposing region of the lateral portion S12 as illustrated in FIG. 36.

In the present embodiment, each space formation portion 180 is, in the opposing region, provided to deviate from a portion where the airbag module M is disposed behind. Specifically, as illustrated in FIG. 36, the space formation portions 180 are provided respectively at upper and lower positions of the portion where the airbag module M is disposed behind. Each space formation portion 180 is different from the space formation portion 80 of the tenth embodiment in size (particularly, a length in an upper-to-lower direction), but has functions and a basic structure common to those of the space formation portion 80 of the tenth embodiment. As described above, in the present embodiment, since each space formation portion 180 is, in the opposing region, provided to deviate from the portion where the airbag module M is disposed behind, influence of the space formation portions 180 on actuation of the airbag module M can be reduced.

Figure 36:
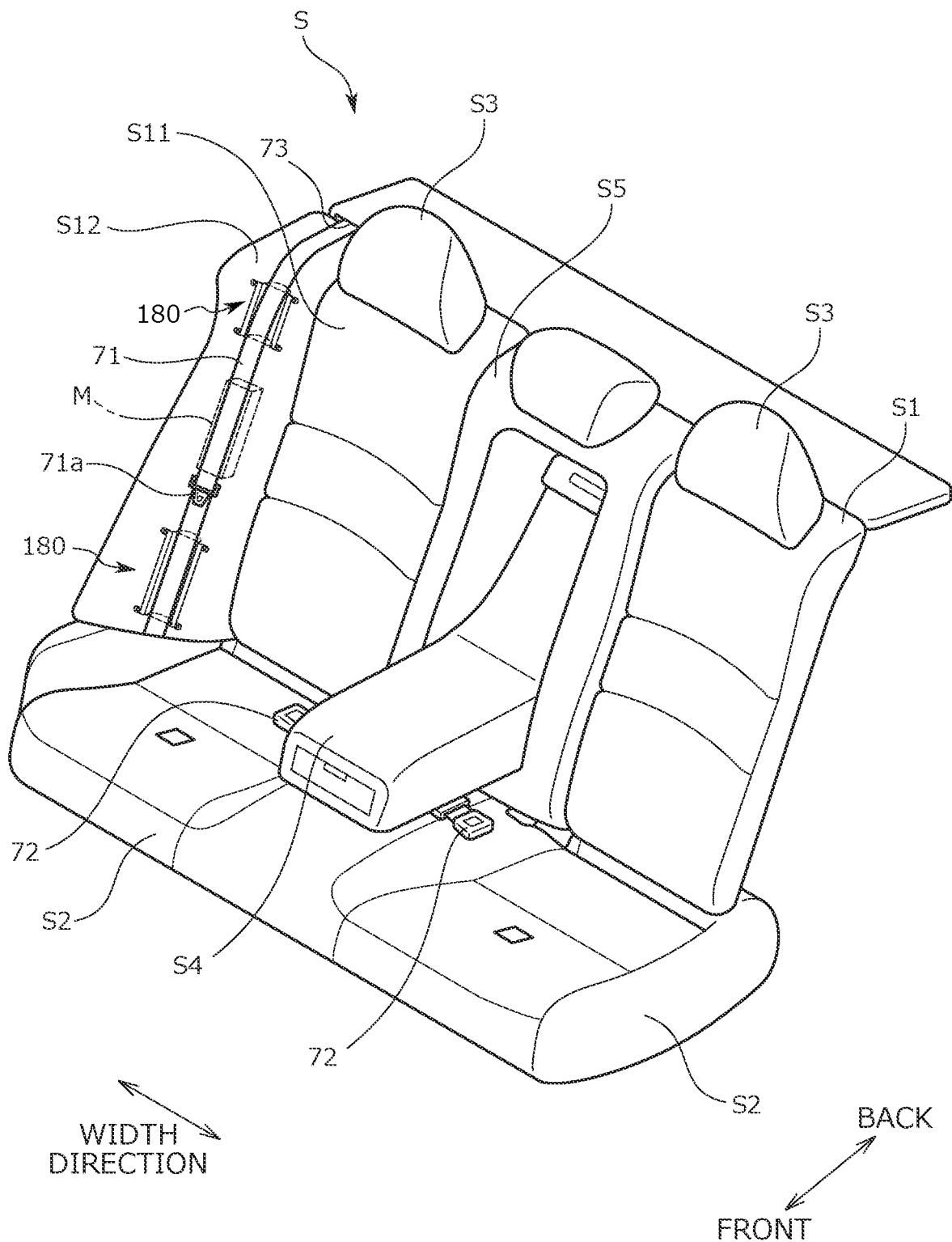
FIG. 36 is a perspective view of a vehicle seat of an eleventh embodiment.
Figure 37:
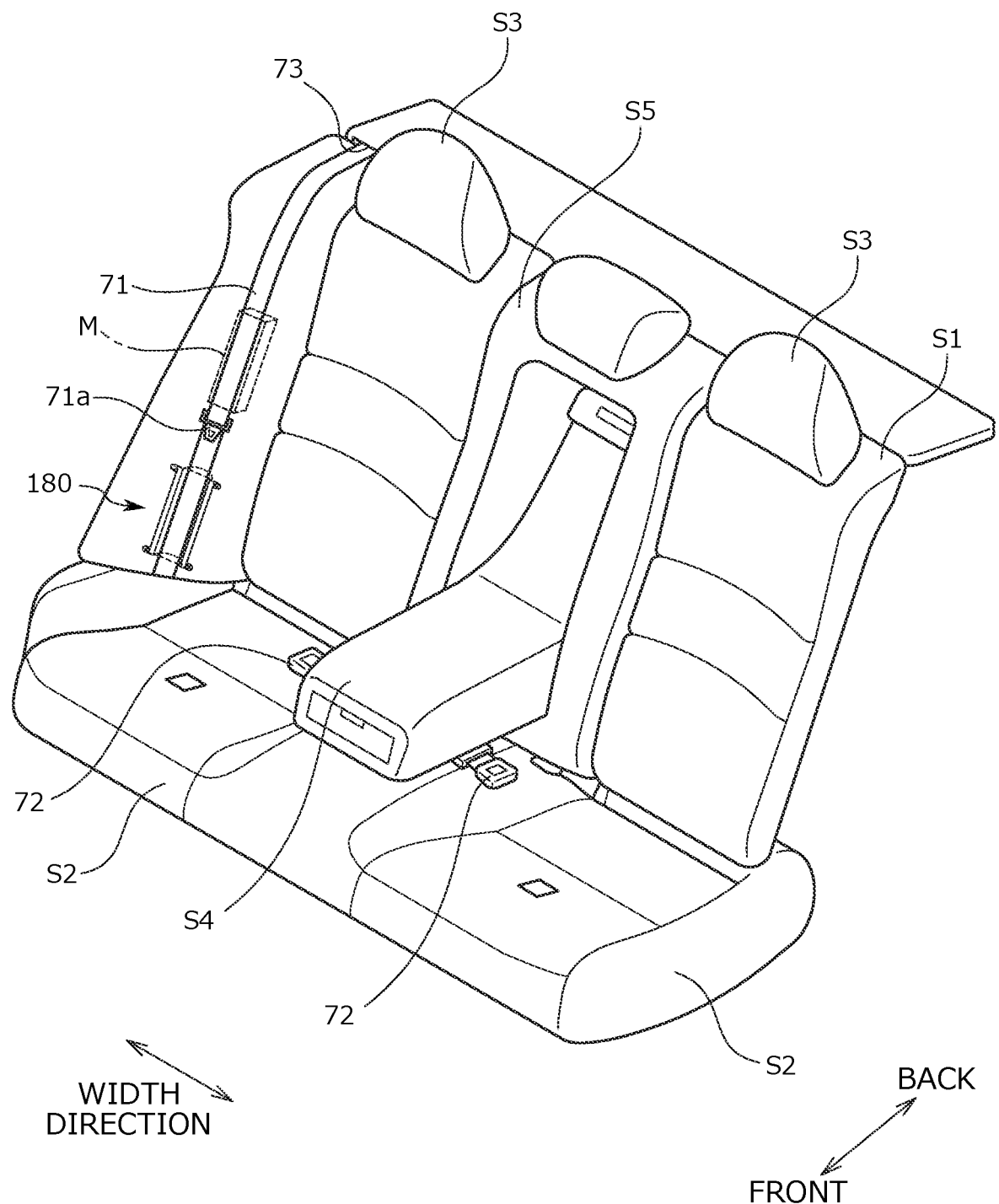
FIG. 37 is a view of a variation regarding the number of space formation portions to be arranged.

Note that in a case illustrated in FIG. 36, the space formation portions 180 are, in the opposing region, provided respectively at the upper and lower positions deviating from the portion behind which the airbag module M is disposed. Note that the present disclosure is not limited to such a configuration, and the space formation portion 180 may be provided only at the lower position of the portion where the airbag module M is disposed behind as illustrated in FIG. 37.

Figure 38:
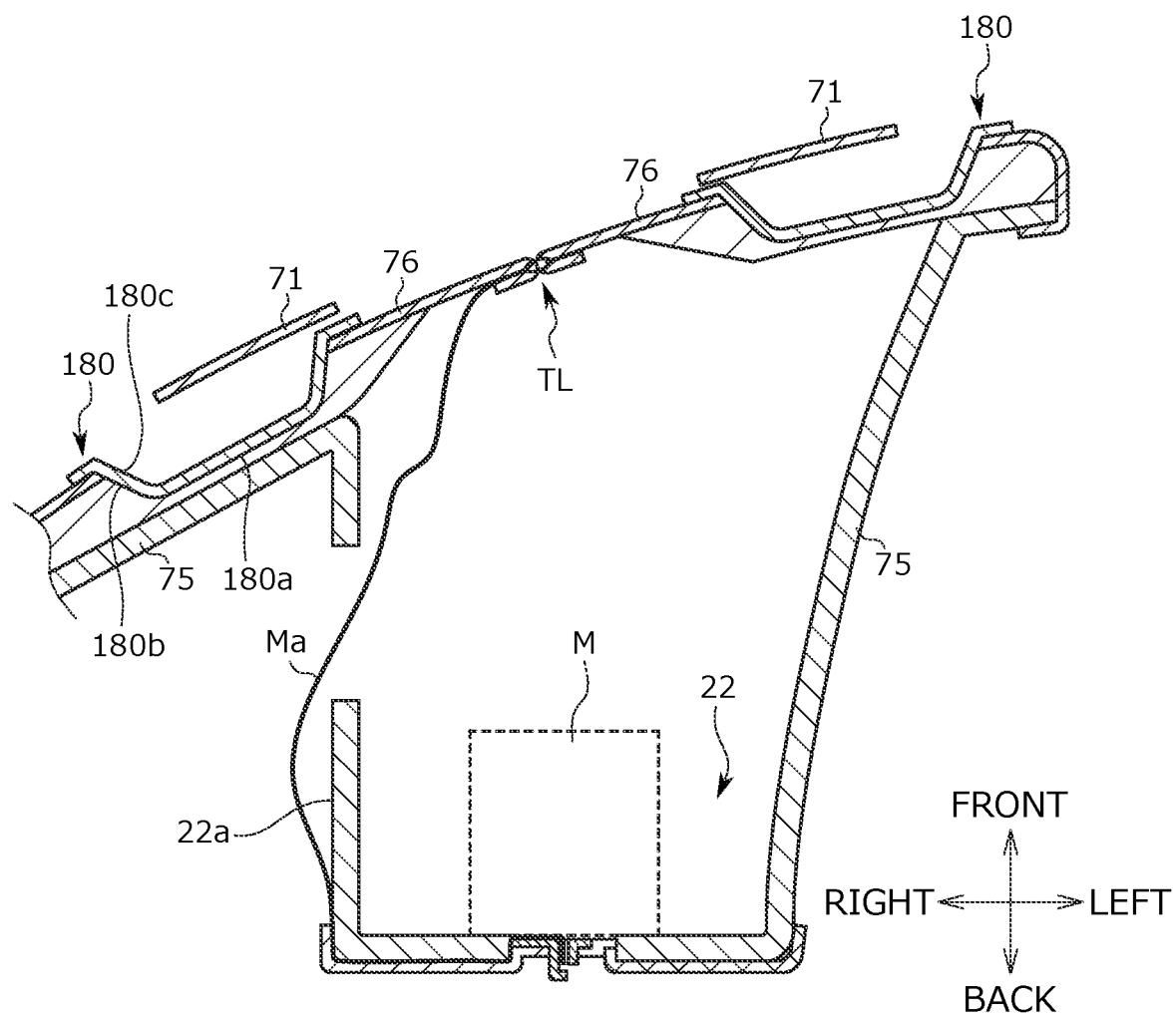
FIG. 38 is a view of a variation regarding the arrangement position of each space formation portion, and is a schematic cross-sectional view of a lateral portion along the horizontal plane.

Alternatively, as illustrated in FIG. 38, the space formation portions 180 may be arranged respectively at positions different from the arrangement position of the airbag module M in a right-to-left direction. In this case, the space formation portions 180 may be arranged to avoid a portion where a webbing Ma extending from the airbag module M is connected to the lateral portion S12, i.e., a portion as a break line TL in airbag expansion. Note that in FIG. 38, the space formation portions 180 are provided respectively on both sides of the break line TL for the sake of illustration, but the space formation portion 180 may be actually provided on one side. That is, when a seatbelt is at a standby position in an unlocked state, if the webbing 71 is positioned on the right side of the break line TL, the space formation portion 180 is preferably provided on the right side of the break line TL. If the webbing 71 is positioned on the left side of the break line TL, the space formation portion 180 is preferably provided on the left side of the break line TL.

Although not shown in the figure, it may be configured such that the space formation portion 180 is, in the opposing region, provided at the portion behind which the airbag module M is disposed. With such a configuration, a space between the webbing 71 and the airbag module M is effectively utilized so that the space formation portion 180 can be efficiently disposed.

Twelfth Embodiment

Figure 39:
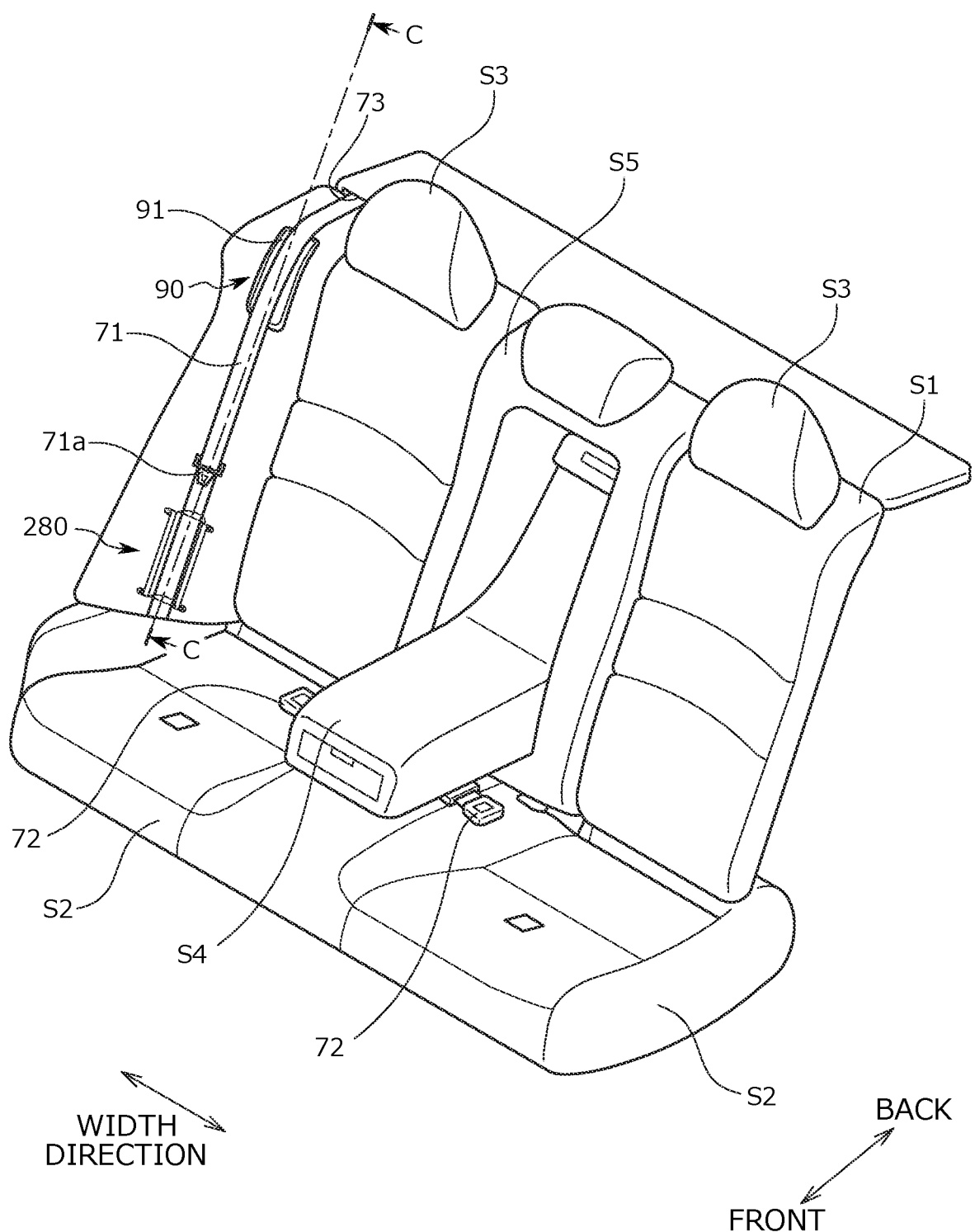
FIG. 39 is a perspective view of a vehicle seat of a twelfth embodiment.
Figure 40:
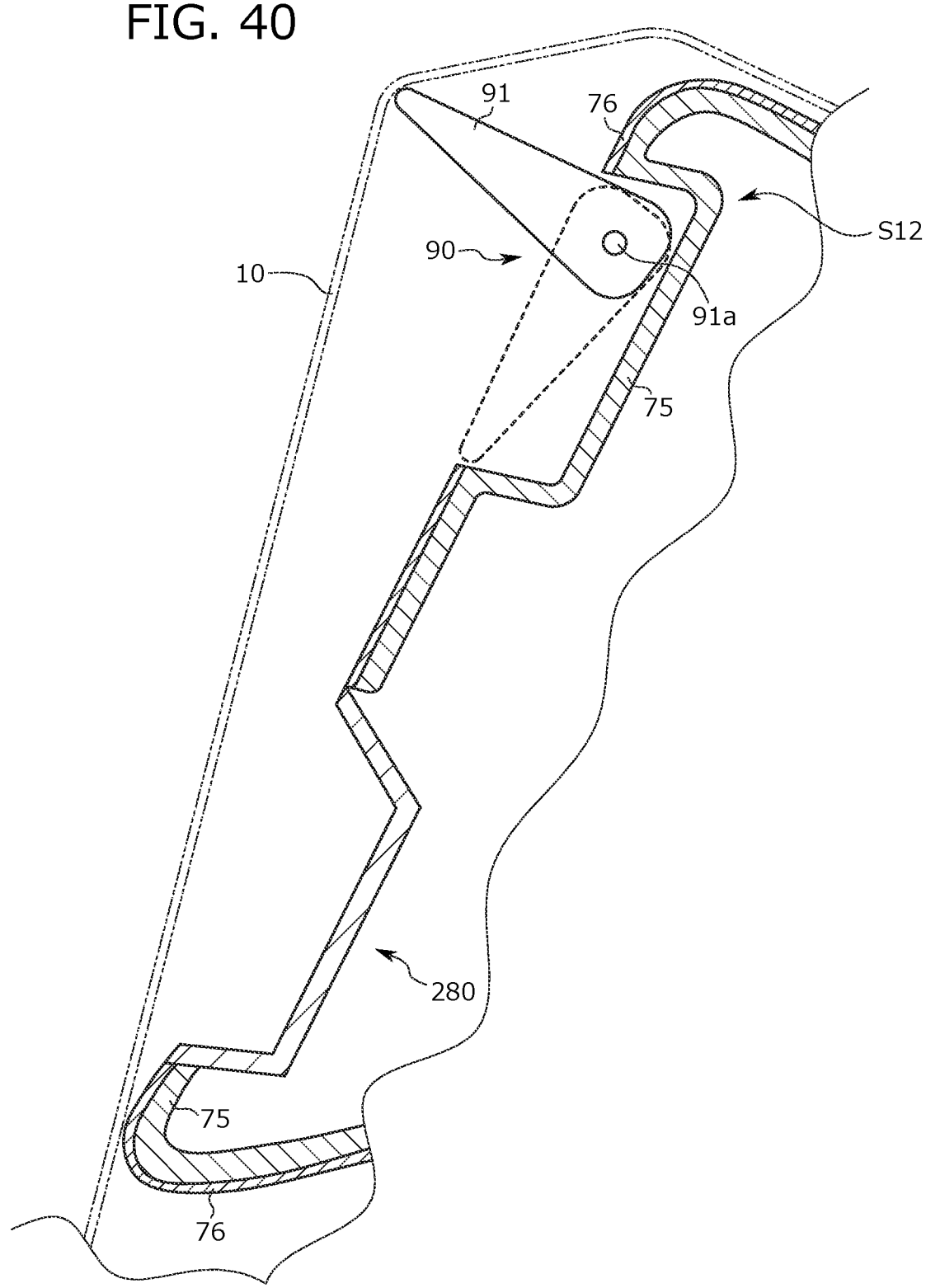
FIG. 40 is a view for describing a space formation portion of the twelfth embodiment, and is a cross-sectional view along a C-C line of FIG. 39.

Next, the twelfth embodiment is described with reference to FIGS. 39 and 40. In the twelfth embodiment, a belt reacher 90 as a pushout mechanism is attached to an upper portion of an opposing region as illustrated in FIG. 39. As illustrated in FIG. 40, the belt reacher 90 includes a pushout body 91 formed in a substantially triangular shape as viewed from the side. The pushout body 91 is housed in a housing space provided at a lateral portion S12 of a seat back S1. Moreover, the pushout body 91 is supported by a rotary shaft 91a provided in the housing space, thereby freely rotating back and forth and up and down. The pushout body 91 receives force from an actuator (not shown) to rotate about the rotary shaft 91a.

At one end position (a position indicated by a dashed line in FIG. 40) of a rotation area of the pushout body 91, the pushout body 91 is completely housed in the housing space provided at the lateral portion S12. In such a state, the pushout body 91 does not protrude forward of a front surface of the lateral portion S12, and an opening of the housing space is substantially closed by a top surface of the pushout body 91 as illustrated in FIG. 40. On the other hand, at the other end position (a position indicated by a solid line in FIG. 40) of the rotation area of the pushout body 91, a top corner portion of the pushout body 91 somewhat protrudes forward of the front surface of the lateral portion S12. As a result, the top corner portion of the pushout body 91 comes into contact with a back surface of a portion of a webbing 71 of a seatbelt positioned right in front of the top corner portion of the pushout body 91, thereby pushing such a portion forward.

As described above, in the present embodiment, since the belt reacher 90 is attached, the webbing 71 can be, in fastening of the seatbelt, more easily grasped by functions of the belt reacher 90. Further, a space formation portion 280 is formed to deviate, in an upper-to-lower direction, from a portion attached to the belt reacher 90 in the opposing region. More specifically, the space formation portion 280 is, in the opposing region, provided at a lower position of the portion attached to the belt reacher 90 as illustrated in FIG. 39. Note that the space formation portion 280 of the present embodiment is different from the space formation portion 80 of the tenth embodiment in size (particularly, a length in the upper-to-lower direction), but has functions and a basic structure common to those of the space formation portion 80 of the tenth embodiment.

As described above, in the present embodiment, it is configured such that the belt reacher 90 and the space formation portion 280 are used in combination. With such a configuration, while the belt reacher 90 can be effectively utilized, the space formation portion 280 can be also used to much more easily grasp the webbing 71 of the seatbelt. Moreover, in the present embodiment, the belt reacher 90 and the space formation portion 280 can be utilized in a complementary manner. For example, when the pushout amount (the rotation amount) of the pushout body 91 is decreased, the space formation portion 280 covers a function lost by such a decrease. As a result, the size of the belt reacher 90 can be reduced while easy grasping of the webbing 71 can be ensured. Moreover, according to the above-described configuration, the space formation portion 280 can be efficiently disposed by effective utilization of a space at a lower position of the belt reacher 90.

Note that in the present embodiment, the space formation portion 280 is, in the opposing region, provided at the lower position of the portion attached to the belt reacher 90, but the present disclosure is not limited to such a configuration. The space formation portion 280 may be provided at an upper position of the portion attached to the belt reacher 90. Alternatively, the space formation portions 280 may be provided respectively at the upper and lower positions of the portion attached to the belt reacher 90.

Thirteenth Embodiment

Figure 41:
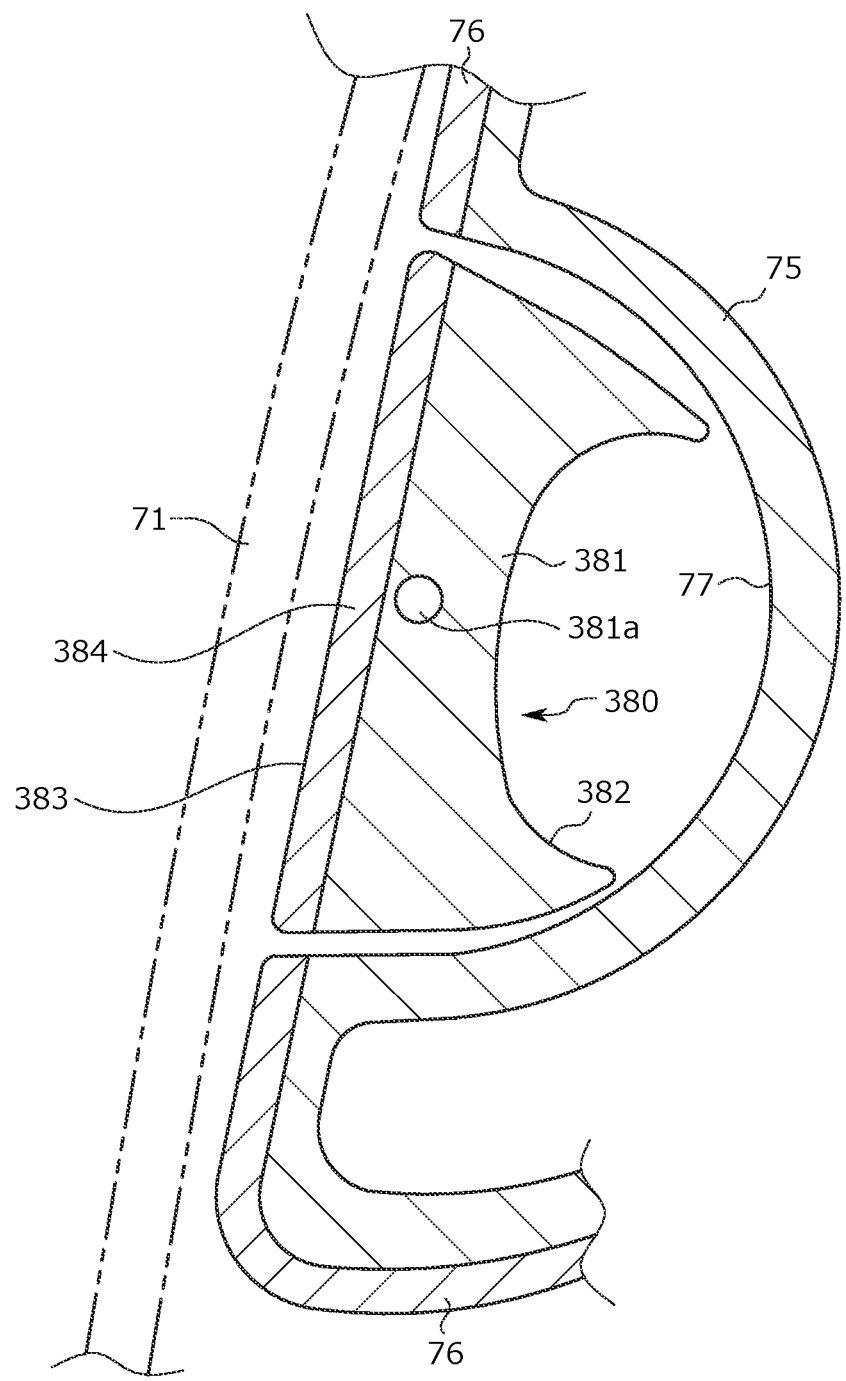
FIG. 41 is a view for describing a space formation portion of a thirteenth embodiment, and is a schematic cross-sectional view of the periphery of the space formation portion along the vertical plane at a first time.

Next, the thirteenth embodiment is described with reference to FIGS. 41 and 42. In the thirteenth embodiment, a space formation portion 380 is also provided in an opposing region of a front surface of a lateral portion S12 of a seat back S1 as in other embodiments. In the thirteenth embodiment, a component forming the space formation portion 380 is a movable member configured to move to switch an exposed surface. The exposed surface described herein is a surface positioned at the front surface of the lateral portion S12 and facing a webbing 71 when a seatbelt is at a standby position in an unlocked state, i.e., a surface positioned in the opposing region.

The movable member forming the space formation portion 380 is a rotary member 381 rotatably supported by a rotary shaft 381*a*. An axial direction of the rotary shaft 381*a* is along a width direction of a present seat S. Moreover, the rotary member 381 has two surfaces arranged on opposite sides with the rotary shaft 381*a* being sandwiched therebetween. A first surface 382 as one surface is equivalent to a recessed portion formation surface, and is a curved surface provided with an arc-shaped recess as illustrated in FIGS. 41 and 42. More specifically, the first surface 382 is curved such that a center portion of the first surface 382 in a rotation direction of the rotary member 381 is depressed. Note that both end portions of the first surface 382 in the rotation direction are somewhat raised with respect to the center portion.

Of the two surfaces of the rotary member 381, a second surface 383 as the other surface is a surface not provided with a recess and formed along the front surface shape of the seat back S1. Moreover, the second surface 383 is formed by a cover material 384 attached to the rotary member 381. Such a cover material 384 is similar to a cover material 76 used for the lateral portion S12.

Further, the rotary member 381 is housed in a half cylindrical cavity 77 formed at the lateral portion S12. The rotary member 381 rotates in the cavity 77 such that the surface exposed in the opposing region is switched between the first surface 382 and the second surface 383. That is, the rotary member 381 reciprocates, by rotation about the rotary shaft 381*a*, between a position at which only the second surface 383 of the first and second surfaces 382, 383 is exposed in the opposing region and a position at which the first surface 382 of the first and second surfaces 382, 383 is exposed in the opposing region. Note that the position at which only the second surface 383 of the first and second surfaces 382, 383 is exposed in the opposing region is equivalent to a position at which the recessed portion formation surface deviates from the opposing region. Specifically, such a position is a position illustrated in FIG. 41, and is hereinafter referred to as a "normal position." On the other hand, the position at which the first surface 382 of the first and second surfaces 382, 383 is exposed in the opposing region is equivalent to a position at which the recessed portion formation surface is exposed in the opposing region. Specifically, such a position is a position illustrated in FIG. 42, and is hereinafter referred to as a "recessed portion formation position."

The states of the rotary member 381 at the normal position and the recessed portion formation position are now described. In the state at the normal position, the second surface 383 is exposed through an opening of the cavity 77. Moreover, when the rotary member 381 is at the normal position, the second surface 383 is at a position such that the second surface 383 is continuous to a portion of the front surface of the lateral portion S12 at the periphery of the second surface 383 as illustrated in FIG. 41. Further, the second surface 383 is formed by the same cover material 384 as the cover material 76 used for the lateral portion S12. Thus, in the state of the rotary member 381 at the normal position, outer appearance is provided as if the rotary member 381 and the peripheral portion thereof are integrated together. Since the rotary member 381 is, for example, placed at the normal position as described above when the seatbelt is not fastened, the rotary member 381 (precisely, a recessed portion formed by the first surface 382) is hidden, and therefore, designability of the seat can be ensured.

Figure 42:
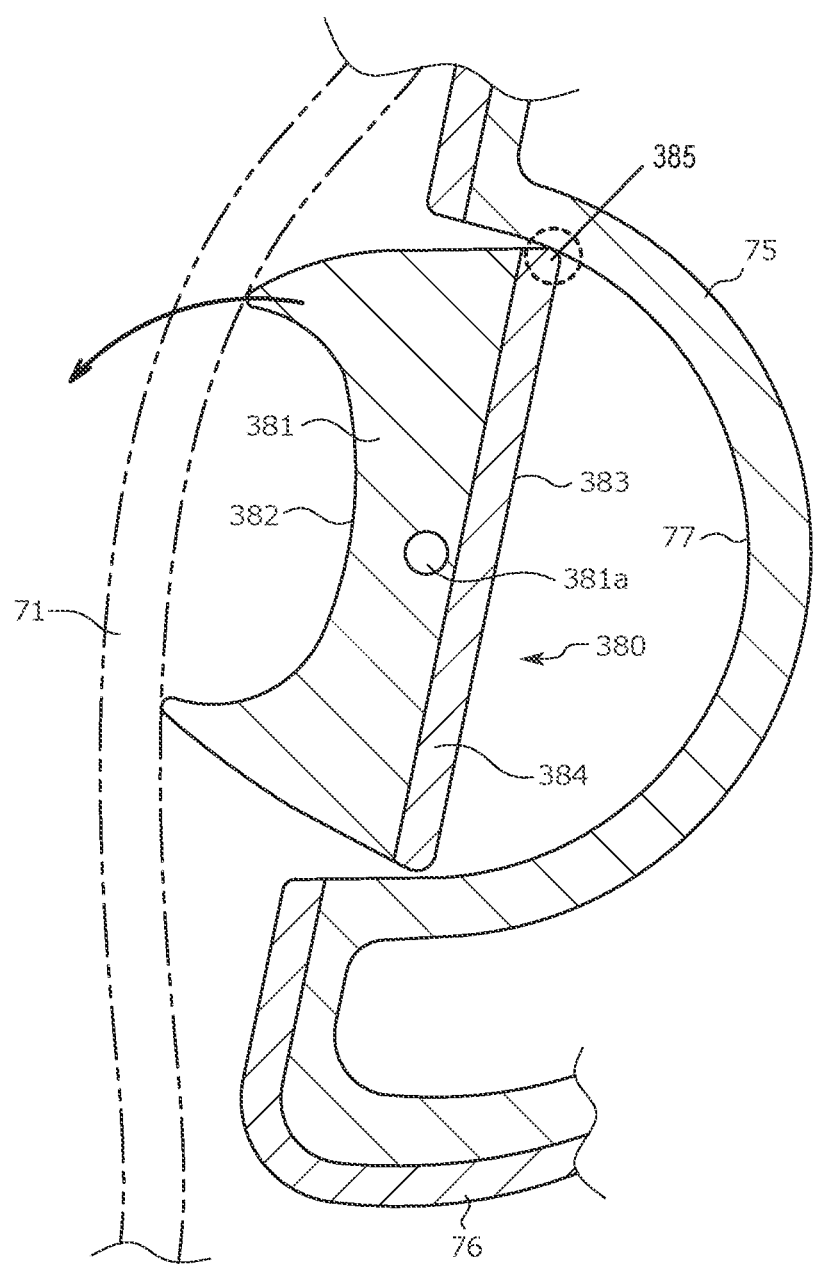
FIG. 42 is a view for describing the space formation portion of the thirteenth embodiment, and is a schematic cross-sectional view of the periphery of the space formation portion along the vertical plane at a second time.

When the rotary member 381 rotates from the normal position to reach the recessed portion formation position, the first surface 382 is exposed through the opening of the cavity 77 as illustrated in FIG. 42. When the first surface 382 is exposed, a space is formed between the opposing region of the front surface of the lateral portion S12 and the webbing 71 as illustrated in FIG. 42. That is, the recessed portion formation position is a position that the rotary member 381 at the normal position rotates towards when a seated passenger fastens the seatbelt. The recessed portion formed by the rotary member 381 at the recessed portion formation position is utilized so that the webbing 71 can be more easily grasped.

In the state of the rotary member 381 at the recessed portion formation position, both end portions (equivalent to portions surrounding the recessed portion) of the first surface 382 in the rotation direction somewhat protrude outward of the cavity 77 as illustrated in FIG. 42. These protruding end portions (particularly, an upper end portion in FIG. 42) of the first surface 382 in the rotation direction come into contact with a back surface of the webbing 71 positioned right in front of the end portions of the first surface 382, thereby pushing the webbing 71 forward. As described above, in the present embodiment, the rotary member 381 has functions similar to those of the belt reacher 90 of the twelfth embodiment, and is used as both of the space formation portion 380 and the belt reacher.

When the rotary member 381 rotates from the normal position to reach the recessed portion formation position, a corner portion (specifically, a corner portion positioned on an upper end side of the second surface 383 and surrounded by a dashed line in FIG. 42) of the rotary member 381 is locked in contact with an inner wall surface of the cavity 77 of the lateral portion S12 as illustrated in FIG. 42. This can restrict further rotation of the rotary member 381 in the same rotation direction, and can hold the rotary member 381 at the recessed portion formation position. As described above, the corner portion of the rotary member 381 functions as a positioning portion 385 configured to hold the position of the rotary member 381. With fulfillment of the function as the positioning portion 385, the rotary member 381 is held at the above-described recessed portion formation position, and is utilized as the space formation portion 380 and the belt reacher.

Note that in the present embodiment, the component forming the space formation portion 380 is the rotary member 381, and it is, by rotation of the rotary member 381, switchable between the state in which the recessed portion is exposed and the state in which the recessed portion is hidden. With such a configuration, the above-described two states can be more easily switched. Note that the present disclosure is not limited to such a configuration, and the component forming the space formation portion may be other movable members than the rotary member 381 to switch the above-described two states by, e.g., slide movement.

The recessed portion formed at the first surface 382 of the rotary member 381 may be used for other purposes than the purpose of forming the space with respect to the webbing 71 of the seatbelt, and specifically, may be used for providing a space for housing of a small product. Thus, the rotary member 381 as the space formation portion is also used for forming the space for housing of the small product, and therefore, the rotary member 381 can be more effectively utilized.

In the above-described embodiment, the vehicle seat used for an automobile has been described as a specific example, but the present disclosure is not limited to such an example. The present disclosure can be utilized not only as vehicle seats for trains, buses, etc., but also as vehicle seats for airplanes, ships, etc.

In the above-described embodiment, the vehicle seat of the present disclosure has been generally described. Note that the above-described embodiments have been set forth merely as examples for the sake of easy understanding of the present disclosure, and are not intended to limit the present disclosure. Changes and modifications can be made to the present disclosure without departing from the gist of the present disclosure. Needless to say, the present disclosure includes equivalents thereof.

TABLE OF REFERENCE NUMERALS

S: vehicle seat (present seat)
1: seat cushion
2: seat back
3: head rest
10: seatbelt
  10a: lower end side
  10b: upper end side
11: tongue plate
12: buckle
13, 413: belt guide
  13a: guide hole
20, 120, 220, 420, 520, 620: back side portion
  20a, 120a, 220a, 420a, 520a: side base
  20b: cushion pad
  20c: cover material
    20ca: opening hole
21, 121, 221, 321, 421, 521: recessed housing portion (housing portion)
  21a, 22a, 23a, 121a: opening
  21b, 22b, 23b, 321b: housing plate
  321c: back attachment portion
  321d: body attachment portion
  321e: snap-fit hole
  321f: hook claw portion
  321g: protruding holding portion
22: recessed airbag housing portion
  22a: side wall portion
23: belt facing recessed portion
30, 130, 230, 330, 430, 530, 630: belt assist device
31, 331: motor
  31a: motor body
  31b: cylinder
  331b: drive shaft
  31c, 331c: support shaft (support shaft portion)
  331d: wheel gear
  331e: worm gear
  331f: support
    331g: insertion hole
32, 132, 332: support plate (support)
  32a: attachment target portion
  32b: opening
  32c, 132c: support hole
  132d: coupling portion
  332e: protruding raised portion
33, 133, 233, 333, 433, 533: rotary shaft
34, 134, 234, 334, 434, 534, 634: rotary member (movable member)
  34a, 134a, 334a: reinforcement rib
  34b: support hole
  34c, 34d, 134c: shaft hole
  334d: cutout portion
  334e: position regulation portion
  34e: support rib
  34f: slit
  634a: belt support
  634b: slide leg
35: auxiliary spring
336: front cover
337: back cover 338: lateral cover
40: ECU
41: drive circuit
42: vehicle power source
43: seating sensor
44: door sensor
45: buckle sensor
46: drive circuit
50: airbag module
60, 160, 460, 560, 660: light emission device
61, 161: light source body
62, 162, 462, 562, 662: light guide body
   62a: exposed portion
163, 563: cover member
465, 565: light emission device
466, 566: light emission body
   466a: light source
   466b: substrate
   466c: lens
   466d, 566d: knob/angle adjuster
467, 567: assembly member
71: webbing (belt portion)
   71a: tongue
72: buckle
73: pullout port
74: rectangular hole
75: resin plate
76: cover material
77: cavity
80, 180, 280, 380: space formation portion
   80a: opening of recessed portion
   80b: bottom surface of recessed portion
   180a: bottom wall portion
   180b: side wall portion
   180c: opening
81: inner portion
   81a: frame body
   81b: tongue-shaped protrusion
   81c: housing space
82: outer portion
   82a: curved portion
   82b: protruding portion
   82c: perpendicular portion
82X: outer portion of the variation
   82Xa: bowl-shaped portion
   82Xb: flange portion
381: rotary member
   381a: rotary shaft
382: first surface
383: second surface
384: cover material
385: positioning portion
90: belt reacher, belt pusher
91: pushout body
   91a: rotary shaft
M: airbag module
   Ma: webbing
S1: seat back
S11: support portion
S12: lateral portion
S2: seat cushion
S3: head rest
S4: arm rest
S5: housing box
TL: break line

What is claimed is:

1. A vehicle seat comprising:
a support portion configured to support a back of a seated passenger from behind the back of the seated passenger;
a lateral portion positioned at a side of the support portion; and
an airbag module housed in the lateral portion;
wherein:
the lateral portion has a resin plate and a cover material that covers the resin plate,
the resin plate has a space formation portion and a recessed airbag housing portion that houses the airbag module and is disposed at a different position from the space formation portion, the space formation portion is formed by a recessed portion and includes a bottom wall portion and side wall portions provided respectively on both sides of the bottom wall portion and;
at least a portion of the space formation portion opposes a belt portion of a seatbelt when a seatbelt is at a standby position in an unlocked state;
at least a portion of the space formation portion is positioned on a side of the support portion with respect to the airbag module; and
the side wall portion of the space formation portion that is positioned on the side of the support portion with respect to the airbag module is positioned closer to the support portion in a width direction of the vehicle seat than a side wall portion of the recessed airbag housing portion that is positioned on the side of the support portion with respect to the airbag module.

2. The vehicle seat according to claim 1, comprising:
a webbing extending from the airbag module,
wherein the space formation portion is positioned on a side of the support portion with respect to a break line that connects the webbing and the cover material.

3. The vehicle seat according to claim 2, wherein:
a front surface of the lateral portion has an opposing region that opposes the belt portion of the seatbelt when the seatbelt is at the standby position in the unlocked state; and
at least a portion of the belt portion is positioned on a side of the support portion with respect to the break line.

4. The vehicle seat according to claim 3, wherein:
when the seatbelt is at the standby position in the unlocked state, one end of the space formation portion in a horizontal width direction is positioned farther from one end of the belt portion in a width direction of the belt portion than from another end of the belt portion in the width direction, and another end of the recessed portion in the horizontal width direction is positioned between the one end of the belt portion and the another end of the belt portion in the width direction.

5. The vehicle seat according to claim 3, wherein:
when the seatbelt is at the standby position in the unlocked state, one end and another end of the belt portion in a width direction of the belt portion are positioned between one end and another end of the space formation portion in a horizontal width direction.

6. The vehicle seat according to claim 1, wherein:
a horizontal width direction of the space formation portion is along the width direction of the vehicle seat;
a length in an upper-to-lower direction intersecting the horizontal width direction of the space formation portion is longer than a length in the horizontal width direction of the space formation portion; and the side wall portion of the space formation portion and the side wall portion of the recessed airbag housing portion are provided at a noncontiguous portion on the resin plate.

7. The vehicle seat according to claim 3, wherein:

the space formation portion comprises an opening that faces the belt portion, and the bottom wall portion positioned opposite to the opening; and an area of the opening of the space formation portion is larger than an area of the bottom wall portion of the space formation portion.

8. The vehicle seat according to claim 1, wherein:

a component that forms the space formation portion and a peripheral component around the space formation portion are separate components from each other that are assembled and integrated.

9. The vehicle seat according to claim 1, comprising:

a webbing extending from the airbag module, wherein the space formation portion is positioned on a side of the support portion with respect to an end portion of the webbing that is fixed to the airbag module; and the space formation portion is arranged at a position overlapping the airbag module in an upper-to-lower direction, and is arranged at an upper position of the airbag module.

10. The vehicle seat according to claim 1, wherein:

the space formation portion is formed by a decorative component that is disposed on a surface of the cover material.

* * * * *